(12) United States Patent
Yu et al.

(10) Patent No.: US 11,560,037 B2
(45) Date of Patent: Jan. 24, 2023

(54) VEHICLE INTERIOR ENVIRONMENT CONTROL

(71) Applicants: Lin Yu, Westwood, MA (US); Mary Clover Apelian, Boca Raton, FL (US)

(72) Inventors: Lin Yu, Westwood, MA (US); Mary Clover Apelian, Boca Raton, FL (US)

(*) Notice: Subject to any disclaimer, the term of this patent is extended or adjusted under 35 U.S.C. 154(b) by 0 days.

(21) Appl. No.: 17/370,512

(22) Filed: Jul. 8, 2021

(65) Prior Publication Data
US 2021/0402846 A1 Dec. 30, 2021

Related U.S. Application Data

(63) Continuation of application No. 16/804,195, filed on Feb. 28, 2020, now Pat. No. 11,059,348, which is a continuation of application No. 16/131,489, filed on Sep. 14, 2018, now Pat. No. 10,603,980.

(60) Provisional application No. 62/731,057, filed on Sep. 13, 2018, provisional application No. 62/558,675, filed on Sep. 14, 2017.

(51) Int. Cl.
*B60H 1/00* (2006.01)
*B60H 1/32* (2006.01)

(52) U.S. Cl.
CPC ......... *B60H 1/00735* (2013.01); *B60H 1/008* (2013.01); *B60H 1/0073* (2019.05); *B60H 1/00742* (2013.01); *B60H 1/00778* (2013.01); *B60H 1/00878* (2013.01); *B60H 1/00985* (2013.01); *B60H 1/00978* (2013.01);
(Continued)

(58) Field of Classification Search
CPC .............. B60H 1/00735; B60H 1/0073; B60H 1/00742; B60H 1/00778; B60H 1/008; B60H 1/00878; B60H 1/00985; B60H 1/00978; B60H 2001/3255; B60H 2001/3266

See application file for complete search history.

(56) References Cited

U.S. PATENT DOCUMENTS 5,172,856 A * 12/1992 Tanaka .................. G06V 20/597
236/91 C
9,227,484 B1 * 1/2016 Justice ............... B60H 1/00778
(Continued)

FOREIGN PATENT DOCUMENTS

CN 105437906 A * 3/2016 ......... B60H 1/00742
EP 1340635 A2 * 9/2003 ......... B60H 1/00807
(Continued)

OTHER PUBLICATIONS

English Translation of CN105437906A.*

Primary Examiner — Rami Khatib
(74) Attorney, Agent, or Firm — Thomas E. Lees, LLC

(57) ABSTRACT

A computer-implemented process for controlling a vehicle interior includes detecting a previously defined situation that relates to an undesirable environmental condition of the vehicle interior, and assessing both a risk level and an urgency level, based on a vehicle sensor input. The process also includes generating a vehicle command based upon the detected previously defined situation, the assessed risk level, and assessed urgency level, and executing the generated vehicle command to control at least one of an engine, a window, and a heating, ventilation and air conditioning (HVAC) unit to modify an environmental condition of the vehicle interior.

20 Claims, 36 Drawing Sheets

(52) U.S. Cl.
CPC ............... *B60H 2001/3255* (2013.01); *B60H 2001/3266* (2013.01)

(56) References Cited

U.S. PATENT DOCUMENTS

| | | | |
|---|---|---|---|
| 9,676,325 B1* | 6/2017 | Duan | ..................... G08B 21/24 |
| 2002/0161501 A1* | 10/2002 | Dulin | ................. B60H 1/00742 |
| | | | 701/45 |
| 2009/0204297 A1* | 8/2009 | Friedman | ........... B60H 1/00742 |
| | | | 701/46 |
| 2014/0095016 A1* | 4/2014 | Suganuma | ............... G07C 5/00 |
| | | | 701/32.1 |
| 2016/0325656 A1* | 11/2016 | Ziolek | ................... B60N 2/5685 |
| 2017/0046937 A1* | 2/2017 | Chacon, Jr. | ............. G08B 21/18 |
| 2017/0124848 A1* | 5/2017 | Zhou | ...................... G08B 21/24 |
| 2017/0129399 A1* | 5/2017 | Appukutty | ........... B60N 2/2872 |
| 2018/0237024 A1* | 8/2018 | Mummidi | ................ G06N 5/04 |

FOREIGN PATENT DOCUMENTS

| | | | | | |
|---|---|---|---|---|---|
| GB | | 2522128 A | * | 7/2015 | ......... B60H 1/00642 |
| JP | | 07223421 A | * | 8/1995 | |

\* cited by examiner

SENSOR AVAILABILITY MAP

| WEIGHT | | | TEMPERATURE | | INFRARED | MOTION | AIR QUALITY | GPS |
|---|---|---|---|---|---|---|---|---|
| DRIVER | FRONT PASSENGER | BACKROWS | EXTERIOR | INTERIOR | | | | |
| 1 | 1 | 4 | 1 | 2 | 1 | 0 | 1 | 1 |

FIG. 1C

| EXTERIOR TEMPERATURE (°F) | | EXPECTED EQUILIBRIUM RANGE (INTERIOR TEMPERATURE) (°F) | | | INTERIOR TEMPERATURE INCREASE (DEGREES IN °F) IN FIRST 5 MINUTES | | | |
|---|---|---|---|---|---|---|---|---|
| A | B | C | D | E | F | G | H | I |
| LOW | HIGH | LOW | MEDIUM | HIGH | <5 | ≥5 & <10 | ≥10 & <20 | ≥20 |
| 105 | 110 | 135 | 142 | 149 | H,H | H,H | H,H | H,H |
| 100 | 105 | 130 | 137 | 144 | H,H | H,H | H,H | H,H |
| 95 | 100 | 125 | 132 | 139 | H,H | H,H | H,H | H,H |
| 90 | 95 | 120 | 127 | 134 | H,H | H,H | H,H | H,H |
| 85 | 90 | 115 | 122 | 129 | H,L | H,H | H,H | H,H |
| 80 | 85 | 110 | 117 | 124 | H,L | H,H | H,H | H,H |
| 75 | 80 | 105 | 112 | 119 | H,L | H,L | H,H | H,H |
| 70 | 75 | 100 | 107 | 114 | H,L | H,L | H,H | H,H |
| 65 | 70 | 95 | 102 | 109 | L,L | H,L | H,H | H,H |
| 60 | 65 | 90 | 97 | 104 | H,L | H,H | H,H | H,H |
| 55 | 60 | 85 | 92 | 99 | H,H | H,H | H,H | H,H |
| 50 | 55 | 80 | 87 | 94 | H,H | H,H | H,H | H,H |
| 40 | 50 | 75 | 82 | 89 | H,H | H,H | H,H | H,H |

PRIORITY LEGEND

| | | TEMPERATURE CHANGE OVER TIME | |
|---|---|---|---|
| | | LOW | HIGH |
| TEMPERATURE RANGE RISK | LOW | L,L | L,H |
| | HIGH | H,L | H,H |

FIG. 6A

| EXTERIOR TEMPERATURE (°F) | | EXPECTED EQUILIBRIUM RANGE INTERIOR TEMPERATURE (°F) | | | INTERIOR TEMPERATURE INCREASE (°F) IN FIRST 15 MINUTES | | | |
|---|---|---|---|---|---|---|---|---|
| A | B | C | D | E | F | G | H | I |
| LOW | HIGH | LOW | MEDIUM | HIGH | <5 | ≥5 & <10 | ≥10 & <20 | ≥20 |
| 105 | 110 | 135 | 142 | 149 | H,H | H,H | H,H | H,H |
| 100 | 105 | 130 | 137 | 144 | H,H | H,H | H,H | H,H |
| 95 | 100 | 125 | 132 | 139 | H,H | H,H | H,H | H,H |
| 90 | 95 | 120 | 127 | 134 | H,H | H,H | H,H | H,H |
| 85 | 90 | 115 | 122 | 129 | H,H | H,H | H,H | H,H |
| 80 | 85 | 110 | 117 | 124 | H,L | H,H | H,H | H,H |
| 75 | 80 | 105 | 112 | 119 | L,L | H,L | H,H | H,H |
| 70 | 75 | 100 | 107 | 114 | L,L | L,L | H,H | H,H |
| 65 | 70 | 95 | 102 | 109 | L,L | L,L | L,H | H,H |
| 60 | 65 | 90 | 97 | 104 | L,L | H,L | L,H | H,H |
| 55 | 60 | 85 | 92 | 99 | H,L | H,H | H,H | H,H |
| 50 | 55 | 80 | 87 | 94 | H,H | H,H | H,H | H,H |
| 40 | 50 | 75 | 82 | 89 | H,H | H,H | H,H | H,H |

610

| PRIORITY LEGEND | | TEMPERATURE CHANGE OVER TIME | |
|---|---|---|---|
| | | LOW | HIGH |
| TEMPERATURE RANGE– RISK LEVEL | LOW | L,L | L,H |
| | HIGH | H,L | H,H |

FIG. 6B

| EXTERIOR TEMPERATURE (°F) | | EXPECTED EQUILIBRIUM RANGE INTERIOR TEMPERATURE (°F) | | | INTERIOR TEMPERATURE INCREASE (DEGREES IN °F) IN FIRST 30 MINUTES | | | |
|---|---|---|---|---|---|---|---|---|
| A | B | C | D | E | F | G | H | I |
| LOW | HIGH | LOW | MEDIUM | HIGH | <5 | ≥5 & <10 | ≥10 & <20 | ≥20 |
| 105 | 110 | 135 | 142 | 149 | H,H | H,H | H,H | H,H |
| 100 | 105 | 130 | 137 | 144 | H,H | H,H | H,H | H,H |
| 95 | 100 | 125 | 132 | 139 | H,H | H,H | H,H | H,H |
| 90 | 95 | 120 | 127 | 134 | H,H | H,H | H,H | H,H |
| 85 | 90 | 115 | 122 | 129 | H,H | H,H | H,H | H,H |
| 80 | 85 | 110 | 117 | 124 | H,L | H,H | H,H | H,H |
| 75 | 80 | 105 | 112 | 119 | H,L | H,H | H,H | H,H |
| 70 | 75 | 100 | 107 | 114 | L,L | H,L | H,H | H,H |
| 65 | 70 | 95 | 102 | 109 | L,L | L,L | L,H | L,H |
| 60 | 65 | 90 | 97 | 104 | L,L | L,L | L,H | H,H |
| 55 | 60 | 85 | 92 | 99 | L,L | L,L | L,H | H,H |
| 50 | 55 | 80 | 87 | 94 | L,L | H,L | H,H | H,H |
| 40 | 50 | 75 | 82 | 89 | H,L | H,H | H,H | H,H |

| PRIORITY LEGEND | | TEMPERATURE CHANGE OVER TIME | |
|---|---|---|---|
| | | LOW | HIGH |
| TEMPERATURE RANGE – RISK LEVEL | LOW | L,L | L,H |
| | HIGH | H,L | H,H |

FIG. 6C

| INPUT | | | OUTPUT | | | | | |
|---|---|---|---|---|---|---|---|---|
| Temperature Range | Change in Temperature Over Time | Combined Priority Value | TIME BEFORE 911 CALL (MIN) | TIME BEFORE GOING TO POLICE SATION OR HOSPITAL (MIN) (AUTONOMOUS VEH ONLY) | Action 3 SECOND SYSTEM WARNING TO DRIVER/OWNER | | Action 4 REPEAT SYSTEM WARNING TO DRIVER/OWNER; SOUND VEHICLE SIREN | |
| | | | | | WAIT FOR PRIOR ACTION | WAIT TIME (MIN) | WAIT FOR PRIOR ACTION | WAIT TIME (MIN) |
| LOW | LOW | L,L | 30 | 45 | 2 | 5 | 3 | 5 |
| LOW | HIGH | L,H | 25 | 40 | 2 | 5 | 3 | 4 |
| HIGH | LOW | H,L | 20 | 35 | 2 | 5 | 3 | 3 |
| HIGH | HIGH | H,H | 15 | 25 | 2 | 5 | 3 | 2 |

| INPUT | | | | OUTPUT | | | | |
|---|---|---|---|---|---|---|---|---|
| Temperature Range | Change in Temperature Over Time | Combined Priority Value | TIME BEFORE 911 CALL (MIN) | TIME BEFORE GOING TO POLICE SATION OR HOSPITAL (MIN) (AUTONOMOUS VEH ONLY) | Action 5 CALL 911 FOR RESCUE HELP; SOUND VEHICLE SIREN (IF HUMAN DRIVING) | | Action 6 DRIVE TO NEAREST HOSPITAL, POLICE/FIRE DEPT. FOR RESCUE; SOUND VEHICLE SIREN (IF AUTONOMOUS VEHICLE) | |
| | | | | | WAIT FOR PRIOR ACTION | WAIT TIME (MIN) | WAIT FOR PRIOR ACTION | WAIT TIME (MIN) |
| LOW | LOW | L,L | 30 | 45 | 1 | 30 | 1 | 45 |
| LOW | HIGH | L,H | 25 | 40 | 1 | 25 | 1 | 40 |
| HIGH | LOW | H,L | 20 | 35 | 1 | 20 | 1 | 35 |
| HIGH | HIGH | H,H | 15 | 25 | 1 | 15 | 1 | 25 |

FIG. 8C

| INPUT | | | | OUTPUT | | | | |
|---|---|---|---|---|---|---|---|---|
| Temperature Range | Change in Temperature Over Time | Combined Priority Value | TIME BEFORE 911 CALL (MIN) | TIME BEFORE GOING TO POLICE SATION OR HOSPITAL (MIN) (AUTONOMOUS VEH ONLY) | Action 5 CALL 911 FOR RESCUE HELP; SOUND VEHICLE SIREN (IF HUMAN DRIVING) | | Action 6 DRIVE TO NEAREST HOSPITAL, POLICE/FIRE DEPT. FOR RESCUE; SOUND VEHICLE SIREN (IF AUTONOMOUS VEHICLE) | |
| | | | | | WAIT FOR PRIOR ACTION | WAIT TIME (MIN) | WAIT FOR PRIOR ACTION | WAIT TIME (MIN) |
| LOW | LOW | L,L | 30 | 45 | 1 | 30 | 1 | 45 |
| LOW | HIGH | L,H | 25 | 40 | 1 | 25 | 1 | 40 |
| HIGH | LOW | H,L | 20 | 35 | 1 | 20 | 1 | 35 |
| HIGH | HIGH | H,H | 15 | 25 | 1 | 15 | 1 | 25 |

FIG. 9C

| INPUT | | | OUTPUT | | | | |
|---|---|---|---|---|---|---|---|
| Air Quality Range | Change in Air Quality Over Time | Combined Priority Value | TIME BEFORE 911 CALL (MIN) | TIME BEFORE GOING TO POLICE SATION OR HOSPITAL (MIN) (AUTONOMOUS VEH ONLY) | Action 5: CALL 911 FOR RESCUE HELP; SOUND VEHICLE SIREN (IF HUMAN DRIVING) | | Action 6: DRIVE TO NEAREST HOSPITAL, POLICE/FIRE DEPT. FOR RESCUE; SOUND VEHICLE SIREN (IF AUTONOMOUS) | |
| | | | | | WAIT FOR PRIOR ACTION | WAIT TIME (MIN) | WAIT FOR PRIOR ACTION | WAIT TIME (MIN) |
| LOW | LOW | L,L | 20 | 20 | 1 | 20 | 1 | 20 |
| LOW | HIGH | L,H | 15 | 15 | 1 | 15 | 1 | 15 |
| HIGH | LOW | H,L | 15 | 15 | 1 | 15 | 1 | 15 |
| HIGH | HIGH | H,H | 10 | 10 | 1 | 10 | 1 | 10 |

| System State | Input: Sensor Data ||||||| Output: Action |
| --- | --- | --- | --- | --- | --- | --- | --- |
| | Weight (lb.) | Infrared (Living Being?) | Motion | Air Quality || Temperature °F || |
| | | | | Oxygen (%) | Carbon Monoxide (ppm) | Inside | Outside | |
| 1 | n/a | N | N | n/a | n/a | n/a | n/a | n/a |
| 2 | ≥70 | n/a | n/a | <19 | ≥5 | n/a | n/a | Initiate call; Sound alarm; If car is stopped, cut engine; Fan on high; Open window 4" |
| 3 | <70 | Y | Y | <19 | | n/a | n/a | Initiate call; Sound alarm; If car starts, 76°F, fan high then moderate; If start failed, open window 4" |
| 4 | <70 | Y | Y | | ≥5 | n/a | n/a | Initiate call; Sound alarm; If car starts, 76°F, fan high then moderate, open window 4" then close; If start failed, open window 4" |

FIG. 16A

| System State | Input: Sensor Data ||||||| Output: Action |
| --- | --- | --- | --- | --- | --- | --- | --- | --- |
| | Weight (lb.) | Infrared (Living Being?) | Motion | Air Quality || Temperature °F || |
| | | | | Oxygen (%) | Carbon Monoxide (ppm) | Inside | Outside | |
| 5 | <70 | Y | Y | n/a | n/a | ≥80 | <85 | Initiate call; Sound alarm; If car starts, 76°F, fan moderate; If start failed, open window 4" |
| | | | | | | | ≥85 | Initiate call; Sound alarm; If start failed, then stop |
| | | | | | | | <60 | Initiate call; Sound alarm; If car starts, 76°F, fan moderate |
| 6 | <70 | Y | Y | n/a | n/a | <55 | ≥55 | Initiate call; Sound alarm; If car starts, 76°F, fan moderate; If start failed, open window 4" |
| | | | | | | | <55 | Initiate call; Sound alarm; If car starts, 76°F, fan moderate; If start failed, then stop |

FIG. 16B

VEHICLE INTERIOR ENVIRONMENT CONTROL

CROSS REFERENCE TO RELATED APPLICATIONS

This application is a continuation of U.S. patent application Ser. No. 16/804,195, filed Feb. 28, 2020, entitled VEHICLE INTERIOR ENVIRONMENT CONTROL, now allowed, which is a continuation of U.S. patent application Ser. No. 16/131,489, filed Sep. 14, 2018, entitled VEHICLE INTERIOR ENVIRONMENT CONTROL, issued as U.S. Pat. No. 10,603,980 on Mar. 31, 2020, which claims the benefit of U.S. Provisional Patent Application Ser. No. 62/731,057, filed Sep. 13, 2018, entitled VEHICLE INTERIOR ENVIRONMENT CONTROL, the disclosures of which are hereby incorporated herein by reference. This application also claims the benefit of U.S. Provisional Patent Application Ser. No. 62/558,675, filed Sep. 14, 2017, entitled VEHICLE INTERIOR CONTROL, the disclosure of which is hereby incorporated herein by reference.

BACKGROUND

Various aspects of the present disclosure relate generally to controlling a vehicle, and more particularly to controlling an environment within a vehicle interior.

Motorized vehicles provide a convenient and well accepted mode of transportation. In this regard, people rely upon vehicles for daily commutes, to run errands, and to transport items and other vehicle occupants. Regardless of vehicle type, many vehicles include a cabin that can be controlled to provide an interior environment that is different from a proximate outside ambient environment.

BRIEF SUMMARY

According to aspects of the present disclosure, a computer-implemented process is provided. The computer-implemented process controls an environment of a vehicle interior responsive to detecting a predetermined environmental condition of the vehicle interior. Particularly, the process comprises assessing a risk and an urgency based on a vehicle sensor input. Here, assessing both a risk and an urgency comprise obtaining data for the vehicle interior, based on a measured environmental condition, wherein the obtained data is mapped to a corresponding range, which corresponds to the risk, and change over time, which corresponds to the urgency. Assessing risk and urgency also comprises assigning, dynamically a first priority value based upon the range and a second priority value based upon the change over time, and transforming the first priority value and the second priority value into a combined priority value. The process further comprises generating a vehicle command based upon the assessed risk, and assessed urgency, and executing the generated vehicle command to control at least one of an engine, a window, and a heating, ventilation and air conditioning (HVAC) unit such that the executed command modifies an environmental condition of the vehicle interior.

According to further aspects of the present disclosure, a computer-implemented process for controlling an environment of a vehicle interior is provided, where either an engine of the vehicle is off or the engine is running but the vehicle is stationary. The process comprises reading a first sensor output from a first sensor attached to a vehicle, the first sensor output representative of a first environmental condition associated with the vehicle. The process also comprises calculating a probability of occurrence of an adverse event based upon a determination of vehicle occupancy of the vehicle and the first environmental condition identified from the first sensor output. The process still further comprises performing, where the calculated probability exceeds a predetermined threshold, a first predetermined action by issuing a command to control at least one of an engine, a window, and a heating, ventilation and air conditioning (HVAC) unit. Here, the first predetermined action modifies an environmental condition of the vehicle interior.

According to yet further aspects of the present disclosure, a computer-implemented process is provided for controlling an environment of a vehicle interior. The process comprises reading a first sensor output from a first sensor attached to a vehicle, the first sensor output representative of a first environmental condition associated with a vehicle. The process also comprises determining an occupancy of the vehicle by identifying a field of view of a camera, identifying an area of interest within the vehicle, and limiting the field of view to the area of interest. The field of view is limited by at least one of physically blocking at least a portion of the camera field of view, and selectively processes signals from pixels only within the area of interest. The process also comprises evaluating an output of the camera within the limited field of view to identify whether a person is in the vehicle. The process yet further comprises performing, by a processor, a predetermined action to modify an environmental condition of the vehicle interior based on the occupancy of the vehicle and the sensed first environmental condition, by issuing a command to at least one of an engine controller, a window controller, and a heating, ventilation and air conditioning (HVAC) controller.

BRIEF DESCRIPTION OF THE SEVERAL VIEWS OF THE DRAWINGS

FIG. 1C is an optional example sensor availability map, according to aspects of the present disclosure;

FIG. 6A is an example temperature-based risk level and urgency level assessment table, according to aspects of the present disclosure;

FIG. 6B is another example temperature-based risk level and urgency level assessment table, according to aspects of the present disclosure;

FIG. 6C is yet another example temperature-based risk level and urgency level assessment table, according to aspects of the present disclosure;

FIG. 8A-FIG. 8C show an example action table based upon temperature, according to aspects of the present disclosure;

FIG. 9A-FIG. 9C show another example action table based upon temperature, according to aspects of the present disclosure;

FIG. 10A-FIG. 10C show an example action table based upon air quality, according to aspects of the present disclosure;

FIG. 16A-16B is an example decision table illustrating input sensor data, threshold ranges, and associated output actions, according to aspects herein.

DETAILED DESCRIPTION

Figure 1A:
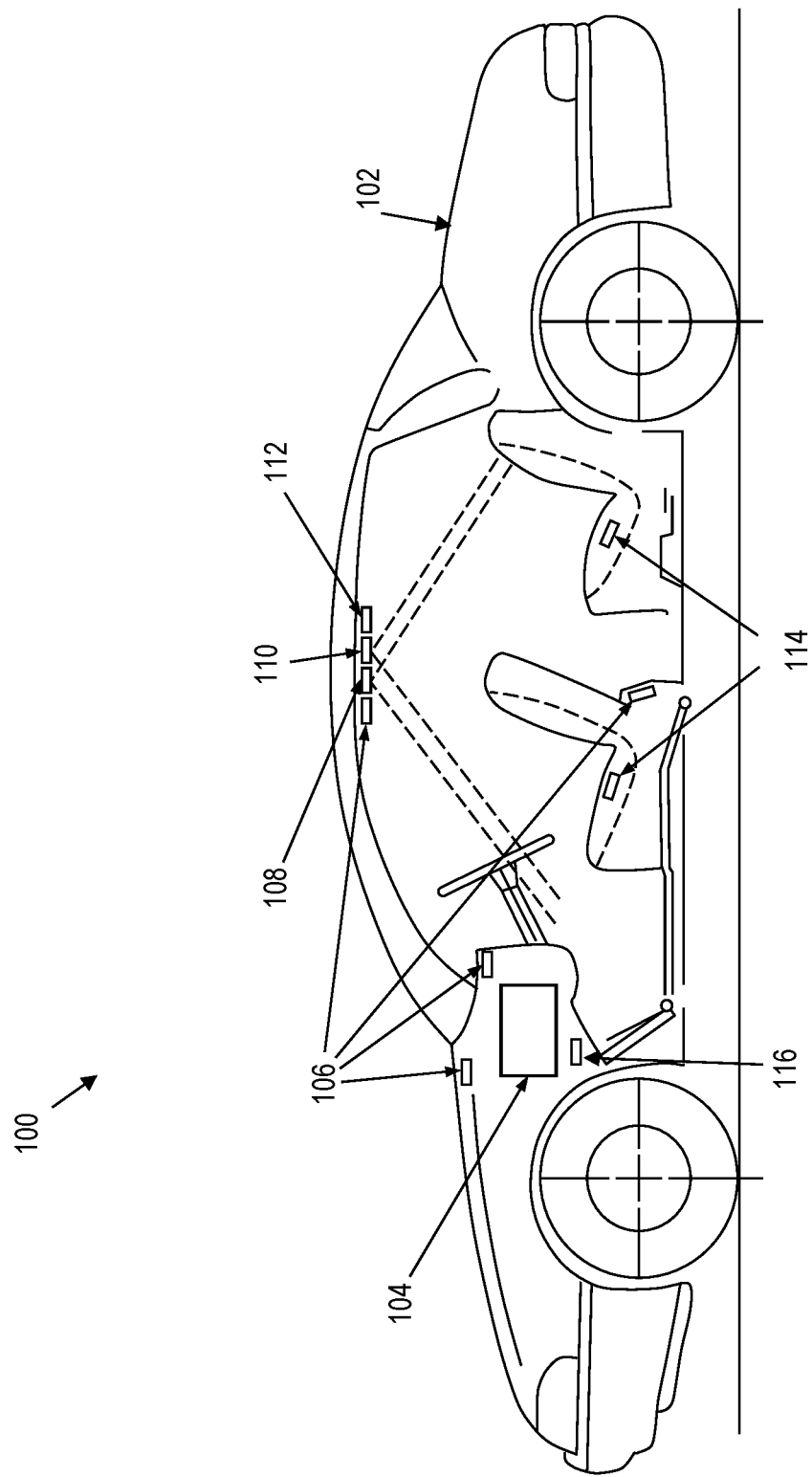
FIG. 1A is a layout diagram illustrating various vehicle sensor positions in an example vehicle, according to aspects of the present disclosure.

Aspects of the present disclosure provide systems and computer-implemented processes that modify characteristics of an environment within an interior of a vehicle in response to a detected adverse situation. For instance, aspects herein can take automated, autonomous action to prevent, remediate or mitigate undesirable environmental conditions within the interior of the vehicle upon detecting an adverse situation. In practical implementations, such prevention, remediation or mitigation activities can persist and dynamically change over time, e.g., responsive to a customized and dynamic cadence, to modify characteristics of the environment within the interior of the vehicle, and thus extend an amount of time that the vehicle interior maintains an acceptable environmental state.

Overview

According to certain aspects of the present disclosure, an environment of a vehicle interior is controlled according to three phases of operation. In this regard, a control algorithm uses cyclically recurring passes through one or more of the three phases, in whole or in part, to carry out the operations described more fully herein.

Phase I

In Phase I, the control algorithm monitors a vehicle for the detection of an adverse situation. As used herein, the term "previously defined situation" (PDS) characterizes a particular adverse situation that the control algorithm is programmed to detect while monitoring the vehicle.

In an example implementation, each PDS (representing a corresponding adverse situation type) is associated with an undesirable (including unintended) environmental condition of the vehicle interior, such as an excessively hot temperature, an excessively cold temperature, poor air quality (e.g., poor oxygen level, excessive carbon monoxide level, etc.), or combination thereof.

In this regard, detection of the undesirable and/or unintended environmental condition can be based, for example, upon an actual measurement, such a measurement that crossed a predetermined threshold. Detection can also be based upon an inference, such as an algorithm decision that is computed based upon available sensor data that may be indirect, but correlates to the undesirable and/or unintended environmental condition. For instance, as will be described in greater detail herein, knowledge of temperature outside a vehicle can be used (alone or with other information) to infer a temperature within the vehicle. That inferred temperature can be compared with a predetermined temperature threshold to trigger the detection.

Detection can also be based upon a probabilistic determination, such as computed likelihood of the of the undesirable and/or unintended environmental condition exceeding a preset probability. For instance, a vehicle may not have an interior temperature sensor. However, the algorithm, according to aspect herein, based on data inputs from other sensors and other data sources (e.g., GPS, calendar, clock, etc.), and triangulation on such information, can compute a probability that the temperature within the vehicle exceeds a predetermined temperature threshold. Thus, the computed probability can be compared with a predetermined probability threshold to trigger the detection when necessary.

Yet further, detection can be based upon a prediction (e.g., near future occurrence such as within a few minutes, within 30 minutes, within an hour, etc.) of reaching a pre-defined vehicle interior environmental condition, or a predicted likelihood of reaching a pre-defined vehicle interior environmental condition (e.g., likelihood exceeding a preset probability within a preset time).

A PDS may also be associated with other factors in addition to vehicle interior environmental conditions. For instance, a PDS can include, or be predicated upon, the presence of a vehicle occupant within the vehicle. Here, the vehicle occupant can comprise a person (infant to adult), or animal, etc., that is likely to be incapable of exiting the vehicle under their own accord, e.g., due to restraint (e.g., a baby in a car seat), a disability (e.g., injury, advanced age, etc.), disablement (e.g., a physical or mental impairment etc.), or other condition(s). In some embodiments, a vehicle occupant must be detected at the time of detecting the undesirable and/or unintended environmental condition.

A PDS can also include, or otherwise be predicated upon certain vehicle conditions other than environmental conditions. For instance, a PDS may require, or be predicated upon an engine of the vehicle not running (engine turned off), or the engine of the vehicle running without detecting vehicle movement for a predetermined period of time.

Regardless of PDS definition, upon detecting a PDS, the control operation advances to Phase II.

Phase II

Phase II comprises setting a dynamic cadence that controls the timing of actions responsive to a detected PDS in Phase III, described below. In an example implementation, the dynamic cadence is based upon a risk assessment, an urgency assessment, or a combination thereof. As described more fully herein, a risk level and/or urgency level of the detected PDS is assessed based on one or more inputs. Example inputs can comprise sensor data, historic vehicle records such as event log records, syslog records (e.g., recent vehicle internal records), metadata, lookup data (e.g., which captures greenhouse effect curve(s)), model outputs, algorithm computations, other resources available to the control algorithm (e.g., which may require an ability to submit queries via cellular, Internet, Bluetooth connections, etc.), combinations thereof, etc. This assessment enables the control algorithm to react to the detected PDS in more nuanced and delicate manner (such as via a dynamic cadence), in order to minimize unnecessary stress and burden on non-vehicle occupants that may be interested in the PDS, e.g., a vehicle driver, vehicle owner, first responder, etc.

In practical applications, the control algorithm adjusts to accommodate the risk, and the degree of urgency in its timed-response actions. For instance, as will be described in greater detail herein, the control algorithm periodically (the frequency of which need not be fixed) makes decisions, including whether to take action and/or which action(s) to take, based upon risk and urgency measurements. The timing and detail of an intervention is thus characterized by a dynamic cadence that reacts to changing conditions, including changing facts that define the detected PDS (e.g., changes in vehicle interior environmental conditions, vehicle occupancy, vehicle status, etc.). Thus, in an example implementation, when a situation has less risk or less urgency, the control algorithm can provide a responder, e.g., vehicle owner or driver, more time to respond to the situation, such as to get back to the vehicle to alleviate (e.g., prevent, mitigate, remediate, etc.) the situation. When the situation involves high risk or urgency, the control algorithm acts more quickly and more decisively in order to address the needs of a detected vehicle occupant.

In example embodiments, risk level describes the qualitative characteristics of the situation. The greater the potential severity is—or is likely to become—the higher the risk level. The control algorithm's assessment of risk level can be based, for instance, on a conservatively projected, worst-case outcome (or potential outcome, predicted outcome, etc.) of the situation, based on current real time sensor data/information.

Correspondingly, an urgency level addresses the time dimension of the situation, i.e., how quickly the potential risk can develop into negative consequences. With the presence of adverse environmental conditions, the faster the situation deepens and progresses, or the longer that situation persists, the greater the urgency level is likely to become. The control algorithm assessment of urgency level can be based, for instance, on a conservatively projected, worst-case time period in which the PDS may materialize and vehicle occupants may suffer adverse physical consequences.

In an example embodiment, although the illustrative example uses High (H) and Low (L) to demonstrate the risk and urgency assessment values, any number of such value codes can be used in practice, e.g., based on the needs, where numeric value codes may be deployed in place of text code of High and Low, etc.

According to further aspects herein, Phase II can set a dynamic cadence based upon a probability of a PDS and/or the probability of a continuation and/or escalation of the PDS. Here, probability can supplement, augment, or replace risk and urgency in characterizing the dynamic cadence, as described more fully herein.

Phase III

Based upon the Phase II assessment, the control algorithm carries out Phase III. In Phase III, specific actions are taken to prevent, mitigate, remediate, etc., the PDS. In certain embodiments, the control algorithm uses a template approach that allows plug-and-play action commands to drive the response, which can be based upon Phase II determinations, e.g., the determined risk and urgency measurements. Actions can include automated, autonomous vehicle interactions directed to modify characteristics of the environment within the interior of the vehicle in response to the detected PDS. Moreover, because the control algorithm is iterative and cyclically recurring, prevention, remediation or mitigation activities can persist and dynamically change over time, e.g., responsive to a customized and dynamic cadence, to modify characteristics of the environment within the interior of the vehicle, and thus extend an amount of time that the vehicle interior maintains an acceptable environmental state.

The Monitor, Command, and Control System

An example approach to carry out the above-three phases is referred to herein as a Monitor, Command, and Control (MCC) system. The MCC system can execute on native vehicle processors, utilize available native vehicle memory and event logs, and utilize native vehicle sensors (e.g., alone or in combination with other peripheral devices). In this regard, the MCC can also utilize native vehicle communication, e.g., across a vehicle network bus, to interact with vehicle control modules, e.g., engine controller, heating, ventilation, and air conditioning (HVAC) controller, window controller, door/door lock controller etc., as described more fully herein. As such, in certain implementations, no new hardware is required. In this regard the control algorithm is extensible, accounting for the realization that different vehicles from different manufacturers and respectively, their different models, may have different hardware capabilities and availabilities.

In this document, reference to the MCC system is used to refer to the core processing functionality of MCC that implements the control algorithm embodiments of the present disclosure. The "vehicle's processing functionality" refers to the vehicle's native command and control computing processing functionality, encompassing native hardware and software components. Although for descriptive convenience two separate terms are used, these two different computing functionalities may physically reside in the same hardware components such that the MCC is an integral component of the vehicle's computing processing system, e.g., by augmenting existing vehicle software to include the algorithms and functionality herein.

Referring now to the drawings, and in particular to FIG. 1A, a schematic view 100 of an example vehicle 102 is illustrated. The vehicle 102 comprises a controller 104 (e.g., microprocessor, controller, etc.) that collects data from various vehicle sensors 106 positioned throughout the vehicle 102. Examples of vehicle sensors include, but are not limited to, temperature sensors 106, motion sensors 108, infrared sensors 110, air quality sensors 112, weight sensors 114, etc. The vehicle 102 may further include a sensor 116, such as a global positioning system (GPS), smart appliance, third party sensor, etc. In this regard, the sensor 116 can be standalone, or part of a system that can access cellular communication, the Internet (e.g., via a cellular to internet bridge) etc. As such, the sensor 116 may include or interact with an "app" such as weather application, data collector, navigation system, geo-tagging system, etc. Further, the sensor 116 may comprise GPS, a temperature, or other sensor configuration on a smartphone, which can communicate with the controller 104, e.g., via wired connection, Bluetooth, etc. Notably, sensors can collect measurements from within a vehicle cabin/interior (e.g., vehicle cabin temperature, air quality, etc.), from outside the vehicle (e.g., the ambient temperature outside the vehicle), from remote sources such as the Internet, combinations thereof, etc. The position, quantity, type, and other features of the illustrated sensors is provided by way of illustration, and not by way of limitation.

Figure 1B:
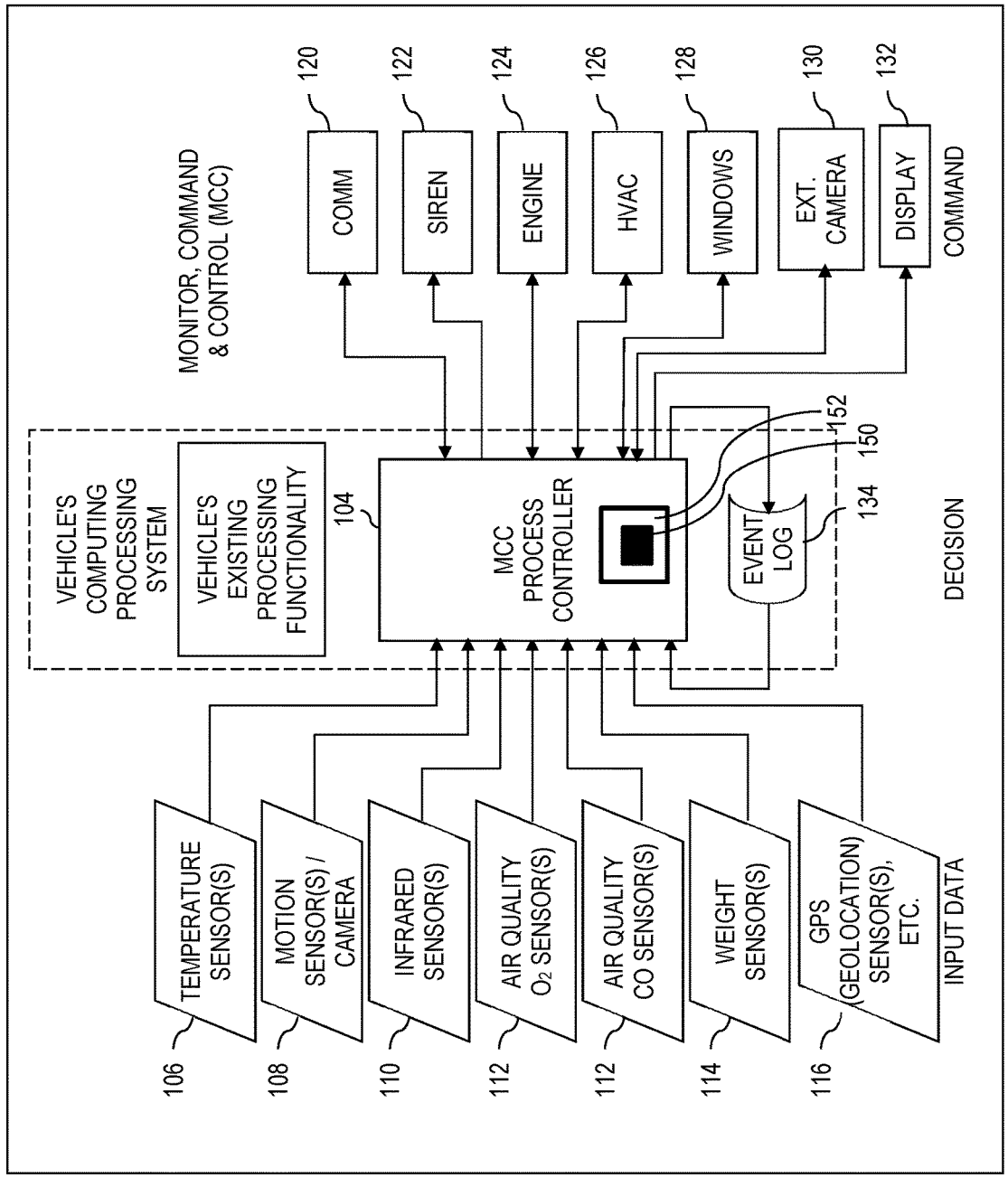
FIG. 1B is a structural flow diagram of a vehicle control system, according to aspects of the present disclosure.

Now referring to FIG. 1B, a block diagram illustrates a Monitor, Command, and Control (MCC) system, which can utilize several of the components described with reference to FIG. 1A. The controller 104 collects readings from one or more sensors, e.g., temperature sensor(s) 106, motion sensor(s) 108, infrared sensor(s) 110, air quality sensor(s) 112, weight sensor(s) 114 (e.g., in one or more front seats, back seats, or combination thereof), miscellaneous sensor(s) 116, etc. The controller 104 also interacts with select electronic components, such as a communication device 120 (e.g., cellular, Wi-Fi, Bluetooth, combination thereof, etc.), a siren 122, an engine controller 124, HVAC controller 126, window controller 128, etc.

In some embodiments, the controller 104 interacts with one or more external cameras 130 (video or image), which can be used to capture and analyze an environment around the vehicle in real-time. For instance, a photo-sensing camera's data reading could be utilized as a viable factor in assessments performed by aspects of the present disclosure. Even in a simple form, a number of lumens per unit area and Kelvin, as opposed to sophisticated pattern recognition and analysis, can be useful for the analysis herein.

In some embodiments, the controller 104 can also interact with a display 132. For instance, a vehicle may be equipped with an external facing electronic message system, such as an image display 132 on the side of the vehicle for advertising purpose or otherwise. In responding to a PDS, e.g., while sounding a siren to get attention from passersby's, a pre-formatted message may also be directed to and displayed. For instance, the externally facing message board can use strong contrasting colors, and flash text with different alternating strong contrasting colors to get attention from passersby's.

In various embodiments, the controller 104 interacts with an event log 134 to keep track of particular events of interest. For instance, the event log 134 can track system events. The term "system event" refers to events detectable by features of a vehicle, e.g., opening/closing of vehicle doors; occupancy/vacancy; distinguishing between adult and child (e.g., based upon weight); significant environment variable change, such as interior temperature changes crossing a predetermined threshold; air quality crossing a predetermined threshold; vehicle controller state changes; etc.

In an example architecture, the controller 104 can augment the system's event logs 134 to record event history data related to environment-related parameter changes, MCC assessment results, MCC system decisions, actions, etc.

Yet further, the controller 104 includes (or is coupled to) program code 150 (e.g., e.g., which embodies the control algorithm that implements the three-phase process described herein), which is stored in memory 152 (e.g., read only memory, random access memory, non-volatile storage media such as a hard drive or solid state drive, combinations thereof, etc.). When the program code is read out and executed, the vehicle carries out the algorithms and approaches described more fully herein. In this regard, the controller 104 can read sensor data, store sensor data in the memory, access event logs 134, cause the vehicle to write event logs 134, store information in the memory 152, access metadata stored in the memory 152, etc., as described more fully herein.

For instance, the memory 152 can store data such as the vehicle's make, model, year, type, color, VIN (vehicle identification number), license plate number, vehicle owner name and contact information, authorized driver list, contact list, etc. For instance, this information can be utilized in automated communications, which can utilize multi-lingual capabilities, e.g., where built into the vehicle.

Other example parameters can include system clock (YYYYMMDDHHMMSSsss) (counting into milliseconds), weight sensor data, front passenger seat, backseat, temperature sensor data (exterior, interior), motion sensor data, infrared sensor data, carbon monoxide sensor data, oxygen sensor data, etc.

Once the MCC is set up and running, the daily operation of the system does not rely on human interaction, which allows for autonomous function.

Practically speaking, it is possible for vehicle sensors and/or vehicle components to fail. Further, specific vehicle makes and models may lack the applicable sensors referred to in this disclosure. In various embodiments the control algorithm works with, and adapts to available sensors. If an existing sensor fails, the control algorithm can generate an error message on a vehicle display, enter an error in a vehicle event log (e.g., event log 130, FIG. 1B), and exclude the vehicle sensor from further iterations in the analysis herein, etc. Moreover, the control algorithm can actively detect and respond to failed vehicle components. For instance, if after taking an action, the interior temperature has not been reduced or even continuously rises, the A/C may be faulty, which can prompt immediately calling emergency services, if emergency services have not already been called. As such, approaches herein are fault tolerant in the event of sensor and other failures. Further, the control algorithm herein can adapt to new vehicle sensors added at a later date by using software/firmware updates.

Reducing False Positives

According to aspects herein, a technique of reducing false positives comprises polling sensor data in a series of quick multiple readings, using verification, averaging, convergence or other selected technique to derive the interpreted sensor reading. This feature can be implemented in low level sensor device drivers that communicate with sensors, or the controller 104 can handle collecting the quick, multiple readings.

Sensor Availability Map

Referring to FIG. 1C, an example sensor availability map 160 is illustrated. Some vehicles have more and/or better and/or different sensors than other vehicles. Accordingly, the sensor availability map 160 (e.g., which can be stored in the memory 152 of FIG. 1B) can specify the type/location 162 of the sensors available in the vehicle, and the number 164 of each available sensor. With a filled sensor availability map 160, aspects of the present disclosure can be customized to the particular vehicle, by providing a standardized way for the MCC to identify the particular sensors in the vehicle.

By way of illustration, the example sensor availability map 160 shows one driver's seat weight sensor (see reference number 114 of FIG. 1B), one front passenger seat weight sensor, and four back seat weight sensors. The sensor availability map 160 also shows 1 exterior temperature sensor, two interior temperature sensors, one infrared camera, one air quality sensor (e.g., carbon monoxide detector, oxygen detector, etc.), and 1 GPS. This example does not include a motion sensor, but other vehicles may include this sensor.

Weight Sensor Configurations

Figure 1D:
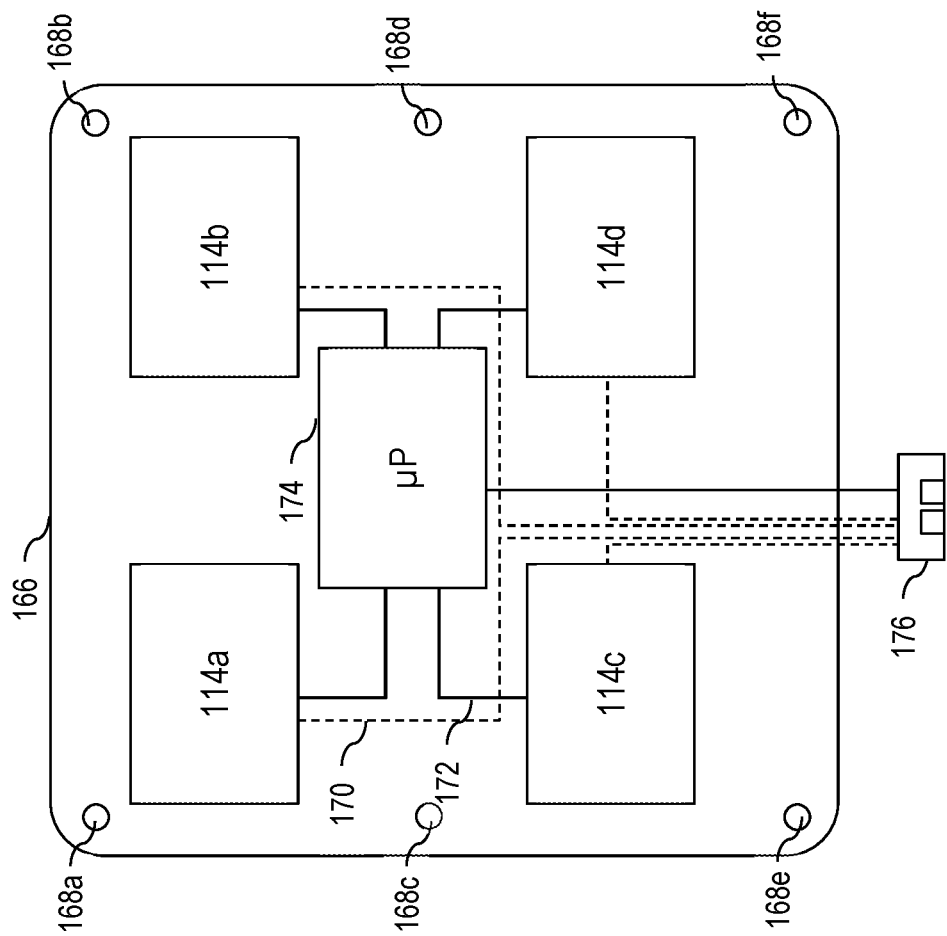
FIG. 1D is a block diagram of an optional example sensor configuration, according to aspects of the present disclosure.
Figure 1E:
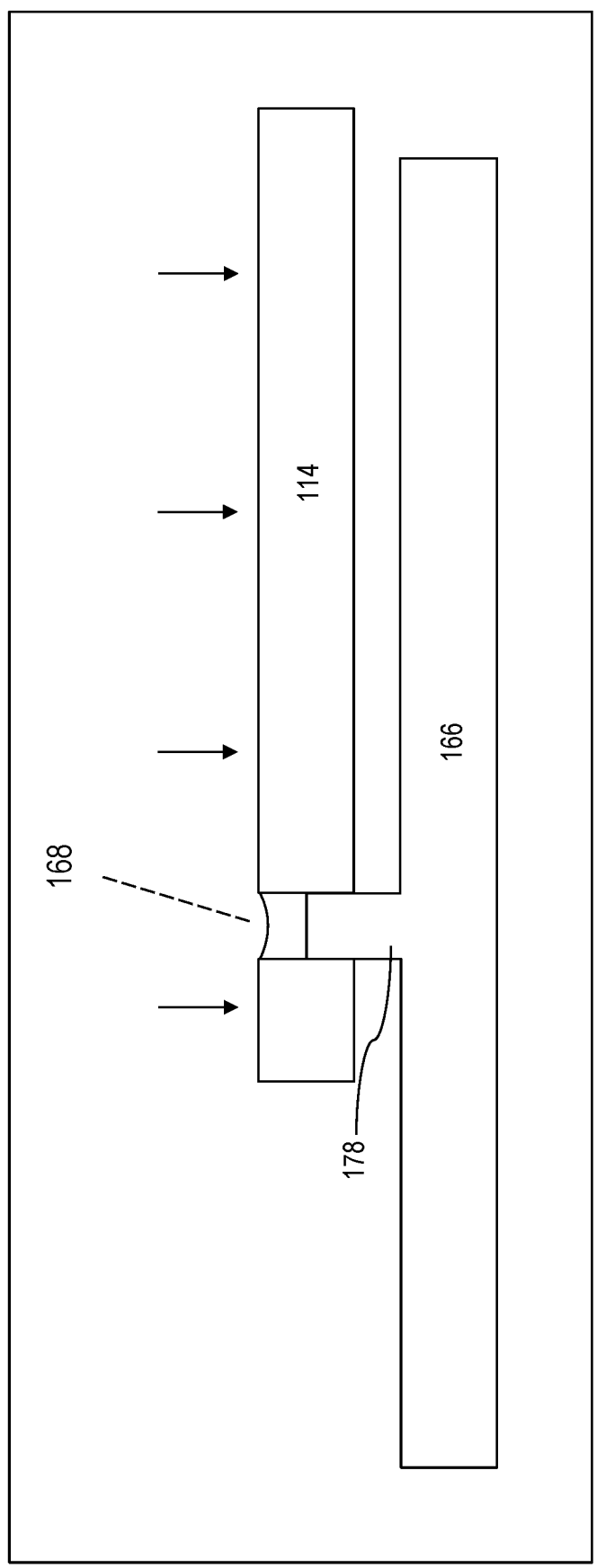
FIG. 1E is a block diagram of another optional example sensor configuration, according to aspects of the present disclosure.

Referring to FIG. 1D and FIG. 1E generally, a few example weight sensor configurations are illustrated. Generally, weight sensors may be placed under seat cushions, under each designated seating area, in both front and back rows, and on the left and/or right sides of the vehicle. Moreover, the weight sensors may also detect and measure a fluctuation of weight displacement caused by an occupant in a corresponding vehicle seat.

FIG. 1D illustrates a weight sensor grid module 166 having weight sensors 114a-114d that detect shifting weight or fluctuation of weight on vehicle seats. The weight sensor grid module 166 may be a mat made of a soft, bendable, or flexible material, with tensile strength and durability sufficient to accommodate many possible climate conditions (e.g., canvas or other weaved material, nylon, thin firm board, or plastic material).

The weight sensor grid module 166 includes positioning holes 168a-168f that allow the weight sensor grid module 166 to mount onto a layer base.

Each weight sensor 114 also comprises a data connection(s) 170 and a power connection(s) 172. In FIG. 1D, the data connection 172 feeds into a module microprocessor 174, and the power connection 172 feeds into a connection socket 176. The data connections 170 ultimately feed into the connection socket 176 as well. The connection socket facilitates ready communication with the controller 104 (FIG. 1B).

The module microprocessor 174 can synthesize data from all weight sensors together, perform analysis to determine weight shift patterns; and interact with vehicle systems (e.g., controller 104—FIG. 1B) as a single coherent module unit. Thus, the weight sensor grid module 166 can respond to queries, report detected weight, weight shift pattern data, etc. to the vehicle system(s).

FIG. 1E illustrates the weight sensor grid module 166 of FIG. 1D being mounted onto the layer base 178 via a positioning rod 180. During installation, the weight sensor grid module 166 is placed on top of layer base 178, with positioning holes 168 pairing to their respective corresponding positioning rods 180. The weight sensor grid module 166 is pressed down, so that the positioning rods 180 are inserted into the positioning holes 168, thereby retaining weight sensor grid module 166, keeping it at a designated location.

Weight shift detection enables weight shift pattern identification, that can be used to distinguish occupants from dead weight on vehicle seats. Weight shift detection and total weight on each seat, combined with the sensor input from all seats may allow for complete information on seat occupation.

First Example Process for Controlling an Environment of a Vehicle Interior

Figure 2A:
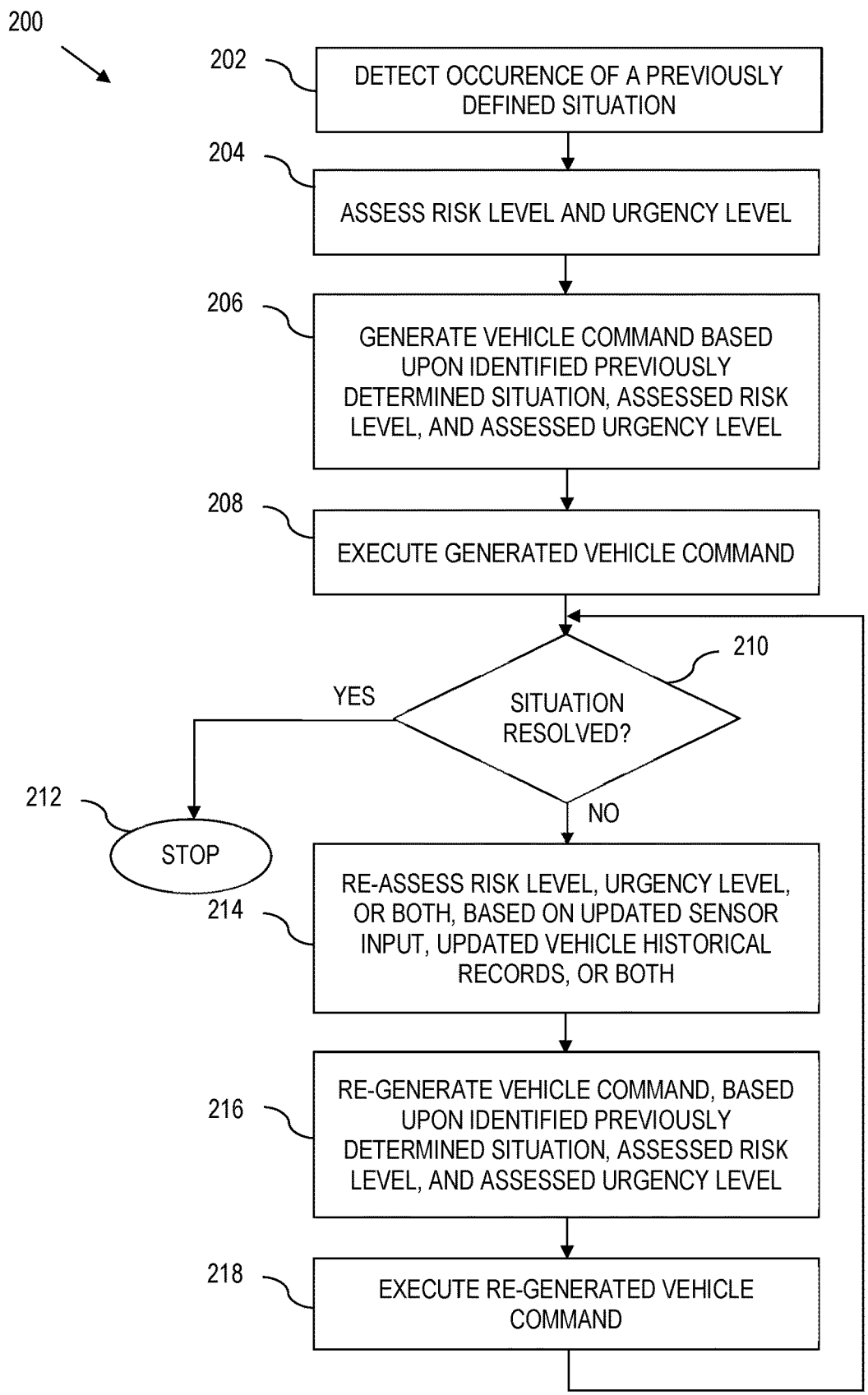
FIG. 2A is a flowchart illustrating a first computer-implemented process for controlling an environment of a vehicle interior, according to aspects of the present disclosure.

Referring to FIG. 2A, a computer-implemented process 200 is illustrated, for controlling an environment of a vehicle interior. The computer-implemented process 200 can be carried out, for instance, by the controller 104 executing computer code 150 stored in the memory 152 (FIG. 1B). Moreover, the process 200 can interact with any sensors, vehicle modules, functions, etc., described herein, e.g., with reference to any of the FIGURES herein, in any combination to carry out the above-defined three phase approach.

The process 200 comprises detecting at 202, a PDS. The detection at 202 corresponds to Phase I described above. As a few illustrative examples, the process 200 can comprise detecting a PDS where an obtained temperature is below a first predetermined range (excessively cold temperature), an obtained temperature exceeds a second predetermined temperature range (excessively hot temperature), or an obtained air quality measurement satisfies a predetermined air quality condition (poor air quality, such as too little oxygen or too much carbon monoxide). In this regard, detection of the undesirable and/or unintended environmental condition can be based, for example, upon an actual measurement, inference, a probabilistic determination, a prediction, a predicted likelihood etc., as described more fully herein.

The process 200 comprises assessing at 204, both a risk level and an urgency level. This corresponds to Phase II. For instance, the assessment can be based on a vehicle sensor input (e.g., one or more temperature readings inside and/or outside the vehicle, air quality reading, etc.—see sensors FIG. 1A, FIG. 1B) and optionally, vehicle historical records (e.g., event log 134-FIG. 1B). As will be described in greater detail herein, an example approach to assessing a risk level and/or urgency level is to use parameterized lookup table techniques, as described in greater detail herein.

The process 200 comprises generating at 206, a vehicle command based upon the detected previously defined situation, the assessed risk level, and assessed urgency level, corresponding to Phase III.

The process 200 comprises executing at 208, the generated vehicle command. For instance, in an example embodiment, the executed command controls at least one of an engine (e.g., by sending a command to an engine controller); a window (e.g., by sending a command to a window controller or motor); and a heating, ventilation and air conditioning (HVAC) unit (e.g., by sending a command to an HVAC controller), where the executed command modifies an environmental condition of the vehicle interior. The process 200 can also optionally initiate an alarm; and, send a message via a communication device, etc.

The process 200 also comprises performing in a cyclically recurring manner, a control loop. The control loop continues until the detected PDS is resolved, as detected by decision logic at 210. A PDS can be resolved by detecting that there are no longer any occupants in the vehicle, by detecting that the environmental condition (e.g., temperature, air quality, etc.) associated with the detected PDS has been restored to an acceptable level, that the vehicle has been started and driven, etc.

The cyclically recurring control loop comprises re-assessing at 214, the risk level, the urgency level, or both, based on an updated sensor input, updated vehicle historical records, or both. The risk level and urgency level define a dynamic cadence, that allows the vehicle response to be customized and dynamically responsive.

The cyclically recurring loop also comprises re-generating at 216, a vehicle command, based upon the identified PDS, the assessed risk level, and assessed urgency level.

The cyclically recurring loop yet further comprises executing, at 218 the re-generated vehicle command. As noted above, the executed command may control at least one of an engine; a window; a heating, ventilation and air conditioning (HVAC) unit, issue an alarm; send a communication device, etc.

The interval of the each iterative cycle is determined, for instance, based upon the urgency, risk, or a combination thereof. As will be seen in greater detail herein, each interval of the dynamic cadence may have a different time delay, e.g., to account for the dynamic nature of PDS occurrences, e.g., where greenhouse effects influence vehicle temperature increases. Moreover, the action is based upon the determined risk, or combination of risk and urgency.

In practical applications, the process 200 can be predicated upon detecting that an occupant is within the vehicle interior and at least one condition is satisfied, e.g., an engine of the vehicle is stopped, or the engine is running, but the vehicle has not moved in a predetermined amount of time (e.g., vehicle is stopped, not being actively driven, etc.). Occupant presence can be determined using weight sensors as explained herein, or using other techniques. Engine status can be checked by querying a vehicle engine controller.

Second Example Process for Controlling an Environment of a Vehicle Interior

Figure 2B:
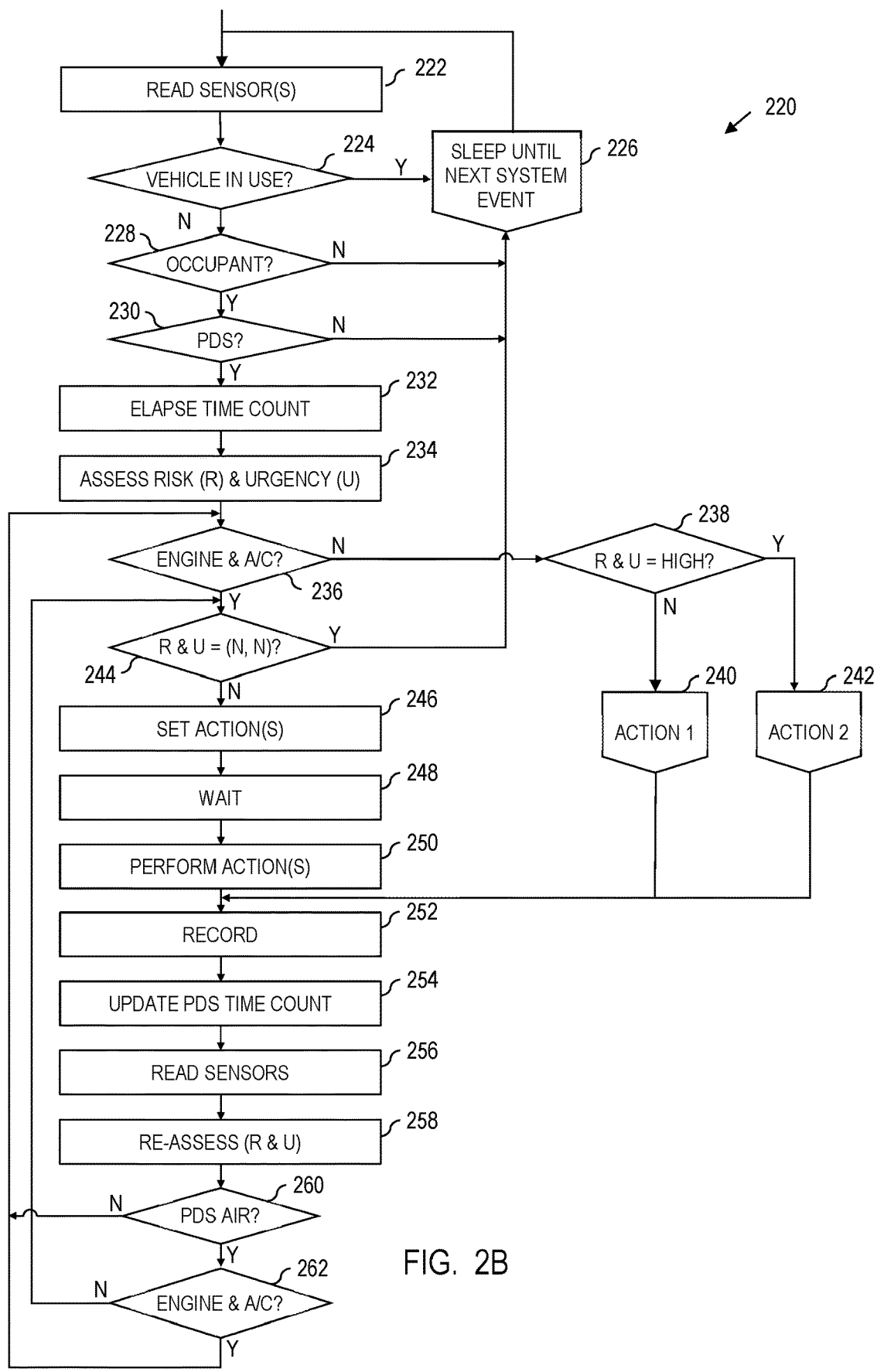
FIG. 2B is a flowchart illustrating another computer-implemented process for controlling an environment of a vehicle interior, according to aspects of the present disclosure.

Referring to FIG. 2B, a computer-implemented process 220 is illustrated, for controlling an environment of a vehicle interior. The computer-implemented process 220 can be carried out, for instance, by the controller 104 executing computer code 150 stored in the memory 152 (FIG. 1B). Moreover, the process 220 can interact with any sensors, vehicle features, functions, etc., described herein, e.g., with reference to any of the FIGURES, in any combination to carry out the above-defined three phase approach.

The process 220 comprises determining a vehicle state. For instance, the process 220 can read one or more sensor(s) at 222 and determine at 224, based upon the sensor reading(s), whether the vehicle is in use. If Yes (the vehicle is actively being used, e.g., traveling), then the process 220 loops back to the beginning, or the process 220 can sleep at 226, e.g., for a predetermined amount of time before re-checking the vehicle state. In alternative embodiments, the process 220 need not sleep or perform the determination at 224, e.g., such as where a supervisory controller initiates the process 220 responsive to the vehicle state indicating that the vehicle is not in use.

Example measurable conditions indicative of vehicle non-use include detecting that the engine is shut off, detecting that windows are closed, doors are closed, that the vehicle has been stationary for a predetermined amount of time (regardless of whether the engine is running), combinations thereof, etc.

The process determines at 228 whether the vehicle is occupied, e.g., based upon the obtained sensor information at 222, and optionally based upon other information available to the process. If the vehicle is determined to not be occupied (No), then the process loops back to the beginning, e.g., via the sleep/wait state at 224. Vehicle occupancy can be determined using any of the techniques set out herein. For instance, the process 220 can obtain weight data from vehicle weight sensors 114-FIG. 1B, and infer occupancy therefrom. Occupancy can also be detected using motion sensors, cameras and feature extraction, etc.

If an occupant is detected at 228 (Yes), the process determines at 230 whether a PDS is detected. The determination of PDS can be accomplished using any of the techniques set out in greater detail herein. If a PDS is not detected (No), then the process loops back to the beginning, e.g., via the sleep/wait state at 226. The above, thus correspond to Phase I as described herein.

The process 220 optionally performs a PDS elapse time count at 232, where the determination of a PDS at 230 is satisfied (Yes). The elapse time count can be used to provide an initial delay before processing further, e.g., to allow time for an occupant to exit the vehicle, to allow time for a driver or person to return to the vehicle, to start driving the vehicle, etc.

The process 220 then performs at 234, a risk and urgency assessment. In an example implementation, the process 220 can consult a table to assess risk level (R) and urgency level (U), or risk and urgency can be measured using a formula, set of variables, probability model, etc. In an illustrative implementation, the risk level R and urgency level U are treated as a variable pair (R,U). The process 220 determines at 236, another vehicle state. An example of a vehicle state check at 236 is to test whether both the engine and air conditioning are running.

If the determination at 236 is No, e.g., both engine and air conditioning not both running, then the process 220 evaluates at 238 the risk level and/or urgency level performed at 234. In an example embodiment, to simply analysis, the risk level and urgency level are broken down into binary levels, high (H) or low (L). In this example, the determination at 238 can evaluate whether at least one of risk level or urgency level is high (H). The process from at least 234 to 244 thus implements Phase II as described herein.

Actions described below, accordingly correspond to Phase III as described herein. For instance, if the determination at 238 is No, the process 220 can perform a first action at 240. If the determination at 238 is Yes, then the process 220 can perform a second action at 242. For purposes of illustration, a first action at 240 may comprise immediately sounding an alarm, e.g., vehicle horn or siren, the process 220 can also send a message/make a call, e.g., via a cellular gateway or cellular to IP bridge. The first action can also then enter a short wait state, e.g., 3 minutes, and if no response, then call 911, an emergency or other first responder. The second action at 242, e.g., where risk and/or urgency is high (H), i.e., determination at 238 is Yes, then a suitable action may be to immediately sound an alarm, horn, siren, etc., and also to call 911, an emergency contact, etc., and send a notification to an owner/responsible party that emergency help has been called.

On the other hand, e.g., where the determination at 236 is Yes, a determination at 244 is made based upon the measured risk level and urgency level. For instance, in an example implementation, if the risk level and urgency level are low, the process 220 may determine that there is no need to take an action, and process can loop back to the beginning, e.g., via the wait state 224, as described more fully herein.

On the other hand, where the determination at 244 is No, e.g., where at least one of risk level or urgency level is not low, then the process 220 can set action parameters at 246. Action parameters can include setting an action, a wait time to delay taking the action, etc. Moreover, the actions can be customized, e.g., based upon the PDS type, risk and urgency parameters, etc. Moreover, the action decisions can be augmented by additional information, e.g., GPS data, sensor data, etc.

The process 220 implements a wait time at 248. The wait time can be as short as 0 seconds, but can extend for a computed or previously determined time. An example embodiment looks at a maximum of 0 seconds, or a predefined time. For instance, the process 220 can compute the predefined time as the wait time-(current time-action begin time). Here, the being time is the beginning time of the action(s) selected at 246.

The process 220 then performs the action(s) at 250. In an example embodiment, the process 220 uses action parameters, as well as command and control instructions to issue operational commands for one or more actions. Here, actions can be the same or different for each cyclical loop through this process 220 responsive to the PDS.

The process 220 logs the actions at 252. In an example embodiment, the process 220 records a current action, current system time, etc., into event logs 134 that are stored in memory 152 of the vehicle. In some embodiments, the processes carried out at 240 and/or 242 can flow to the log at 252 so as to maintain a cyclically recurring loop that continues, e.g., until the PDS is resolved, the occupants exit the vehicle, the vehicle is driven, etc.

By way of example, the following system events are chronologically recorded into system's event log as they occur, along with the time stamp of the event: sensor value change, PDS type change, risk level change, urgency level change, action execution, action parameters, each of executed steps of actions, any other useful information.

The process 220 updates at 254, an elapsed time count associated with the PDS.

The process 220 then updates sensor information at 256, e.g., by obtaining sensor data from one or more sensors.

The process 220 re-assesses the risk level and urgency level at 258 so as to derive updated measures of risk and urgency.

The process 220 can optionally make a determination at 260 whether the PDS is related to air quality, e.g., too much carbon monoxide, too little oxygen, etc. If a determination is made at 260 that the PDS is not related to air quality (No), then the process 220 can loop back to the decision at 236. On the other hand, if the PDS is directed to air quality (Yes), then the process 220 determines another vehicle state at 262.

An example vehicle state at 262 is to determine whether a command has been issued to the engine and/or air conditioning to run. If the determination at 262 is Yes, then the process 220 once again loops back to the decision at 236. On the other hand, if the decision at 262 is No, the process 220 can loop back to the determination at 244.

In this regard, the process 220 executes a cyclically recurring loop based upon a dynamic cadence to iteratively monitor the PDS, evaluate and update risk and urgency measurements, set and implement actions, which can include any combination of modifying vehicle environmental conditions, calling for assistance, etc., as set out more fully herein.

In some embodiments, a logical flow of sequence can be interrupted and/or stopped/suspended based upon an external event, e.g., a vehicle door is opened, a window is opened/broken, the vehicle is started and driven, etc. In the case of system events such that the engine, air conditioning, etc., involuntarily stops working, e.g., failure, risk and/or urgency measurements may escalate to high levels, e.g., such that the process 220 jumps to the second action at 242, or takes similar drastic action.

In example implementations, the process 220 serves as a template that can address all PDS types. Here, the individual action(s), risk and urgency evaluations, etc. are distinguished, e.g., based upon selecting appropriate parameters and parameter values.

Third Example Approach for Controlling an Environment of a Vehicle Interior

Figure 2C:
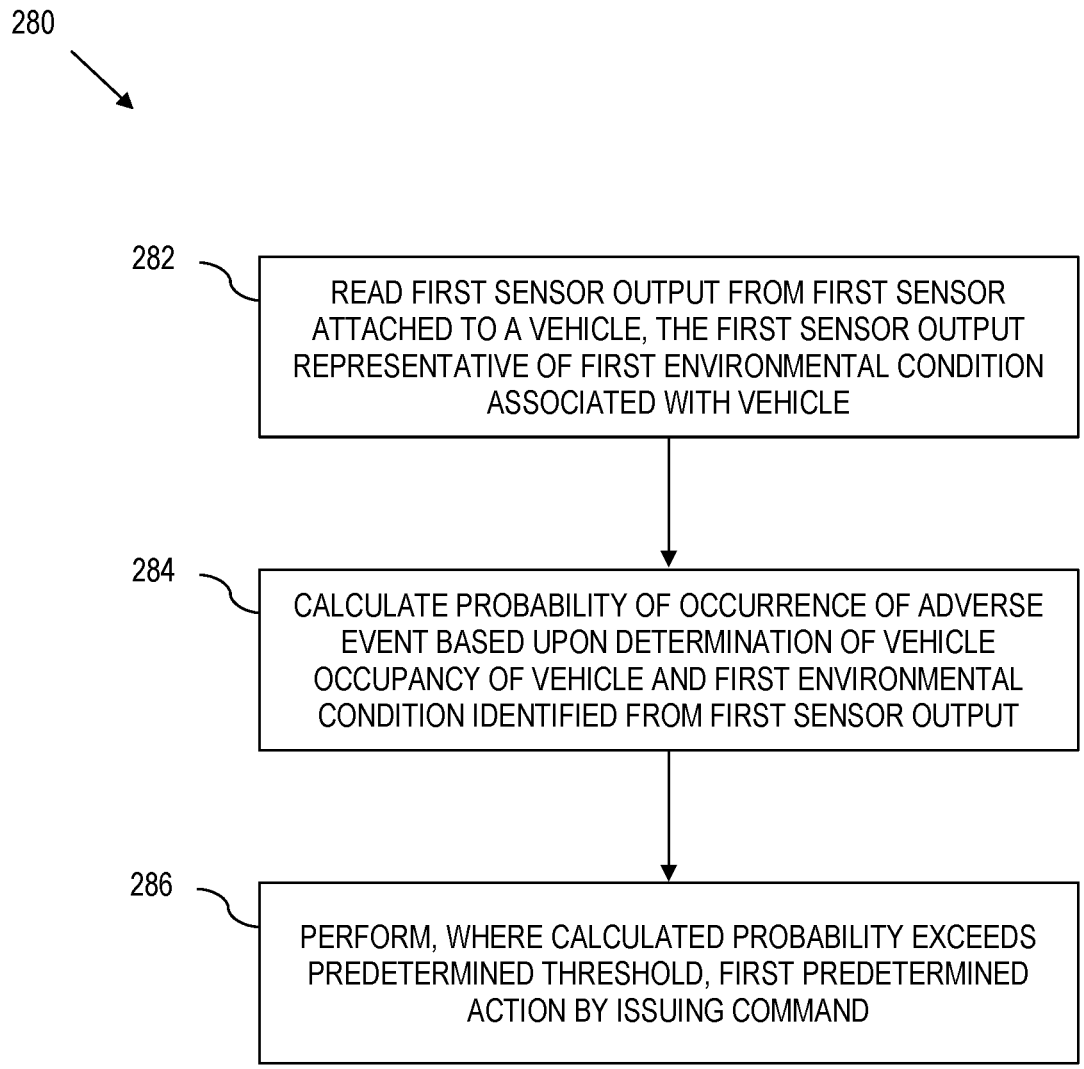
FIG. 2C is a flowchart illustrating yet another computer-implemented process for controlling an environment of a vehicle interior, according to aspects of the present disclosure.

Referring to FIG. 2C, a process 280 illustrates another computer-implemented process of controlling an environment of a vehicle interior. The computer-implemented process 280 can be carried out, for instance, by the controller 104 executing computer code 150 stored in the memory 152 (FIG. 1B). Moreover, the process 280 can interact with any sensors, vehicle modules, functions, etc., described herein, e.g., with reference to any of the FIGURES herein, in any combination to carry out the above-defined three phase approach.

For instance, the process 280 can be implemented by the controller 104 (FIG. 1B), where either an engine of the vehicle is off or the engine is running but the vehicle is stationary (creating a condition for a potential PDS). In this regard, the process 280 can interact with any sensors, vehicle modules, functions, etc., described herein, e.g., with reference to any of the FIGURES herein, in any combination.

The process 280 comprises reading, at 282, a first sensor output from a first sensor attached to a vehicle, where the first sensor output is representative of a first environmental condition associated with the vehicle. The sensor could include a temperature sensor, air quality sensor, etc.

The process 280 also comprises calculating, at 284, a probability of occurrence of an adverse event based upon a determination of vehicle occupancy of the vehicle and the first environmental condition identified from the first sensor output. This corresponds to a predictive and/or probabilistic approach to detecting a PDS, as described more fully herein. Here, Phase I and Phase II can be conceptualized as being rolled together in a predictive approach that combines probability with predicted outcome that has a similar flow to the risk/urgency approach herein.

The process 280 still further comprises performing, at 286, where the calculated probability exceeds a predetermined threshold, a first predetermined action. This corresponds to Phase III. By way of example, the first predetermined action can comprise issuing a command to control at least one of an engine (e.g., by sending a command to an engine controller); a window (e.g., by sending a command to a window controller/motor); and a heating, ventilation and air conditioning (HVAC) unit (e.g., by sending a command to an HVAC controller). Here, the first predetermined action modifies an environmental condition of the vehicle interior. The process 280 can also issue an alarm, send a communication via a communication device, etc. The timing of the action, and the details of the action can be controlled for instance, by evaluating a risk level and urgency level as described more fully herein. However, such is not required.

In an example embodiment, calculating, at 284, a probability of occurrence of the adverse event comprises defining a first probability zone as a first range of probability of occurrence of an adverse event, defining a second probability zone as a second range of probability of occurrence of the adverse event, and determining a current position within select one of the first probability zone, and the second probability zone.

Zones

As noted in greater detail herein, a PDS can be determined based upon actual measurement, e.g., a temperature measurement indicative of an excessive temperature. Alternatively, the PDS can be inferred based upon probability and/or predicted based upon a likelihood of an immediately future occurrence.

Figure 3A:
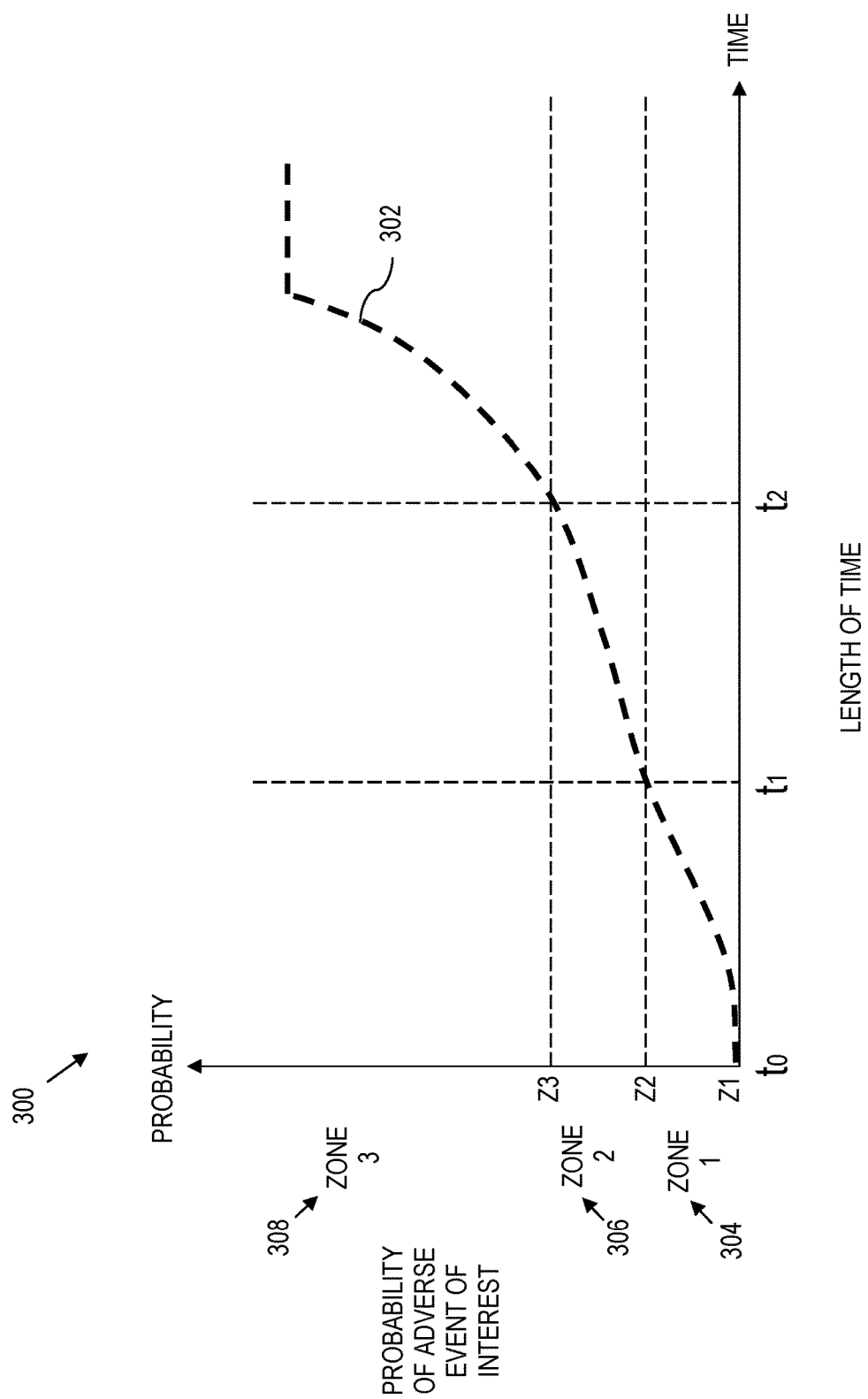
FIG. 3A is a zone graph illustrating an example mapping of zones, according to aspects of the present disclosure.

Referring to FIG. 3A, a zone graph 300 illustrates the concept of zones according to various embodiments of the present disclosure. A trend line 302 illustrates the relationship between time (the x-axis) and the probability of an adverse event/PDS (y-axis). Time zones (i.e., first time zone, second time zone, etc.) represent windows of time between the various probability zones (i.e., first probability zone 304, second probability zone 306, and third probability zone 308). Each time zone is delineated between the time functions in FIG. 3A (i.e., the first time zone is between t0 and t1, the second time zone is between t1 and t2, etc.). Each probability zone represents a range of probability of risk to an occupant of the vehicle. The first probability zone 304 represents the lowest risk to the occupant of the vehicle; the second probability zone 306 represents a higher risk than the first probability zone 204; and the third probability zone 308 represents the highest to the occupant of the vehicle.

In certain embodiments, the time zones (urgency level) are not static. Rather, the time zones are dynamically calculated in real time based on the surrounding circumstances relating to the vehicle interior. In the non-limiting example embodiment illustrated in FIG. 3A, the first probability zone 304 is situated between 0.0 and 0.2 on the probability axis, the second probability zone 306 is situated between 0.21 and 0.4, and the third probability zone 308 is any number higher than 0.4. In practice, other probability thresholds can be set.

Figure 3B:
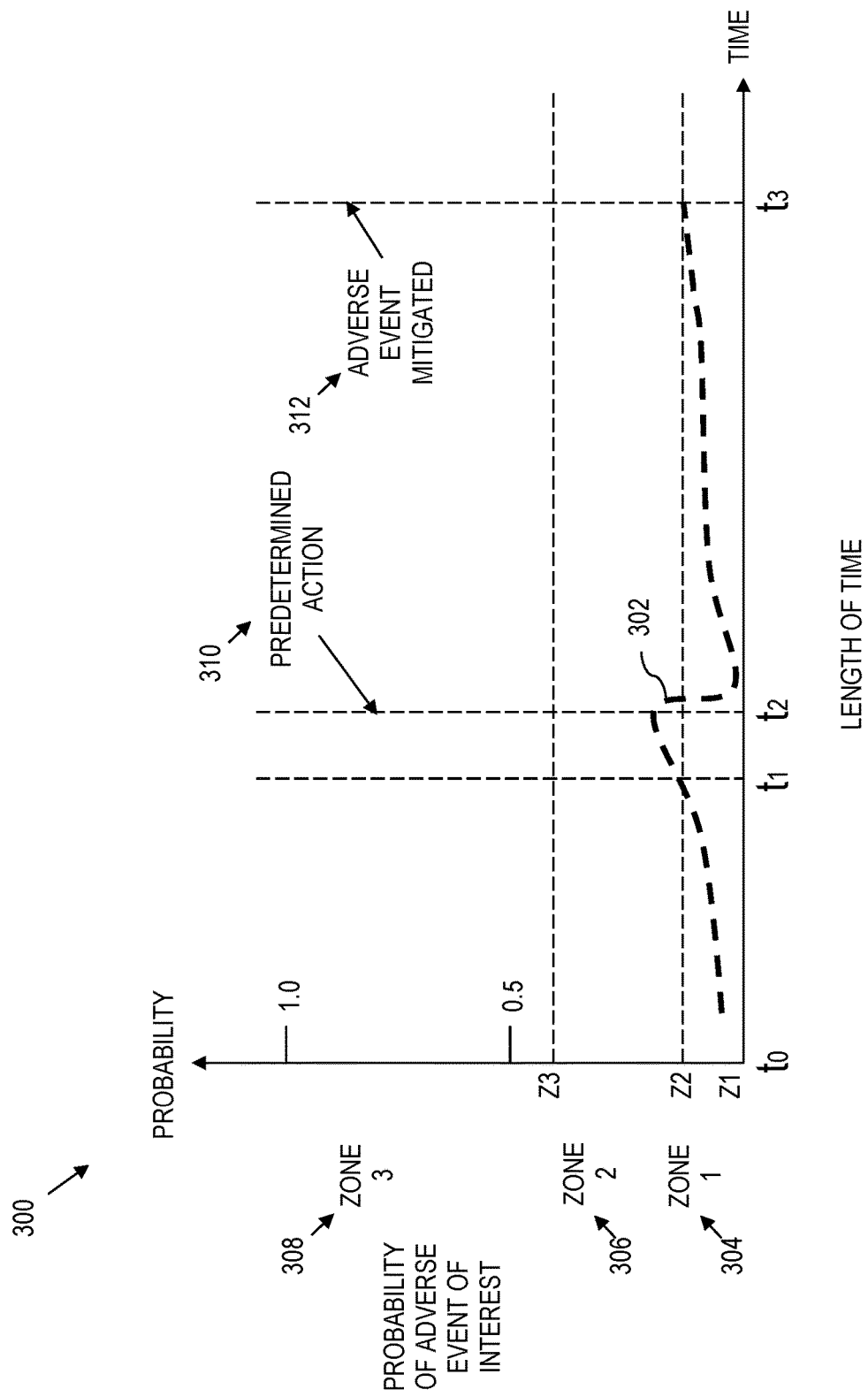
FIG. 3B is an alternate zone graph illustrating an alternative example mapping of zones, according to aspects of the present disclosure.

FIG. 3B illustrates another example zone graph illustrating different time zones and trend line compared to the example of FIG. 3A. In the example illustrated by 3B, from t0 to t1, the trend line 302 shows the calculation in the first probability zone, and thus no action is taken. From t1 to t2, the trend line 302 extends into the second probability zone 306 and remains in the second probability zone for (t2–t1). As a result, the predetermined action 310 is performed at t2, which results in the trend line 302 re-entering the first probability zone 304. In this example, since the environmental condition did not resolve, the trend line 302 again begins to ascend toward the second probability zone 306 after the predetermined action 310 has taken place. However, the control algorithm has persisted the vehicle in the first probability zone (low risk/low urgency) from t0 to t3. at t3, if the PDS is mitigated 312, then the PDS is resolved. Otherwise, another action can be taken, and the process can repeat in a cyclical, and recurring manner to extend the time that the trend line remains in the first probability zone 304, and if that is not possible, the control algorithm can extend the time that the trend line 302 remains out of the third probability zone 308.

Figure 3C:
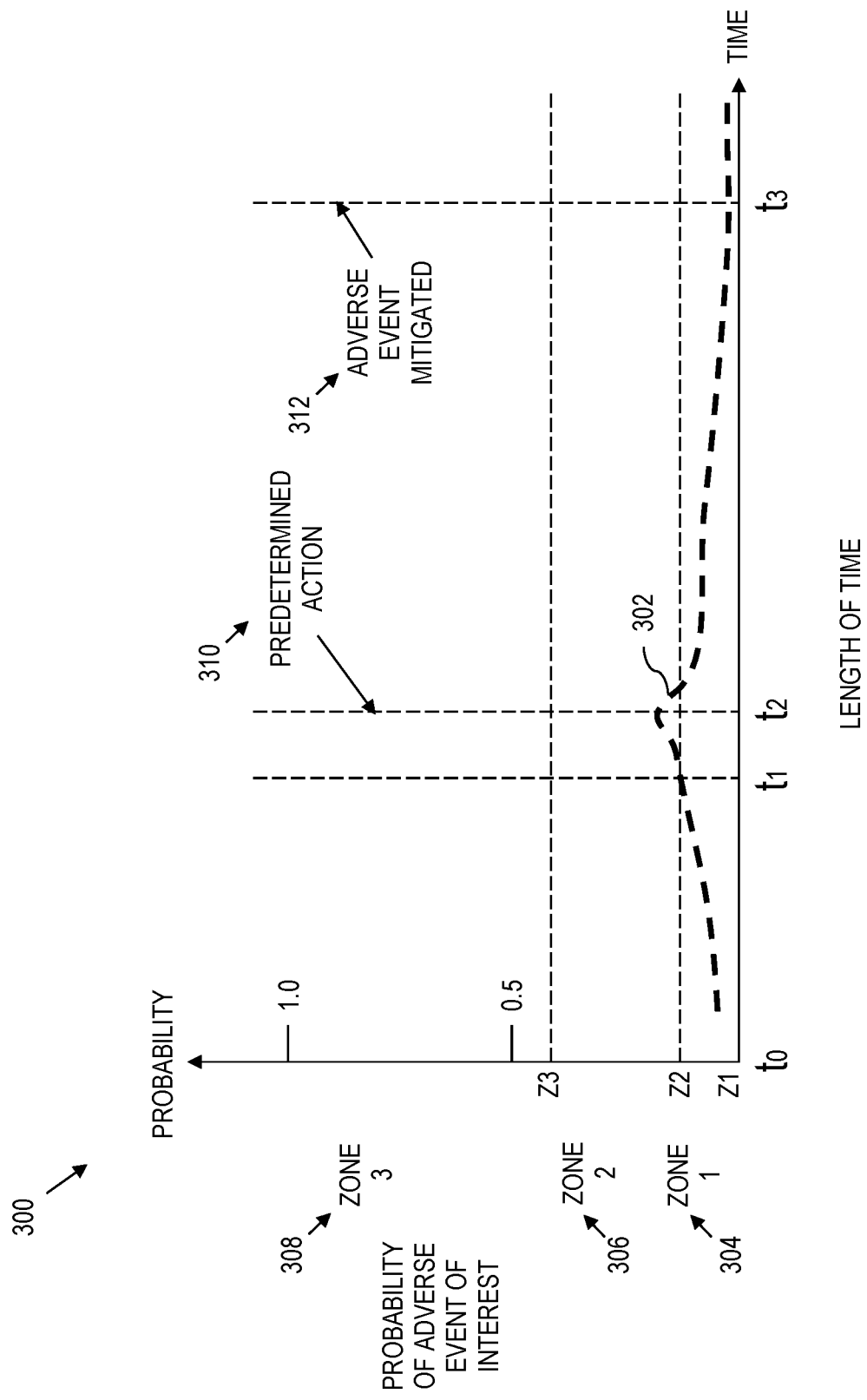
FIG. 3C is an alternate zone graph illustrating an alternative example mapping of zones, according to aspects of the present disclosure.

FIG. 3C illustrates another example zone graph illustrating different time zone and trend line compared to the example of FIG. 3B. The difference between 3B and 3C is that the predetermined action 310 remediates or at least mitigates the PDS, so trend line 302 has re-enters the first probability zone 304 at t2 and remains in the first probability zone 304 even past t3. This results in the trend line 302 steadily declining instead of ascending as in the case of FIG. 3B.

Fourth Example for Controlling an Environment of a Vehicle Interior

Figure 3D:
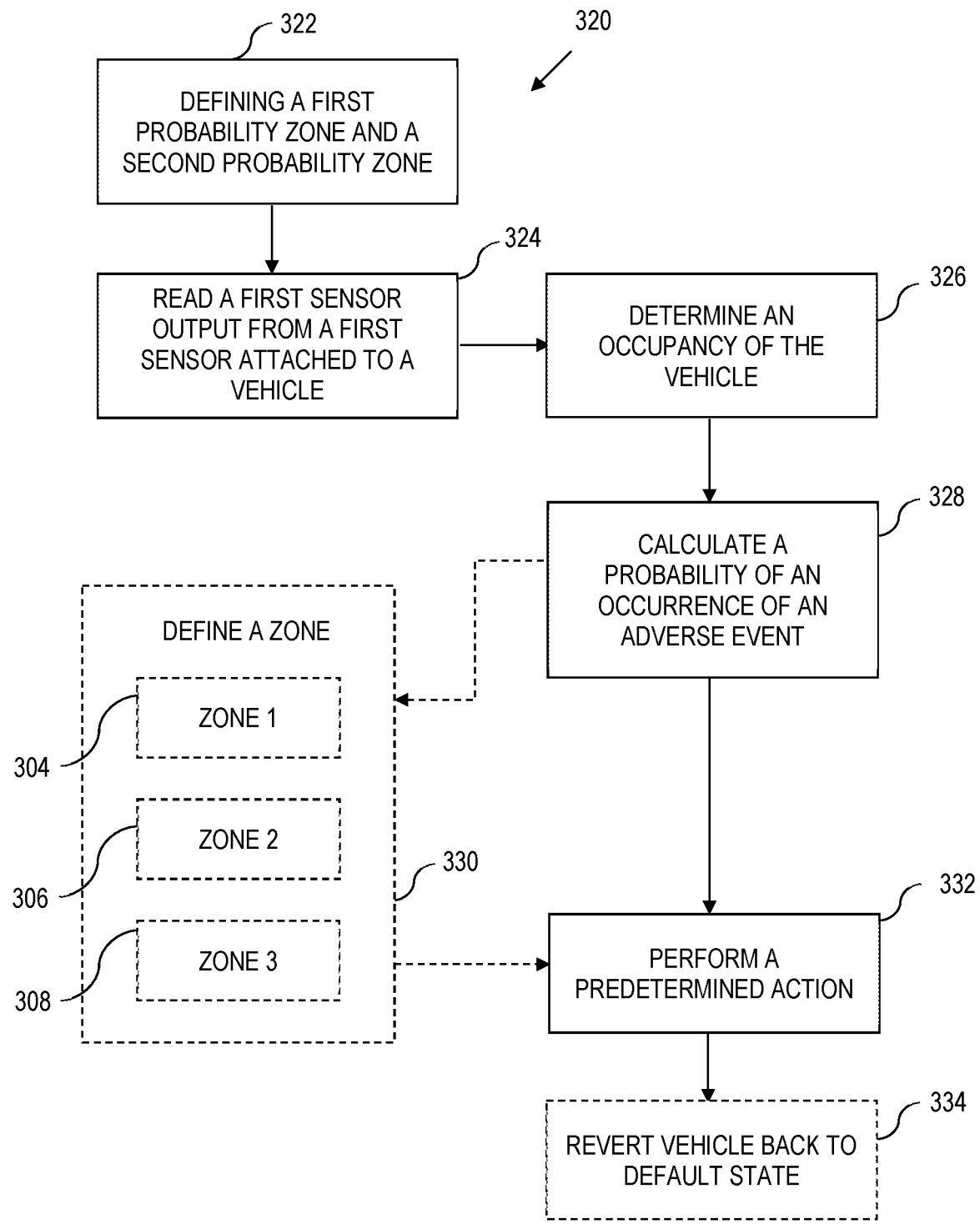
FIG. 3D is a flow chart illustrating a process for controlling an environment of a vehicle interior based upon probability, according to aspects herein.

Referring to FIG. 3D, a computer-implemented process 320 for controlling an environment of a vehicle interior is provided. The process 320 can be carried out, for instance, by the controller 104 executing computer code 150 stored in the memory 152 (FIG. 1B). Moreover, the process 320 can interact with any sensors, vehicle modules, functions, etc., described herein, e.g., with reference to any of the preceding FIGURES, in any combination to carry out the above-defined three phase approach.

The process 320 comprises defining at 322 a first probability zone as a first range of probability of occurrence of an adverse event (PDS), and a second probability zone as a second range of probability of occurrence of the adverse event (PDS). In example implementations, the first and second probability zones are the same as the first and second probability zones illustrated in FIGS. 3A-3C.

Further, the process 320 comprises reading at 324 a first sensor output from a first sensor attached to a vehicle, the first sensor output representative of a first environmental condition associated with the vehicle.

The vehicle's sensors may be configured to take readings of the environment both inside the vehicle, and outside the vehicle as described more fully herein. Further, the sensors may take readings continuously, or intermittently (irrespective as to whether the vehicle's engine is active).

The process further comprises determining at 326 an occupancy of the vehicle. In certain embodiments, determining the occupancy of the vehicle comprises determining a presence of a person in the vehicle, and determining whether the detected person is an adult or child by determining whether a weight of the person exceeds a predetermined threshold.

The process 320 also comprises calculating at 328 a probability of occurrence of the adverse event (e.g., probability of a PDS) based upon the determined occupancy of the vehicle and the first environmental condition identified from the first sensor output. In various embodiments, the calculation will determine which probability zone the vehicle occupant is in. Analogous to the process of FIG. 2C, here, Phase I and Phase II are rolled into 322-328.

Moreover, the process comprises performing at 332, by a processor, a first predetermined action to modify an environmental condition of the vehicle interior by issuing a command to at least one of: an engine (e.g., via commands to an engine controller), a window (e.g., via commands to a window controller/motor), and a heating, ventilation and air conditioning (HVAC) unit (e.g., via commands to an HVAC controller). The process can also trigger an alarm, and a communication where the calculated probability is in the second probability zone 306.

For the purpose of this disclosure, a predetermined action on the vehicle interior includes (but is not limited to) any of the techniques as set out more fully herein.

The process can comprise performing a first predetermined action if the person is an adult, and a second predetermined action different from the first predetermined action if the person is a child. In various embodiments, the predetermined threshold to determine whether a larger person (e.g., an adult) is in the vehicle is 70 pounds or greater, e.g., using the weight sensors 114.

In addition, the process 320 may include embodiments further comprising computing a first time zone as a range of time from an initial triggering event, computing a second time zone adjacent to the first time zone; and determining a current position from select one of the first time zone and the second time zone. In such embodiments, performing the first predetermined action may comprise only performing the first predetermined action where (a) the calculated probability is in the second probability zone 306 and (b) the calculated probability occurred in the second time zone. In further such embodiments, performing the first predetermined action comprises performing at least two different actions where each different action is based upon the calculated probability and the current position within the second time zone.

For example, a vehicle that is placed in direct sunlight for a prolonged period of time is likely to have a hot interior. When a vehicle occupant enters the vehicle, the temperature of the hot interior may place the vehicle interior in a high probability zone (e.g., the second probability zone). However, a few minutes in the high probability zone is not likely to present significant risk. If however, time continues to elapse and the vehicle interior does not go down to a lower probability zone, the process may perform a predetermined action.

In various other embodiments, the process 320 further comprises defining a third probability zone as a third range of probability of occurrence of the adverse event.

Some embodiments can set a minimum time before a particular predetermined action is taken. For example, the process may repeat an analysis twice before taking action. Such embodiments would prevent a premature action or false positive, which may decrease the likelihood that a vehicle owner will deactivate the process out of frustration.

The following is a working example of an embodiment corresponding to FIG. 3D. In this example, assume that the vehicle 102 is parked, and the weight sensor 114 has detected an occupant within the vehicle 102. Other vehicle sensors such as the motion sensor 108 or infrared sensor 110 can confirm, corroborate, substantiate, verify, etc., the detection of the occupant. The other vehicle sensors such as the temperature 106 and air quality sensors 112 may continuously or periodically take readings from the environment, which are considered by the algorithm. Based on the sensor readings, the process determines that the vehicle occupant is within the first probability zone 304, and that no predetermined action 332 is necessary. For instance, assume that the temperature is within a predetermined range, e.g., 70 degrees Fahrenheit (about 21.1 degrees Celsius), and the air quality is acceptable. This results in a relatively low probability of an adverse event.

If the situation changes, such as a significant increase in temperature, then the increased temperature will act as a triggering event for the calculation. FIG. 3A is a visual representation of that calculation. The process will dynamically establish the time zones based on a variety of factors such as the current temperature, the rate of increase of the temperature, the known physical characteristics of the vehicle, vehicle occupant, etc. As a working example, assume that the first time zone (between t0 and t1) is 15 minutes. After 15 minutes has elapsed, assume that the process determines that the vehicle occupant is now within the second probability zone 306, which has a higher degree of risk to the vehicle occupant. At this point, the process may determine that a predetermined action 310 is necessary. As a result, the process may activate the engine via the engine controller 124 and HVAC system via the HVAC controller 126 to cool down the cabin temperature. The process may also and/or alternatively decide to lower the window(s), e.g., 4 inches (10.16 cm). Alternatively, the process can wait until the third probability zone 308 to take action.

By lowering the windows, or activating the HVAC system, the situation that was initially categorized as within the second probability zone 306 can transition to the first probability zone 304 as the probability of an adverse event (e.g., excessive temperature) drops. This result can be visualized in various ways. One way to visualize this result is that the predetermined action 332 changes the course of the trend line 302 from an upward trajectory to a downward trajectory back toward the first probability zone 304. FIG. 3B and FIG. 3C are illustrations of that visualization. Once the trend line 302 crossed into the second probability zone 306, the process performed a predetermined action 310 and intervened. As a result, the trend line 302 descends to the first probability zone 304. This provides the vehicle occupant with more time to resolve the situation.

Alternatively, this result may be viewed as a mechanism for expanding (or stretching) the time zone between t0 and t1, which effectively puts the situation back into the first probability zone 304.

In certain scenarios, vehicles typically have a finite supply of energy (gas, battery, etc.). Therefore, certain embodiments balance an optimization of energy with a rate at which the system tries to transition down into a less severe state (by lowering a probability of adverse event) when performing the predetermined action. For example, systematically and strategically raising and lowering the windows may reduce the duration within the third probability zone 308 (extend the time periods in a lower zone) relative to controlling the vehicle's air conditioning if running the HVAC will exhaust the available energy of the vehicle. That is, the algorithm may tolerate a slightly higher cabin temperature if it means maintaining the vehicle cabin temperature within an acceptable window of temperatures that are below a maximum temperature threshold for a relatively longer time than what would be realized by running the air conditioning on high until the vehicle's energy is depleted.

Said differently, the process can dynamically calculate which action, or set of actions, is most appropriate based on the totality of the situation.

In various embodiments, performing, by the processor, a predetermined action comprises manipulating the environmental condition in a manner to remain outside of the third probability zone 308. For example, there may be situations where it may not be possible to take an action that is sufficient enough to remain in the first probability zone 304. In such a case, the process will prioritize taking actions that keep the situation out of the third probability zone 308 in the most efficient way possible based on the resources of the vehicle.

In particular embodiments, the process further comprises reverting at 334 the vehicle back to a default state after performing, by a processor, a predetermined action to modify an environmental condition of the vehicle interior.

Reverting the vehicle back to the default state can be beneficial in certain embodiments. For example, lowering a window in order to reduce the interior temperature of a hot vehicle may introduce other potential risks, such as theft, kidnapping, or carjacking as a result of the window being lowered. Reverting the vehicle back to the default state (e.g., raising the windows) after the environmental condition has been mitigated or eliminated may reduce the subsequently introduced dangers mentioned above. In various embodiments, the process 320 will not open the vehicle doors under any circumstances.

Fifth Example for Controlling an Environment of a Vehicle Interior

Figure 4:
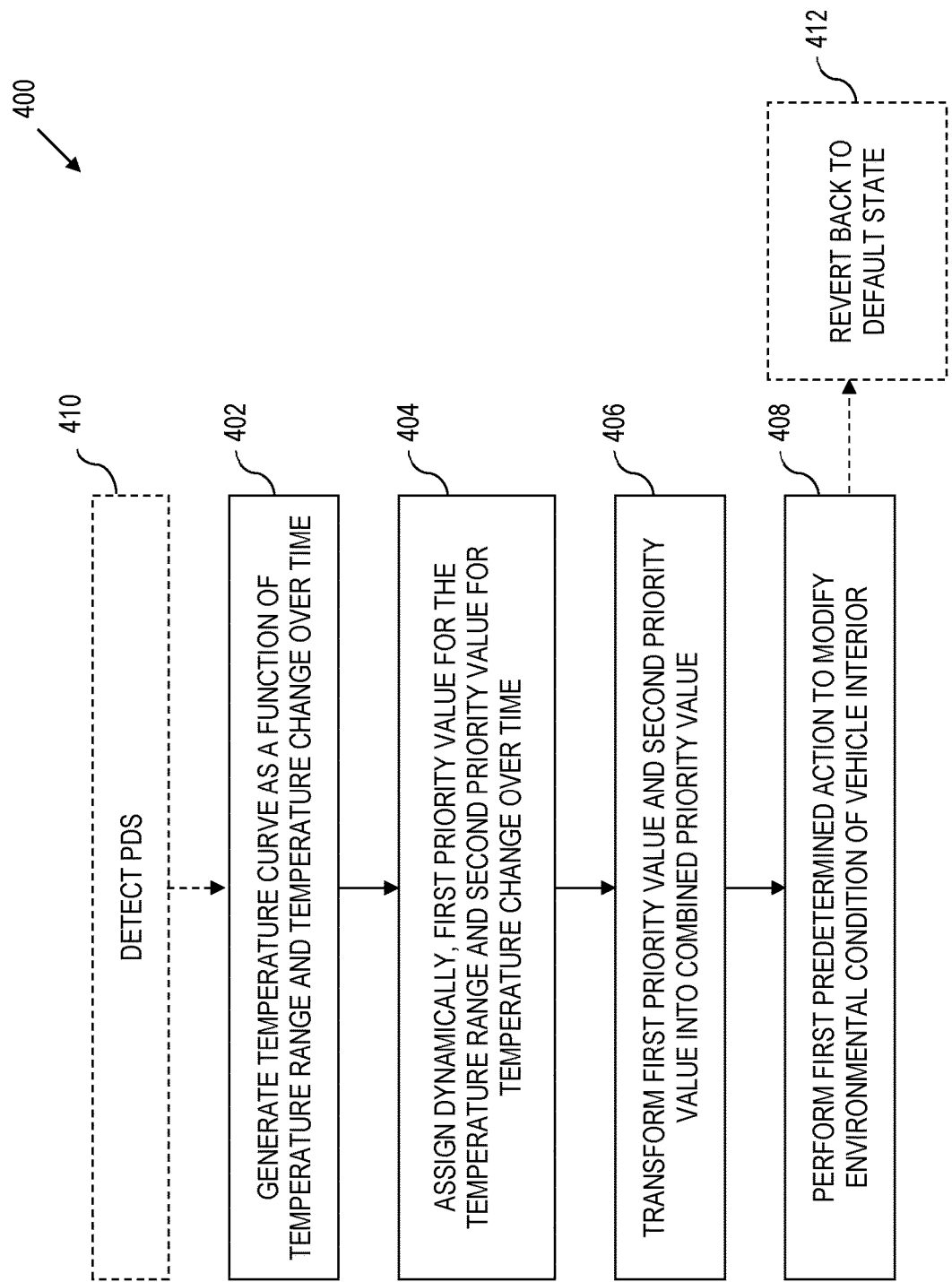
FIG. 4 is a flowchart illustrating another computer-implemented process for controlling an environment of a vehicle interior, according to aspects of the present disclosure.

Referring to FIG. 4, a process 400 for controlling an environment of a vehicle interior is disclosed. The process 400 can be carried out, for instance, by the controller 104 executing computer code 150 stored in the memory 152 (FIG. 1B). Moreover, the process 400 can interact with any sensors, vehicle modules, functions, etc., described herein, e.g., with reference to any of the preceding FIGURES, in any combination to carry out the above-defined three phase approach.

The process 400 comprises generating at 402 a temperature curve for the vehicle interior (e.g., using knowledge of the greenhouse effect), based on a measured environmental condition, wherein the temperature curve is a function of a temperature range and temperature change over time. With regard to the measured environmental condition, a wide variety of sensors can be used to measure multiple aspects of the environment. In this regard, the vehicle need not compute the curve. Rather, the vehicle can generate the temperature curve by accessing data stored in memory that is indicative of a corresponding temperature curve, e.g., by accessing a data table, etc.

Further, the process 400 comprises assigning dynamically, at 404, based upon the generated temperature curve, a first priority value for the temperature range and a second priority value for temperature change over time. Both the first priority value and the second priority value may vary with respect to complexity. For instance, priority values may be binary (e.g., High or Low) or based on range (priority level 1-5). As described in better detail below, priority values enable change (i.e., dynamic) behavior based on circumstances in real-time.

Moreover, the process 400 comprises transforming at 406 the first priority value and the second priority value into a combined priority value. Priority values alone, while useful, may not provide all of the information that the process 400 needs to respond appropriately to a specific environmental condition. The combined priority value allows the process 400 to account for multiple variables with respect to the specific environmental condition to create a non-binary, parameter-based, solution. Further details with respect to priority values are disclosed herein.

Yet further, the process 400 comprises performing at 408, based on the combined priority value, a first predetermined action to modify an environmental condition of the vehicle interior, by issuing a command to at least one of an engine controller, a window controller, a heating, ventilation and air conditioning (HVAC) controller, an alarm, and a communication device.

In various embodiments, the process 400 may comprise, initially performing detecting a PDS at 410. Detecting a PDS can be carried out using any techniques described herein, including verifying an occupancy of the vehicle interior based on a first sensor output.

In practical embodiments, one or more steps in the process 400 can repeat iteratively, e.g., in a cyclically recurring loop, e.g., until a detected PDS is resolved.

In various embodiments, the process 400 comprises reverting at 412 the vehicle back to a default state after performing the first action to modify an environmental condition of the vehicle interior.

Action Plug and Play

Any of the above-processes can be implemented in a templated form. In this regard, the actions (Phase III) can be further implemented in an "action plug-and-play" (plug-n-play) can be used to progammably plug in predefined actions based on risk type and action needs. In an example embodiment of an action plug-and-play, a set of actions designed to alleviate (prevent, mitigate, remediate, etc.) each monitored PDS (e.g., excess heat, excess cold, air quality, etc.) are stored in memory. A select plug-and-play action is selected and deployed, based on process variables available to the control algorithm, e.g., measured risk, urgency, the environmental condition determined by the determined PDS, etc.

Besides the benefit of handling multiple (e.g., three in the illustrative example) different types of PDS with uniform ease by the framework, action Plug and Play also makes it easy to adopt new set of actions when additional PDS types are defined and handled by the system.

The Greenhouse Effect

The sun's energy can enter and exit through windows of a vehicle, which can trap some of the energy, thus making an interior temperature of the vehicle warmer than an external temperature outside of the vehicle.

Despite different starting points of temperature, the rising interior temperature curves in similar weather condition can exhibit a fairly consistent pattern, and will ultimately hit a ceiling in which the temperature no longer rises.

For instance, with sunny skies, the interior temperature curve of a vehicle cabin first goes up rapidly, before its slope gradually flattens off. That is, the slopes of interior temperature curves will at certain time point become 0 so long the exterior environment remains stable. Based on energy conservation principles of physics, it is not possible for interior temperature to rise indefinitely, so sooner or later, the curve will flatten out, or may even come down, depending on changes in exterior atmospheric conditions.

For the purpose of comparing interior temperature curves, temperature curves are normalized by setting external temperature as 0 degree Fahrenheit, and using the difference between interior and exterior temperatures as the value of interior temperature value that is above the exterior temperature, in Fahrenheit. Comparing normalized figures of sunny and overcast series, the upper bound of curves under overcast skies is significantly lower than the upper bound of curves under sunny skies.

For the case of an example vehicle, in the case of sunny days, in the first 5 minutes, the interior temperature can increase up to 22 degrees. In 5 minutes, the interior temperature can rise 49%, or, about half, between exterior temperature and interior temperature equilibrium. In the first 10 minutes, the interior temperature can increase by 27 degrees Fahrenheit. On average, in 10 minutes, the interior temperature rises 69%, or, about ⅔, between exterior temperature and interior temperature equilibrium (the expected max amount energy net gain).

In the first 15 minutes, the interior temperature can increase by 29 degrees Fahrenheit. On average, in 15 minutes, the interior temperature rises about 80% between exterior temperature and interior temperature equilibrium.

At around the 30 minute mark, the interior temperature increases by as much as 32 degrees Fahrenheit. The average interior temperature curve is very close (within 5%) to interior temperature equilibrium. We may designate the term "degree of interior space energy saturation" for this concept, which shall be expressed in percentage.

In the overcast conditions for the same example vehicle, in the first 5 minutes, the interior temperature can increase by 10 degrees Fahrenheit. On average, in 5 minutes the interior temperature rises over 50%, or, more than half, between exterior temperature and interior temperature equilibrium. Within the first 20 minutes the equilibrium is reached, which is about 19 degrees Fahrenheit above the exterior temperature.

The above examples are generalizations for purposes of illustration. There will be cases where the rising speed of interior temperature may be much faster or slower than the average, depending on the surrounding natural environment (e.g., time of the day, a cloud moves in, wind blows, exterior temperature changes, rain, humidity of the atmosphere, etc.). For instance, under different weather condition, the rate and speed of greenhouse heating progression may vary significantly, which in turn has a significant impact on the degree of severity for potential risk, and the level or urgency.

In some instances, the greenhouse effect can ultimately raise the interior temperature of a vehicle 32 degrees Fahrenheit +/−7 degrees warmer than external temperature outside of the vehicle. For example, if the external temperature is 45 degrees Fahrenheit (about 7.2 degrees Celsius), the interior of the vehicle can increase up to 87 degrees Fahrenheit (about 30.6 degrees Celsius), plus or minus 7 degrees.

Further, in addition to the interior temperature, another consideration is a rate of temperature change in the vehicle interior. The rate of temperature change is typically greatest when the internal vehicle temperature is furthest from its convergence/asymptote, and the rate of change converges to 0 as the vehicle internal temperature reaches its maximum limit/ceiling.

There are a variety of factors that may influence both the temperature range and the rate of temperature change within the vehicle interior. Factors can include weather, season (i.e., latitudinal angle between solar ecliptic plane and earth equator that the sun radiation shines on the vehicle), hour of the day (longitudinal angle between the direction of the sun and the local meridian plane of the vehicle location). Angle of radiation can also affect a distance that the radiation travels through the Earth atmosphere before reaching the vehicle. Longer distances through Earth atmosphere may result in the more energy absorbed and deflected by gaseous molecules of the atmosphere, thus weakens the energy level that reaches the vehicle on the ground.

In this regard, the orientation of the vehicle in regard to the direction of the sun can influence an angle between the solar radiation direction and a window of the vehicle.

Other factors that may influence temperature range and rate of temperature increase include the exterior temperature, whether or not the windows of the vehicle are tinted, humidity levels, wind speed, atmospheric conditions, difference between the interior temperature and the exterior temperature, and quality of insulation in the vehicle.

Risk/Urgency Modifier

For sunny days, an approximation model for the amount of solar energy reaching the ground level in daily cycles represents a bell curve that peaks at a particular time, e.g., 2 pm. This model can be used to predict a greenhouse curve rate and/or maximum temperature increase to approximate assessing risk and urgency. For instance, in a parameterized approach to determining risk and urgency, described below, the model can serve as a percentage scaler, or the model can be used to select among several possible tables of data/set points used to set the cadence/timing and/or actions.

Green House Heating Process Model

Figure 5:
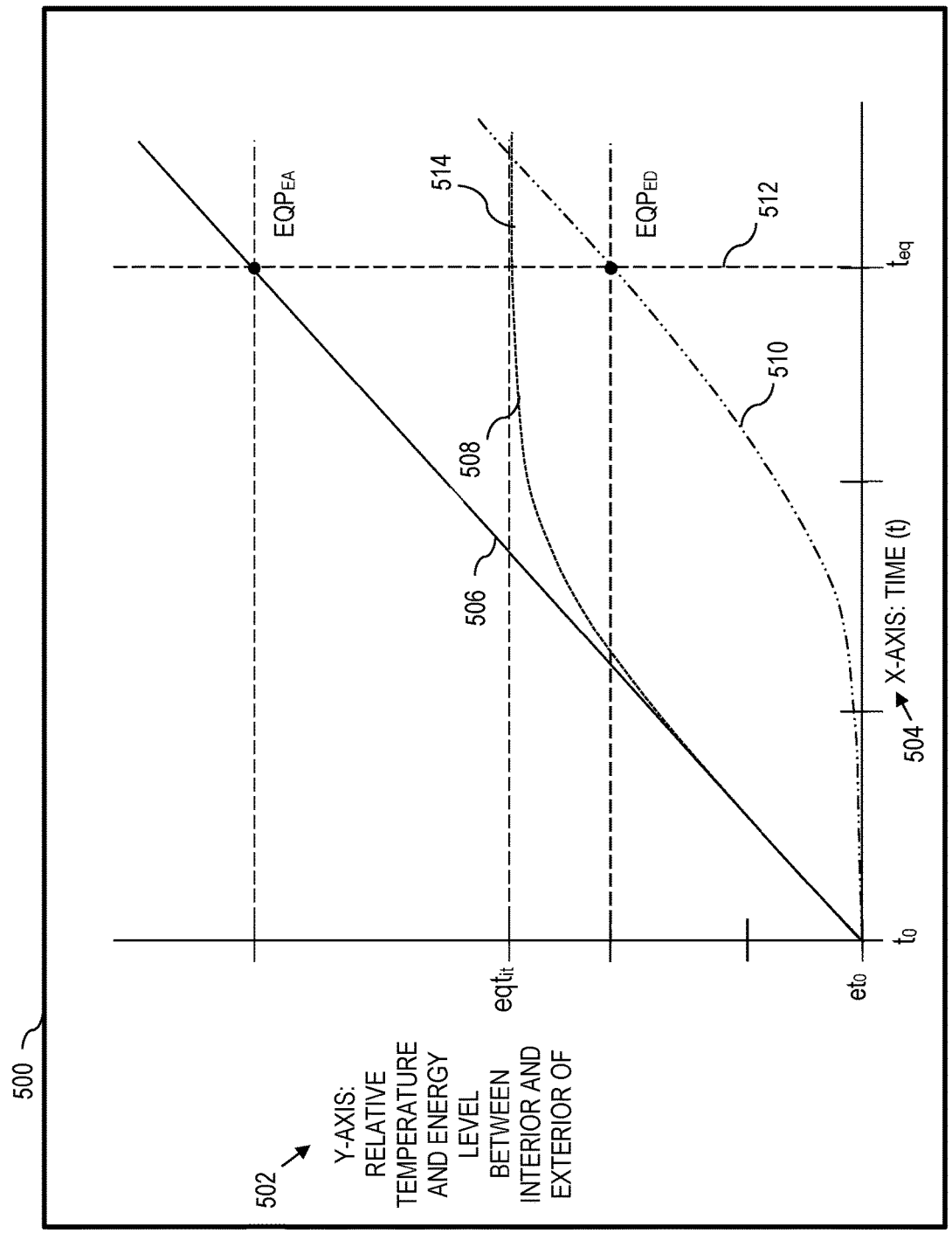
FIG. 5 is an example greenhouse heating model, according to aspects of the present disclosure.

Referring to FIG. 5, a greenhouse heating process model 500 is illustrated that can be used to generate a temperature curve (see reference number 402 in FIG. 4). The exterior temperature is used as a reference constant 0 degrees.

The greenhouse heating process model 500 is used to generate a graph, where a Y-axis 502 is relative energy/temperature between an interior and an exterior of a vehicle and an X-axis 504 is time ("t"). Since the temperature of the vehicle interior is largely dependent on the exterior temperature ("ET") of the vehicle, the greenhouse heating model 500 begins with ET at 0 (i.e., $ET_0$).

As energy is absorbed by the vehicle (e.g., through a window), as shown by the energy absorption ("EA") line 506, an interior temperature of the vehicle increases as shown by the interior temperature line 508. When the energy absorption rate (or, slope) and the energy dissipation rate converge to become equal, an equilibrium is reached between the two. Consequently, the interior temperature curve over exterior temperature becomes flat.

Even though the vehicle is continually absorbing energy, the vehicle also continually dissipates energy as shown by the energy dissipation ("ED") line 510.

Energy absorption and energy dissipation that generally remain consistent will eventually reach an energy exchange equilibrium as shown at 512 ($t_{eq}$). As a result, the interior temperature line 508 begins to level off and achieve an interior temperature equilibrium ($eqt_{it}$) as shown at 514.

When the interior temperature equilibrium is achieved, in terms of time, can be influenced based on a variety of factors. For example, dissipation of energy can be influenced by vehicle insulation (wall panels, vehicle flooring, etc.). Better insulated vehicles may delay energy dissipation and retain more energy, thus causing the interior temperature of the vehicle to increase at a higher rate. In other words, due to longer latency in energy dissipation, better insulated vehicles may increase the time it takes for the interior temperature to stop rising and reach its equilibrium.

Further, since the greenhouse heating process model 500 tends to remain consistent across a wide variety of temperatures, aspects of the present disclosure can use this information along with real-time environmental variables to dynamically implement solutions that accurately track what is actually happening in the vehicle.

In this greenhouse heating process model 500, given time t, energy absorption at time t is the total cumulative amount of solar energy vehicle interior has absorbed since time t0. Because the graph assumes that the external environment is very stable, the energy absorption curve appears to be linear. Energy dissipation at time t is the total cumulative amount of energy vehicle has dissipated into its exterior environment since time t0. Interior temperature is the temperature of the vehicle interior at time t. The interior temperature curve is the net total amount of energy the vehicle interior space has retained in time. This can be expressed as, at time t, interior temperature($t$)=energy absorption($t$)−energy dissipation($t$)

EQPEA is the equilibrium point for energy absorption; $EQP_{ED}$ is the equilibrium point for energy dissipation. These two equilibrium points must occur simultaneously in time, when the rates of their curve slopes converge to the same value, where such time is denoted as teq. When this convergence occurs, the interior temperature reaches its equilibrium level, the interior temperature curve becomes flat, and interior temperature equilibrium has been reached at time teq. Note the value of Interior temperature equilibrium is the difference between energy absorption and energy dissipation at time teq, or, the difference between Y-axis values of $EQP_{EA}$ and $EQP_{ED}$, i.e., Interior temperature equilibrium=energy absorption (teq)−energy dissipation(teq)

In real life situations, the curves in the heating process equilibrium model chart may stretch or compress along the time dimension/axis, i.e., their slopes may vary, depending on the factors that determine the energy absorption and dissipation rates—but the basic pattern will prevail. Hence, as a result, the value of teq will vary accordingly. Similar reasoning and effect on the value of interior temperature equilibrium.

Note the value of vehicle interior temperature equilibrium depends on the exterior temperature, the amount of solar energy entering vehicle interior, the wind speed, etc. However, the value of vehicle interior temperature equilibrium does not depend on the initial value of vehicle interior temperature.

In some embodiments, the greenhouse heating process model 500 can be scaled by knowledge of the time of day, season, weather conditions, etc. to predict actual internal vehicle temperature under greenhouse conditions. In this regard, the bell curve model discussed above can interact with the greenhouse heating process model 500 to generate a curve useful by the control algorithm herein. Moreover, confidence can be increased by confirming sensor data with external data, e.g., by using an app or query to a weather service to obtain local weather conditions.

Working Example—Detecting a PDS Occurrence

In an example implementation, there are at least three PDS-types: excessively high temperature (leading to a risk of heatstroke), excessively cold temperature (leading to a risk of hypothermia), and bad air (leading to a risk of asphyxia).

Heatstroke and hypothermia types are temperature related. For instance, a PDS that is related to an excessively high temperature can be declared when the internal cabin temperature exceeds a first predetermined temperature threshold, e.g., 80 degrees Fahrenheit (about 26.7 degrees Celsius), or where the internal cabin temperature is predicted to exceed the predetermined threshold (e.g., within a short timeframe).

Analogously, a PDS that is related to an excessively low temperature can be declared when the internal cabin temperature falls below a second predetermined temperature threshold, e.g., 55 degrees Fahrenheit (about 12.8 degrees Celsius), or where the internal cabin temperature is predicted to fall below the predetermined threshold (e.g., within a short timeframe).

A PDS related to bad air quality can occur where an obtained air quality measurement satisfies a predetermined air quality condition involving bad air quality. For instance, in a vehicle interior space there is high concentration of carbon monoxide (e.g., 5 parts per million or greater), or low oxygen content (less than 19%). Both cases will lead to deprivation of oxygen intake by living beings, such that in severe cases asphyxia may occur. Air quality can be detected in a vehicle using a carbon monoxide sensor, an oxygen sensor, combination thereof, etc.

Since bad air quality types of PDS can result in faster negative consequences, whenever bad air quality PDS and temperature related PDS co-exist, the control algorithm can prioritize a response to the bad air quality PDS with higher priority over the temperature PDS.

The above rules/techniques can be used, for instance, to detect a PDS at 202, 210 (FIG. 2A); 230, 260 (FIG. 2B); 284 (FIG. 2C); 328 (FIG. 3D); 410 (FIG. 4), etc.

Working Example—Risk and Urgency

In an example embodiment, the control algorithm carries out the assessment of risk level and urgency level based on a risk and urgency level assessment table. The use of a risk and urgency level assessment table allows the control algorithm to make queries into the table based upon known information, e.g., which can be derived from sensor readings, values extracted from other tables or models, other available data, etc.

In this regard, each PDS type can have its own assessment table or multiple tables. Moreover, each risk and urgency level assessment table can be filled in, e.g., programmed in the memory 152 (FIG. 1B) based upon pre-established criteria, or a risk and urgency level assessment table may be provided in complete or incomplete form, the actual values of which are populated as setpoints or selected parameter values by the control algorithm. This allows automated and autonomous generation of risk and urgency determination. By deploying the control algorithm using tables, e.g., implemented as an associative array in the system, later fine-tuning can be carried out merely by changing the data values in the table(s), and achieving the goal of changing system behavior, without the need to modify and update the code base of the system.

In example implementations, each risk and urgency level assessment table establishes and optionally pre-programs risk and urgency (e.g., expressed as Booleans such as Low/High, on a scale such as 1-5, or other meaningful measure) across a range of conditions. As noted more fully herein, Greenhouse effects can be influenced by a number of factors. In this regard, a single risk and urgency level assessment table can be used that takes into account conservative parameters that characterize Greenhouse effects. However, for a more nuanced approach, multiple risk and urgency level assessment tables can be provided, e.g., a table for sunny days, a table for cloudy days, a table for sunrise, a table for sunset, a table for evening, a table for each season, etc., as the application dictates. For even more nuance, a single table can be provided, e.g., a conservative table, which is modified, such as by a scalar, depending upon actual environmental conditions. For instance, a percentage multiplier can be used to increase or decrease certain parameter values in the table based upon measured sensor conditions.

As a few illustrative examples, the control algorithm can read a time from a clock, and use the time information to select a preprogrammed table, or scale the values of a table based upon the result. Where scaling is implemented, a scaling table can be used to scale the risk and urgency level assessment table, e.g., to take into account that the Greenhouse effects are less drastic at nighttime compared to daytime, etc. As another example, the control algorithm can utilize the bell curve/approximation model for the amount of solar energy, discussed above, to scale the risk and urgency level assessment table. As a few additional examples, the control algorithm can read a calendar/date to make seasonal adjustments in a manner analogous to that above.

Still further, the control algorithm can read a light sensor, camera, or other optical device to obtain a representation of the light conditions, and convert the light reading into a scalar to modify the risk and urgency level assessment table. As yet another example, the control algorithm can access weather information, e.g., from a weather feature in a vehicle infotainment system, from a Bluetooth device, from a vehicle radio, or other source to determine ambient conditions external to the vehicle, and convert that data to a scalar. Yet further, combinations of the above can be utilized by the control algorithm to convert sensor data/data inputs into information suitable to scale the risk and urgency level assessment table.

Thus, in some embodiments, the control algorithm can use sensor inputs and other available data, such as knowledge of time of day (via a clock), season (via a calendar), light conditions (e.g., via a lumen meter, light sensor, access to a weather service, etc.,) to scale the risk and urgency level assessment table. Thus, for example, in the case of a temperature-related PDS, the control algorithm can scale the maximum temperature increase, expected equilibrium rate, rate of temperature increase, time intervals, priority vales, or combinations thereof or both in the case of a temperature-related PDS. Likewise, for air quality PDS risk and urgency level assessment tables, the control algorithm can scale carbon monoxide (PPM) ranges, oxygen percentage ranges, risk level time parameters, risk and urgency parameters, combinations thereof Temperature Based Risk Level and Urgency Level Assessment Example Referring to FIG. 6A, a temperature-based risk level and urgency level assessment and prioritization table 600 is disclosed, which evaluates risk and urgency levels based upon sensor data and timing information. The table 600 can be used, for instance, to automate the determination of risk/urgency at 204 and 214 (FIG. 2A); risk and urgency 234, 258 (FIG. 2B); 404, 406 (FIG. 4), etc.

The assessment may take into account of season of the year, and time of the day, which are ready system data for vehicle's computing control system.

In practical applications, weather conditions (direct solar radiation, hazy, cloud, rain, etc.) exert significant influence on the patterns of vehicle greenhouse heating process. The control algorithm herein may exploit this in the risk and urgency assessment if an underlying vehicle model is equipped with exterior photo-sensing sensor.

The temperature assessment table 600 incorporates knowledge of the greenhouse effect and trends in the Greenhouse Heating Process Model (see FIG. 5) to assess temperature ranges and changes in temperature over time with respect to vehicle interiors. The temperature assessment table 600 includes a legend 602 that delineates both temperature range and changes in temperature over time as a high priority (H) or a low (L) priority. For example, if both temperature range and changes in temperature over time are considered as high priority, the combined prioritization value is H,H.

For simplicity and succinctness of this example, only two values for priority are used. Moreover, only one table is illustrated. However, practical implementations could assign m levels for risk assessment, and n levels for urgency assessment, where m, n are natural integers in the range of {2, 3, 4, . . . } and need not be the same; or multiple tables, or a table and scalar as described more fully herein.

The temperature assessment table 600 also comprises an exterior temperature section 604. The exterior temperature section 604 represents example temperatures ranges that a vehicle may encounter. The exterior temperature section 604 is divided into a low temperature (column A) and a high temperature (column B). An expected equilibrium range section 606, which is based on the exterior temperature section 604, estimates how high (or low) an interior temperature of the vehicle can be based off of the greenhouse heating model. The equilibrium range section 606 is divided into a low temperature (column C), a medium (e.g., average) temperature (column D), and a high temperature (column E). In the example, the interior temperature equilibrium range values are conservative, and presented for purposes of illustration.

Moreover, the temperature assessment table 600 includes a change in interior temperature over time section 608, which illustrates how many degrees the interior of the vehicle has increased in a predetermined time period, e.g., five-minute period. Column F represents less than a five-degree temperature change in the five-minute period, column G represents a six to nine-degree temperature change in the five-minute period, column H represents a ten to nineteen temperature change in the five-minute period, and column I represents a twenty degree or higher temperature change in the five-minute period.

Based on the expected equilibrium range section 606 and the change in interior temperature over time section 408, priority values can be assigned.

For example, in interior temperature section 604 column A, when reading from left to right across the temperature assessment table 600, an exterior temperature of 60-65 degrees Fahrenheit (about 15.6-18.3 degree Celsius) having an expected equilibrium range of 92-102 degrees Fahrenheit (about 33.3-38.9 degrees Celsius), when combined with less than a 5 degree change in temperature in the five minute period has a low priority in both temperature range and change in temperature over time (i.e., combined prioritization value L,L). For convenience and clarity, locations within the temperature assessment table 600 that have at least one low priority value have a darker boarder around the value.

In general, the greater temperature difference between two objects that are in contact or adjacent with each other, the greater energy transfer rate from the hotter object to the cooler object. This thermal physics principle applies to auto interior and exterior spaces as well.

Now referring to FIG. 6B, which is a continuation of the temperature-based risk level and urgency level assessment table 600 (FIG. 6A), is analogous to the temperature assessment table 600 of FIG. 6A except that interior temperature section 608 has been replaced with interior temperature section 610. Interior temperature section 610 illustrates how many degrees the interior of the vehicle has increased in a fifteen-minute period (as opposed to the five-minute period in 608). Once again for convenience, clarity, and example only, locations within the temperature assessment table 600 that have at least one low priority value have a darker boarder around the value. However, whereas interior temperature section 608 has seven locations where there is at least one low priority value, interior temperature section 610 has twelve locations where there is at least one low priority value.

Continuing to FIG. 6C, which is a further continuation of the temperature-based risk level and urgency level assessment table 600 (FIG. 6A), is analogous to the temperature assessment table 600 of FIG. 6B except that interior temperature section 610 has been replaced with interior temperature section 612. Interior temperature section 612 illustrates how many degrees the interior of the vehicle has increased in a thirty-minute period (as opposed to the fifteen-minute period in 610). Further still, in this illustrative but non-limiting example, whereas interior temperature section 610 has twelve locations where there is at least one low priority value, interior temperature section 612 has sixteen locations where there is at least one low priority value.

FIGS. 6A-6C in one regard show how a change in the temperature over various durations of time can have an impact on prioritization. Whereas a 20 degree change temperature in a five-minute period can result in a H,H combination priority value (high risk, high urgency), a 20° F. change in temperature over a thirty-minute period can result in a L,L combination priority value (low risk, low priority), despite being at the same temperature ranges. Thus, the ability to delineate and categorize priorities not only by a given temperature or temperature range, but also by changes in temperature over time (a various durations) allows aspects of the present disclosure to make nuanced or dynamic decisions.

Air Quality Risk Level and Urgency Level Assessment

Aspects of the present disclosure also relate to detection, analysis, and prioritization of air quality (e.g., high carbon monoxide levels, or low oxygen levels).

Figure 7:
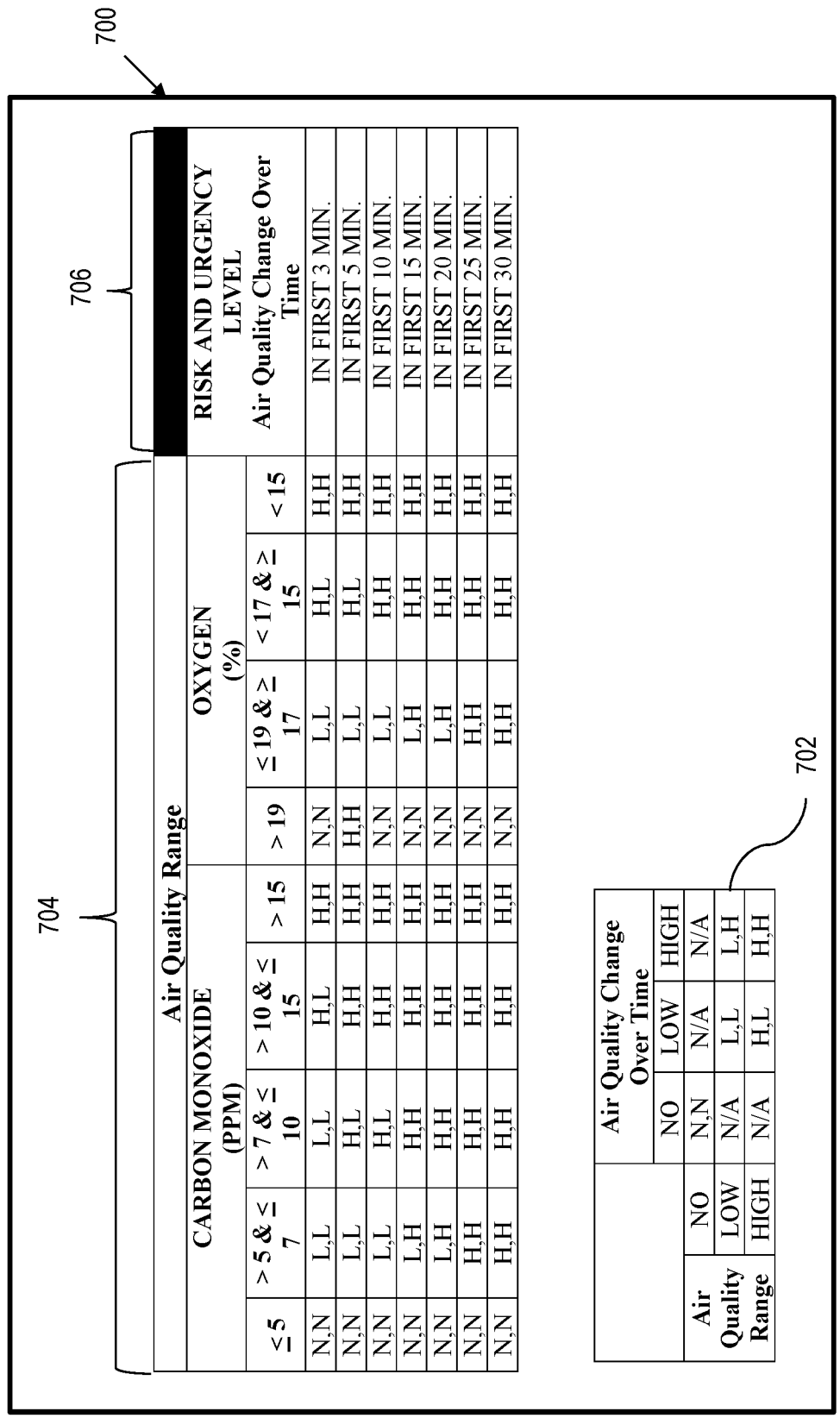
FIG. 7 is an example air quality risk level and urgency level assessment table, according to aspects of the present disclosure.

Referring to FIG. 7, an air quality assessment and prioritization table 700 is illustrated. Analogous to the discussion herein, there is one table with mere example data illustrated for clarity and convenience. In practice, there can be multiple tables, a table and a scalar/multiplier, etc.

Prioritization with respect to air quality is similar to that of temperature in FIGS. 6A-6C in that high priority is designated by "H" and low priority is designated as "L" as shown on the legend 702 in FIG. 7. However, when prioritizing air quality, certain combination values are inapplicable, thus designated as "N/A". Further, some combination values are applicable, but do not warrant prioritization. Values that do not warrant prioritization are designated as "NO" or "N".

For simplicity and succinctness only two values for priority are used. However, practical implementations could assign m levels for risk assessment, and n levels for urgency assessment, where m, n are natural integers in the range of {2, 3, 4, . . . ,} and need not be the same.

The air quality assessment and prioritization table 700 has values for air quality range 704 and air quality change over time 506. Air quality range 704 varies based on what is being measured in air. For instance, if carbon monoxide is being measured, the air quality range 704 is measured in parts per million ("PPM"). If oxygen is being measured, then the air quality range is measured as a percent (%) of total oxygen in the air.

Thus, in the air quality prioritization table 700, carbon monoxide is divided into multiple columns, where each column has a carbon monoxide range in PPM. In this example air quality prioritization table 500, the carbon monoxide ranges are:

≤5 ppm;
>5 & ≤7 ppm;
>7 & ≤10 ppm;
>10 & ≤15 ppm; and
>15 ppm.

For air quality range 704 with respect to percent of total oxygen, the ranges are:

>19%;
<19 & >17%;
<17 & >15%; and
<15%.

Air quality change over time 706 illustrates changes in the air quality range 504 over specified durations, which is this case is first three minutes, first five minutes, first ten minutes, first fifteen minutes, first twenty minutes, first twenty-five minutes, and first thirty minutes. Based on the analysis, a combined prioritization value (e.g., L,L) is assigned.

Working Example—Action

As noted in greater detail herein, based upon a measured risk type and urgency level (or probability of a PDS), an action is taken. The action herein can correspond for instance, to the action 208, 218 (FIG. 2A); 240, 242, 250 (FIG. 2B); 286 (FIG. 2C); 332 (FIG. 3D); 408 (FIG. 4), etc.

In an example embodiment, the control algorithm carries out the assessment and selection of an action based on an action table. The use of an action table allows the control algorithm to make queries into the table based upon known information, e.g., which can be derived from sensor readings, values extracted from other tables (e.g., values from a risk and urgency level assessment table), other available data, etc.

In an example embodiment, two general classes of action can be defined, including preservation and rescue.

Preservation actions are measures that involve activating a vehicles' available native resources, such as turning off an engine, turning on/off air conditioning or a heater, open/close windows, etc., for the purpose of maintaining suitable vehicle interior environment for occupants, human and otherwise, to remain in the vehicle without being physically and/or mentally harmed by adverse environmental conditions, which may lead to heatstroke, hypothermia, high level carbon monoxide poisoning, low-level-oxygen-induced asphyxia, etc. Preservation actions are performed while the system is waiting for eventual rescue, one way or another.

Rescue measures involve sounding an alarm, calling a responder, e.g., a driver or vehicle owner, via wireless devices, based on contact information provided at the initial setup.

In some embodiments, after a pre-set system time limit, if no human intervention rescue occurred, which can be detected by vehicle sensors, then the control algorithm sounds a vehicle alarm to attract attention of people in the vicinity of the vehicle. In some embodiments, the control algorithm may call 911 and any emergency rescue. When making calls, the control algorithm provides relevant information, such as PDS type, current condition, vehicle information, and geolocation obtained from GPS sensor, etc.

In some embodiments, such as where carjack and/or kidnap safety concerns are present, and where the control algorithm must open a window, the control algorithm opens windows by only a predetermined amount, e.g., 4 inches (10 centimeters) or suitably small amount, and only when absolutely necessary.

In an example embodiment of implementation within an autonomous vehicle, when all rescue-seeking efforts fail, the vehicle is commanded to drive to the nearest hospital, fire department, or police station, as identified by on-board GPS. In some embodiments, the vehicle can also be controlled to sound an alarm and/or also call for rescue to a hospital, fire department, and police personnel.

In the case of a system event, such that without command from the control algorithm, the engine and/or A/C stop working during a life preservation procedure/action, both risk level and urgency level immediately change to H (high), and the control algorithm continues to act according to new values of (R, U).

In an example implementation, the algorithm loads action parameters from the tables of FIG. 8A-FIG. 10C. Based upon the values of risk and urgency levels, the control algorithm executes actions from the table (e.g., implemented as an action plug-and-play), where each action is a series of procedural commands, and can be implemented as a functional procedure, controlled by programmed parameters. The purpose of action parameter table is to enable the usage of parameter values to control actions and action timing. The parameter values are stored in the system as data (e.g., in the memory 152 of FIG. 1B). As data, their values are not fixed, and can be adjusted and fine-tuned to meet whatever needs that are necessary. The use of action table(s) is flexible, and helps to reduce the amount of work, and thus the costs, in development, testing, and after-sale system maintenance and upgrades.

Also, in some embodiments, to proactively anticipate possible interruptions to life-sustaining operation, when the control algorithm detects a very low fuel level (or battery level in case of electric vehicles), the control algorithm is programmed to call 911 for rescue, if a 911 rescue request has not already been issued.

In the implementation of the control algorithm, each individual distinct action can be programmed as a parameterized module, where the parameters in the action table are passed on to the module, along with other necessary parameters, as the module is invoked into action.

High Temperature Applications

Figure 8A:
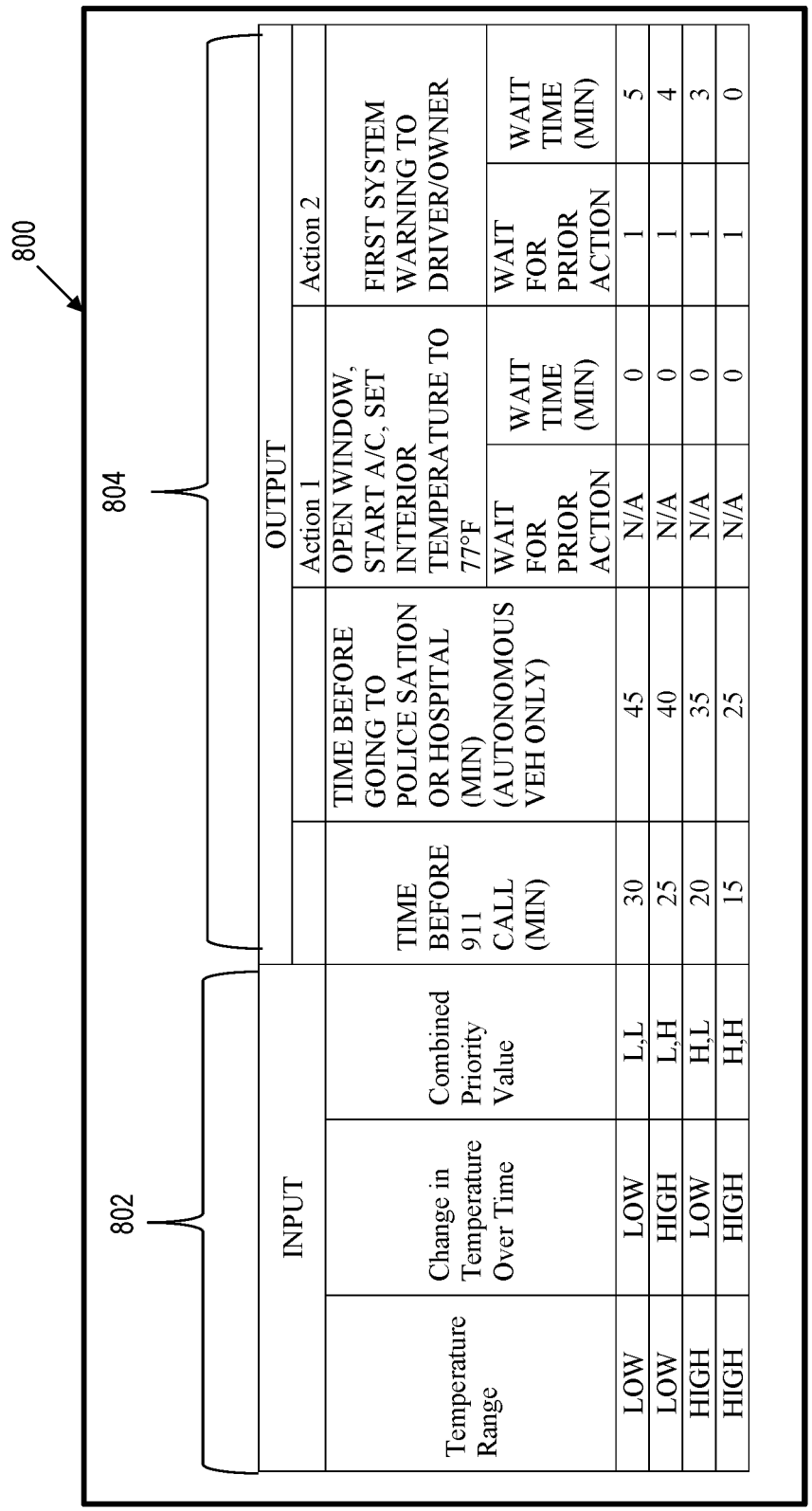

FIGS. 8A-8C illustrate example action parameters for high temperatures in a vehicle interior that illustrate how priority values dynamically change operations and actions, according to aspects of the present disclosure. The following numerical values, priority values, and actions are by way of example only and by no means limiting.

Referring to FIG. 8A, a high temperature decision table 800 is illustrated. The high temperature decision table 800 is divided into inputs 802 and outputs 804. Inputs 602 comprise temperature range, change in temperature over time, and combined priority value, which are analogous to other like features described more fully herein. The outputs 804 comprise time before calling emergency services, time before going to police station, fire department, or hospital (e.g., for autonomous vehicles), and predetermined actions, each of which can have a wait time and/or a dependency a series of procedural commands (e.g., a series of commands that follow a particular order).

For example, in a situation where an occupant presence is detected in a vehicle with high interior temperatures, the control algorithm can execute action one, which comprises opening a window in the vehicle (e.g., by up to 4 inches or approximately 10 centimeters), and/or starting the engine and activating temperature control, e.g., by setting a temperature to 77 degrees Fahrenheit (about 25 degrees Celsius) with the fan on "high". Once the temperature drops down to 77 degrees Fahrenheit (about 25 degrees Celsius), the control algorithm can set the fan to "low". Moreover, windows can optionally be closed.

If the situation is not resolved, the control algorithm, at the proper cadenced time, can implement action two. In FIG. 8A, action two comprises issuing alerts or warnings to a driver or owner of the vehicle. As noted above, actions can have an associated wait time. If the combined priority value is L,L, then the wait time is five minutes after action one. However, if the combined priority value is H,H, then there is no wait time after action one. Notably, the cyclically recurring nature of the processes described herein enable different actions to be carried out at different times while the PDS is not suitably resolved.

For the purposes of this disclosure, issuing alerts or warnings to a driver or owner of the vehicle includes, but is not limited to sending voice messages, phone messages (e.g., texting), application ("app") alerts, etc. to the vehicle driver/owner, including vehicle information, and vehicle geolocation. Alerts or warnings can also be sent to a predefined list of individuals.

FIG. 8B is a continuation of FIG. 8A. If the situation is still not resolved, the control algorithm, at the proper cadenced time, can implement action three, which is a second warning to the driver or owner of the vehicle. Wait times based on combined priority still apply. If further action is necessary, the control algorithm implements action four, e.g., to issue another warning to the driver or owner of the vehicle and/or to sound an alarm (e.g., siren), by way of example.

Now referring to FIG. 8C, which illustrates action five (5) and action six (6). The control algorithm can implement action five at the proper cadenced time, which can include activating a siren and/or contacting emergency services (e.g., 911, police, fire department, etc.) with vehicle information, and vehicle geolocation. The control algorithm can implement action six at the proper cadenced time, which can include, for instance, activating a siren and/or driving to a nearest designated emergency service area (e.g., police station, fire department, hospital, etc.). Upon arrival at the emergency service area, the vehicle may activate an alarm or siren to attract emergency service personnel. Further, a location of the vehicle can be sent to the vehicle owner. In some embodiments, action six may be restricted to vehicles that are autonomous.

In some embodiments, it may be preferable to create a specific electronic audible alert for a siren that is unique to the specific action, which can distinguish the specific electronic audible alert from general car alarms that may be ignored by passersby's. Further, car manufacturers may adopt the specific electronic audible alert industry wide.

In an example embodiment, it is possible that calls to driver and/or owners do not get through, for whatever conceivable reasons. So long as the control algorithm is capable of persisting a vehicle preservation procedure, a supporting environment is maintained in the vehicle interior. As such, the control algorithm can try to call again, based on the action sequence and timing. In some embodiments, once the time limit before calling for 911 rescue is reached, the control algorithm will call for 911 rescue. As with above examples, in the case of autonomous vehicles, the control algorithm can instruct the vehicle to drive to nearest police station, fire department, or hospital and optionally notify the driver/owner via phone messages and or text messages.

Low Temperature Applications

Figure 9A:
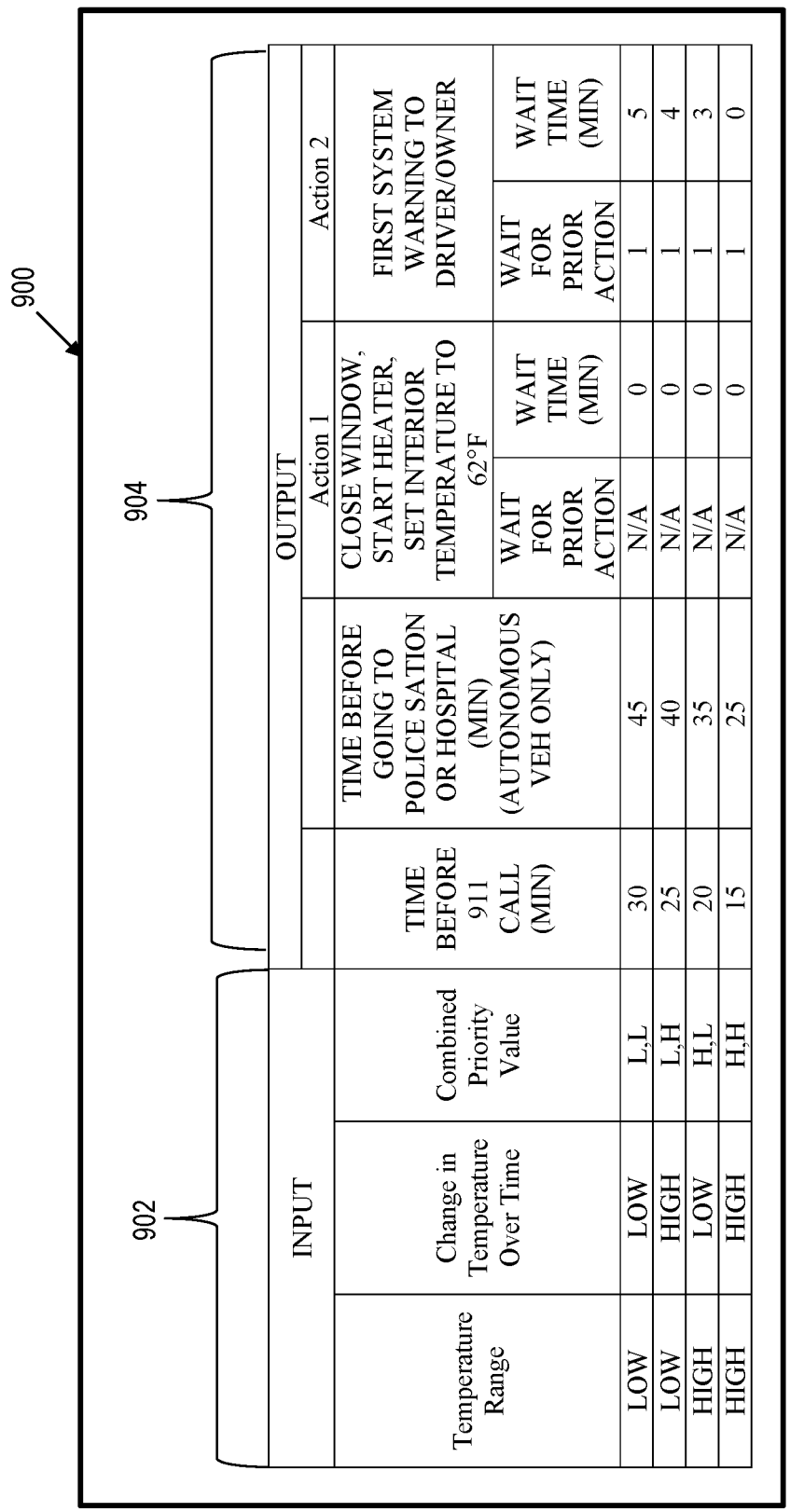
Figure 9B:
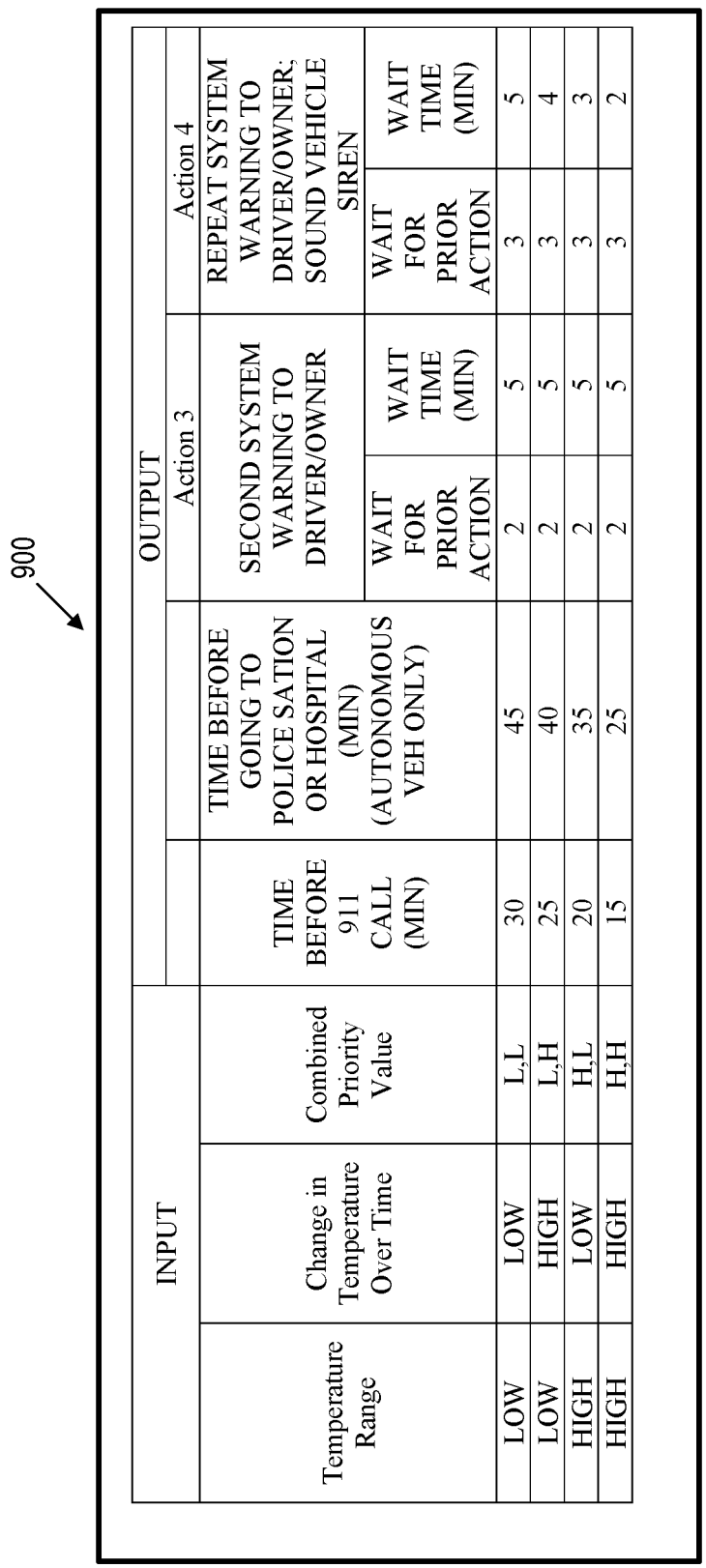

FIGS. 9A-9C illustrate example action parameters for low temperatures in a vehicle interior according to aspects of the present disclosure. The example action parameters illustrate how priority values dynamically change operations and actions responsive to a low temperature PDS. The definitions, terms, embodiments, examples, etc. that apply to FIGS. 8A-8C also apply to FIGS. 9A-9C where applicable, except that the references numbers for FIGS. 9A-9C are 100 higher. The following numerical values, priority values, and actions are by way of example only and by no means limiting.

Practically speaking, FIGS. 9A-9C are virtually identical in terms of content and mechanics. For instance, in an example implementation, the control algorithm can implement action 1, which can comprise closing one or more windows, with no waiting. Action 1 can also include starting the vehicle engine, starting the vehicle heater, e.g., to set interior temperature target to 62 degrees Fahrenheit (about 16.7 degrees Celsius), setting the fan on "high", etc. In some embodiments, once the interior temperature rises up to 62 degrees Fahrenheit (about 16.7 degrees Celsius), the control algorithm sets the fan on "low".

At the proper timed cadence, the control algorithm can implement action 2. In example embodiments, action 2 can comprise issuing a first system warning. Here, the control algorithm waits for a designated wait time (in minutes) after the action-begin time of a prior_action. Action 2 can also call a vehicle driver/owner to inform the responsible party of the PDS situation, vehicle information, vehicle geolocation, etc.

At the proper timed cadence, the control algorithm can implement action 3. Action 3 can comprise issuing a second system warning, waiting for a wait time (in minutes) after the action—begin time of a prior_action, call a vehicle driver/owner as noted above, etc.

Again, at the proper timed cadence, the control algorithm can implement action 4. Action 4 can comprise issuing a system warning, which can be repeated every wait time minutes. Action 4 can also call a vehicle driver/owner as noted above, sound a vehicle siren to attract the attention of people in the vicinity of the vehicle, etc.

Still further, at the proper timed cadence, the control algorithm can implement action 5. Action 5 can comprise issuing a rescue request, waiting for wait_time minutes after the action begin time of the prior_action, calling an emergency number, e.g., 911 for rescue, conveying any parameters as discussed more fully herein, etc. In some embodiments, action 5 can also sound unique electronic vocal message and/or vehicle siren to attract the attention of people in the vicinity of the vehicle.

Yet further, at the proper timed cadence, the control algorithm can implement action 6. Action 6 can comprise seeking police, fire department, or hospital personnel to carry out a rescue. Action 6 can also cause the vehicle to drive to nearest police station, fire department, or hospital emergency room (e.g., as applied to autonomous vehicles). In some embodiments, action 6 can notify the driver and/or owner this action, and the geolocation of the destination where the vehicle is heading to. Once the vehicle reaches the destination, the control algorithm can controls the vehicle to sound a siren to draw the attention of personnel for rescue.

Air Quality Applications

Figure 10A:
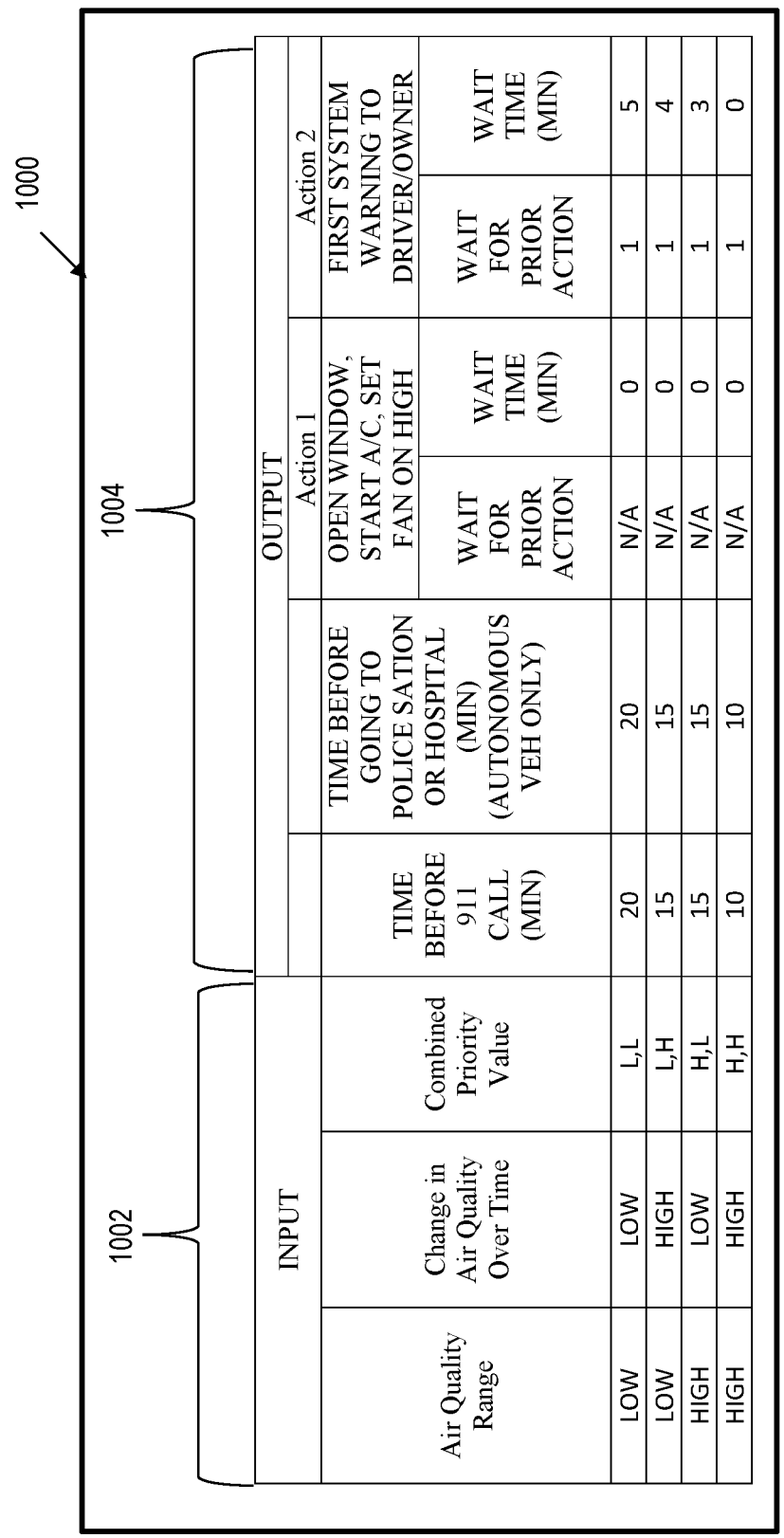
Figure 10B:
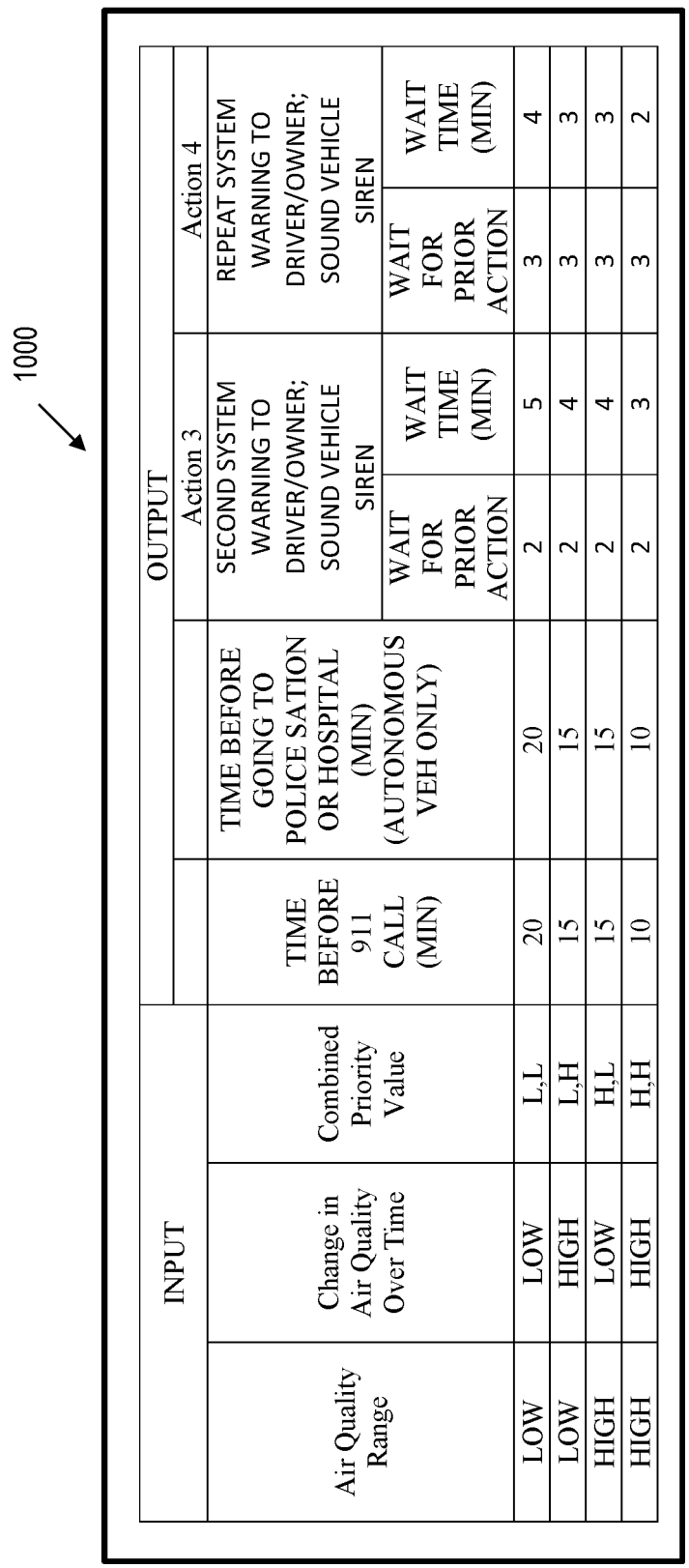

FIGS. 10A-10C illustrate example action parameters for air quality in a vehicle interior according to aspects herein. The example action parameters illustrate how priority values dynamically change operations and actions relating to air quality related PDS types.

The definitions, terms, embodiments, examples, etc., that apply to FIGS. 8A-8C also apply to FIGS. 10A-10C where applicable, except that the references numbers for FIGS. 10A-10C are 200 higher. The following numerical values, priority values, and actions are by way of example only and by no means limiting.

Practically speaking, FIGS. 10A-10C are similar to FIGS. 8A-8C in terms of content and mechanics, except that actions in FIGS. 10A-10C tend to have shorter wait times before an action is taken. For example, in FIGS. 8A-8C, a wait time for an autonomous vehicle to drive to emergency services is forty-five minutes. However, in FIGS. 10A-10C, a wait time for an autonomous vehicle to drive to emergency services is twenty minutes.

In an example configuration, at the proper timed cadence, the control algorithm can implement action 1. Action 1 can comprise opening one or more windows with no waiting. If the engine is running, the engine may be the source of carbon monoxide so the control algorithm can turn the engine off. If the engine is not running, the engine is not the source of carbon monoxide so the control algorithm can turn on the engine and uses the engine to power the air conditioning unit to manipulate the air within the vehicle interior. Action 1 can also comprise starting the vehicle air conditioning, and setting a fan on "high", without interior circulating mode.

Once carbon monoxide level drops down below threshold level, the control algorithm can set the fan on "low".

Again, at the proper timed cadence, the control algorithm can implement action 2. Action 2 can comprise issuing a first system warning with no waiting. Action 2 can also comprise calling a vehicle driver/owner to convey analogous to that described herein.

Further, at the proper timed cadence, the control algorithm can implement action 3. Action 3 can comprise issuing a second system warning. Action 3 can also comprise waiting for wait time minutes after the action-begin time of a prior_action, and calling a vehicle driver/owner to convey vehicle parameters. Action 3 can also sound a unique electronic vocal message and/or vehicle siren to attract the attention of people in the vicinity of the vehicle.

Still further, at the proper timed cadence, the control algorithm can implement action 4. Action 4 can comprise issuing a system warning, which is repeated every wait_time minutes, and can call a vehicle driver/owner. Action 4 can likewise sound a unique electronic vocal message and/or vehicle siren to attract the attention of people in the vicinity of the vehicle.

Still further, at the proper timed cadence, the control algorithm can implement action 5. Action 5 can issue a rescue request. Action 5 can also wait for wait time minutes after the action-begin time of a prior_action, and call emergency 911 for rescue, e.g., including providing any parameters as noted herein.

Moreover, at the proper timed cadence, the control algorithm can implement action 6. Action 6 comprises seeking police, fire department, or hospital personnel rescue. Action 6 can also instruct a vehicle to drive to nearest police station, fire department, or hospital emergency room (as applied to autonomous vehicles), analogous to that described herein.

In various embodiments, actions five and six may sequentially follow one another similarly to actions one through four. In other embodiments, actions five and six can operate independently (i.e., may trigger or activate without having to follow a sequence), or out of order. In the example of FIG. 10C, actions five and six can activate after action one and waiting for the appropriate wait time.

Zone-Based Process for Controlling an Environment of a Vehicle Interior

Figure 11:
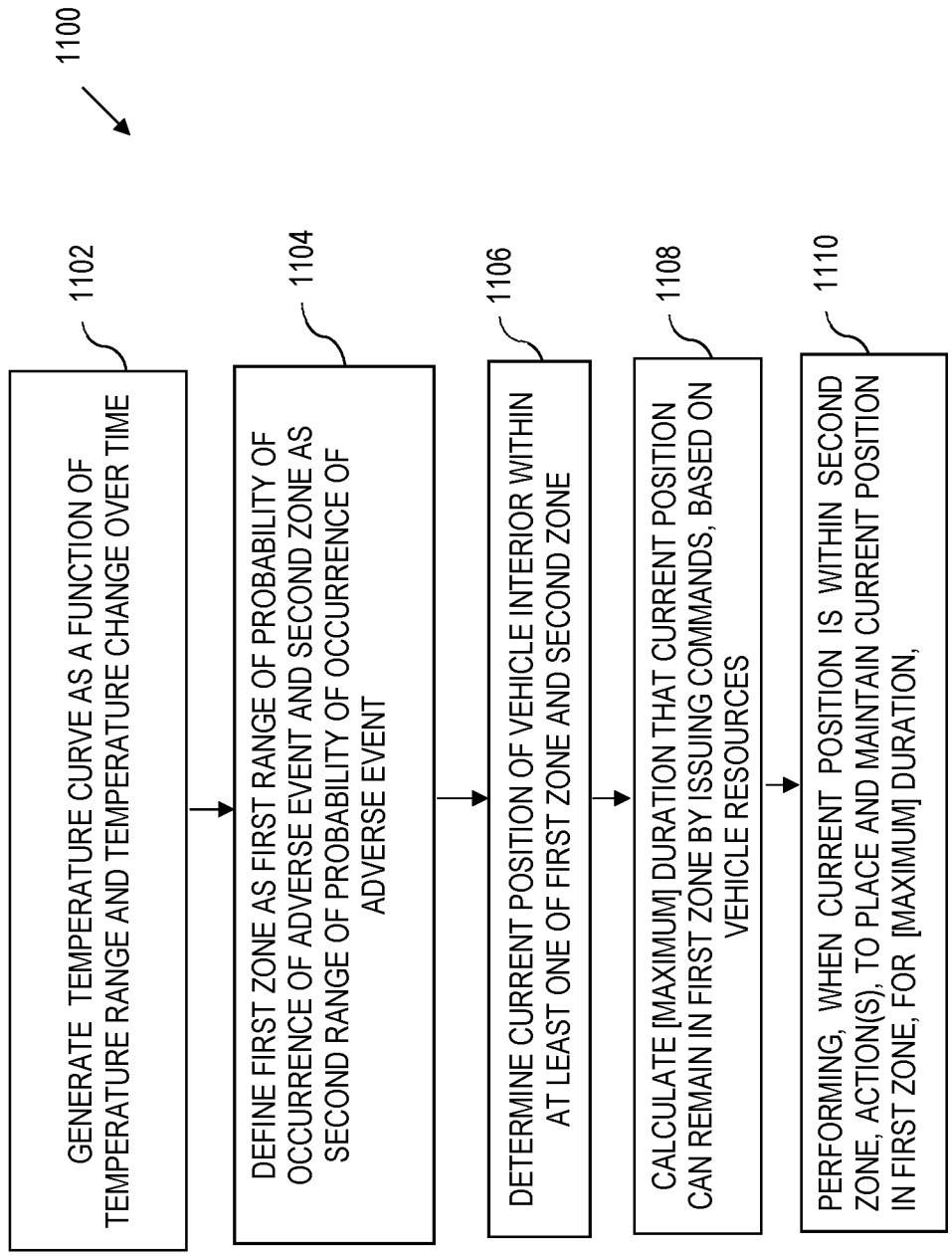
FIG. 11 is a flow diagram of a method of controlling an environment of a vehicle interior, according to further aspects herein.

Referring to FIG. 11, a computer-implemented process 1100 is illustrated, for controlling an environment of a vehicle interior. The computer-implemented process 1100 can be carried out, for instance, by the controller 104 executing computer code 150 stored in the memory 152 (FIG. 1B). Moreover, the process 1100 can interact with any sensors, vehicle modules, functions, etc., described herein, e.g., with reference to any of the FIGURES herein, in any combination to carry out the above-defined three phase approach.

The process 1100 comprises generating at 1102 a temperature curve for the vehicle interior, based on a measured environmental condition, wherein the temperature curve is a function of a temperature range and temperature change over time, e.g., using techniques noted more fully herein.

Further, the process 1100 comprises defining dynamically at 1104, based on the generated temperature curve, a first zone as a first range of probability of occurrence of an adverse event (PDS) and a second zone as a second range of probability of occurrence of an adverse event (PDS).

Moreover, the process 1100 comprises determining at 1106 a current position of the vehicle interior within at least one of the first zone and the second zone.

The process 1100 also comprises calculating at 1108 a [maximum] duration that the vehicle interior can remain in the first zone by issuing commands, based on vehicle resources. Vehicle resources include, but are not limited to fuel (e.g., gasoline, electricity, diesel, etc.), vehicle battery power levels, and other energy or power sources that are used to power vehicle systems.

Vehicle resources in many cases dictate how long the control algorithm can control environmental aspects of the vehicle interior. Vehicle actions such as raising and lowering windows, using A/C, sirens, and other vehicle operations need electricity to function. Thus, solutions that utilize vehicle systems are dependent on vehicle resources.

Yet further, the process 1100 comprises performing at 1110, when the current position is within the second zone, a first action, to place and maintain the current position in the first zone, for the [maximum] duration, by issuing a command to at least one of an engine controller, a window controller, a heating, ventilation and air conditioning (HVAC) controller, an alarm; and a communication device.

Figure 12A:
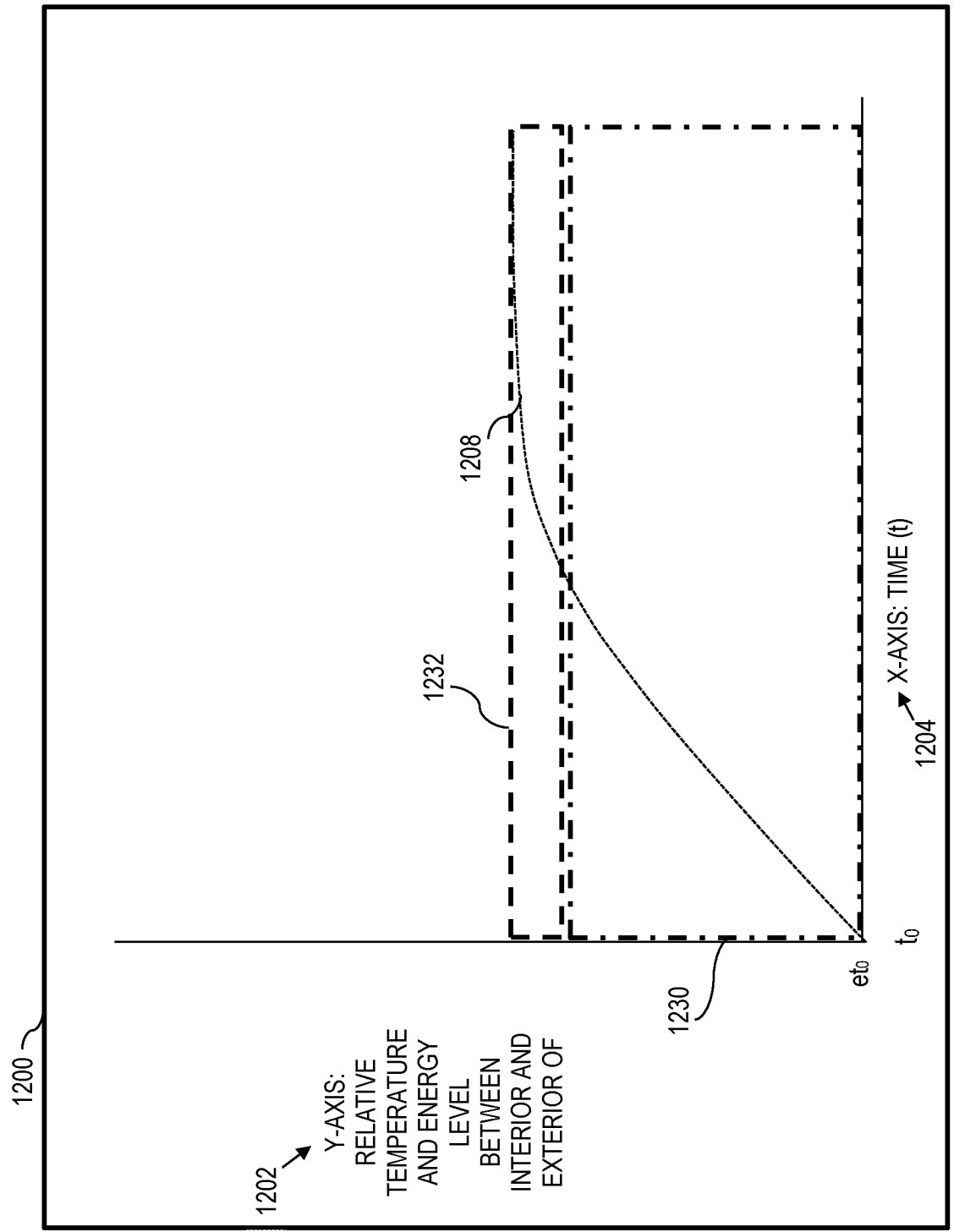
FIG. 12A is an example plot of time vs relative temperature and energy between an vehicle interior and vehicle exterior, according to aspects herein.

For example, referring to FIG. 12A, (which is analogous to a greenhouse curve), a first zone 1230 and a second zone 1232 are illustrated. For simplicity, the lines for energy absorption, dissipation, equilibriums have been removed.

In this example, the first zone 1230 has a lower probability of occurrence of an adverse event than the second zone 1232. As an interior temperature line 1208, on its current trajectory, travels from the first zone 1230 into the second zone 1232.

Figure 12B:
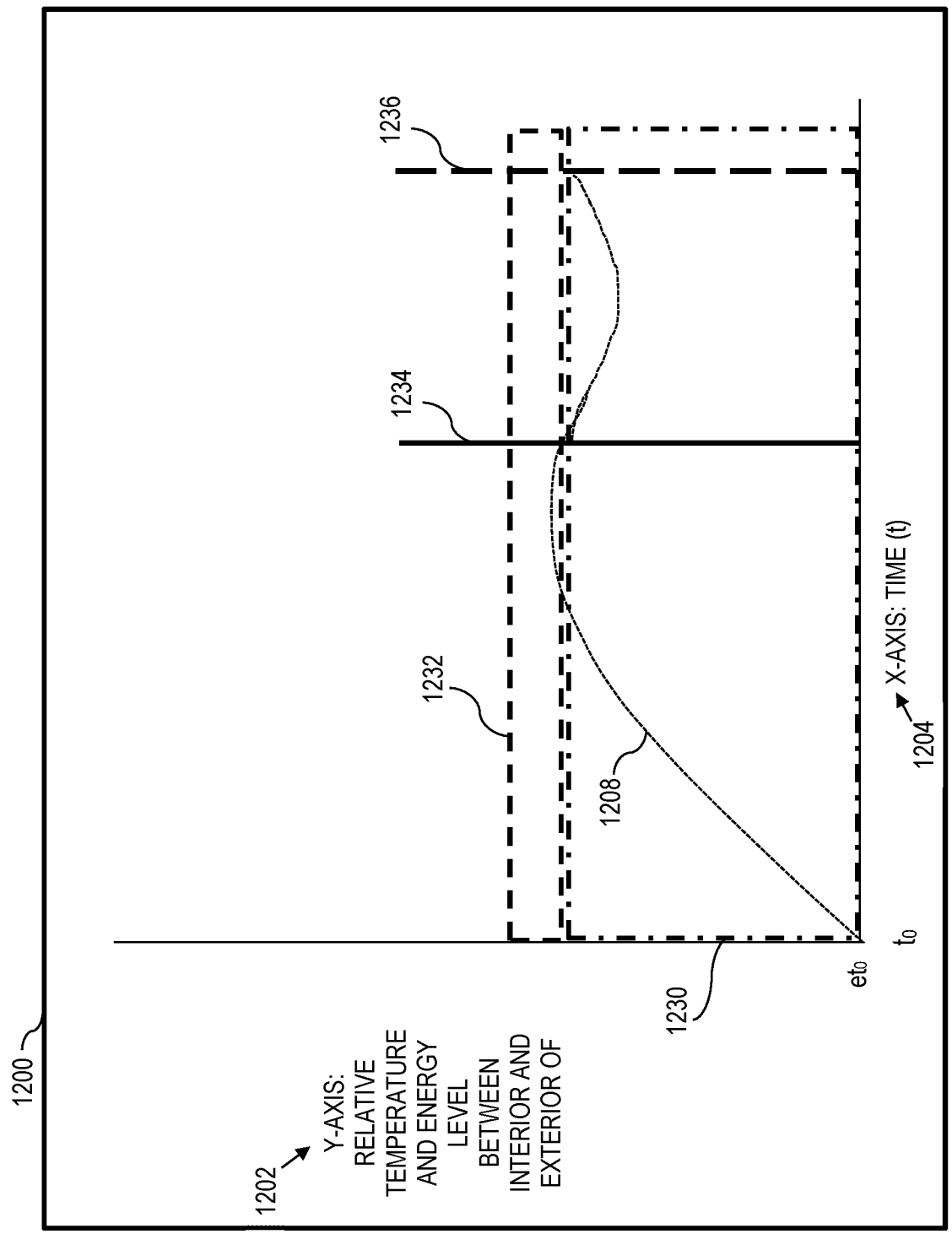
FIG. 12B is another example plot of time vs relative temperature and energy between an vehicle interior and vehicle exterior, according to aspects herein.

In response, as shown in FIG. 12B, the process performs a first action shown at 1234 (e.g., rolling down vehicle windows and activating A/C), which causes the interior temperature line 1208 to transition back to the first zone 1230.

In various embodiments, a second action 1236 can be performed serially (as well as a third, fourth, fifth, etc., as described more fully herein). In this regard, the process can be efficient and/or economical with vehicle resources in order to maximize the duration that the current position can remain in the first zone 1230.

Utilizing a sequential series of actions provides numerous advantages. For instance, even after performing the first action 1234, if the environmental conditions or causes thereof have not changed, the interior temperature line 1208 is likely to resume its trajectory toward the second zone 1232 as shown in FIG. 12B. However, in such a situation, the next in line sequential action is carried out as necessary.

While only two zones were used in this example, in practice, more than one zone may be implemented.

Alternate Process for Controlling an Environment of a Vehicle Interior

Figure 13:
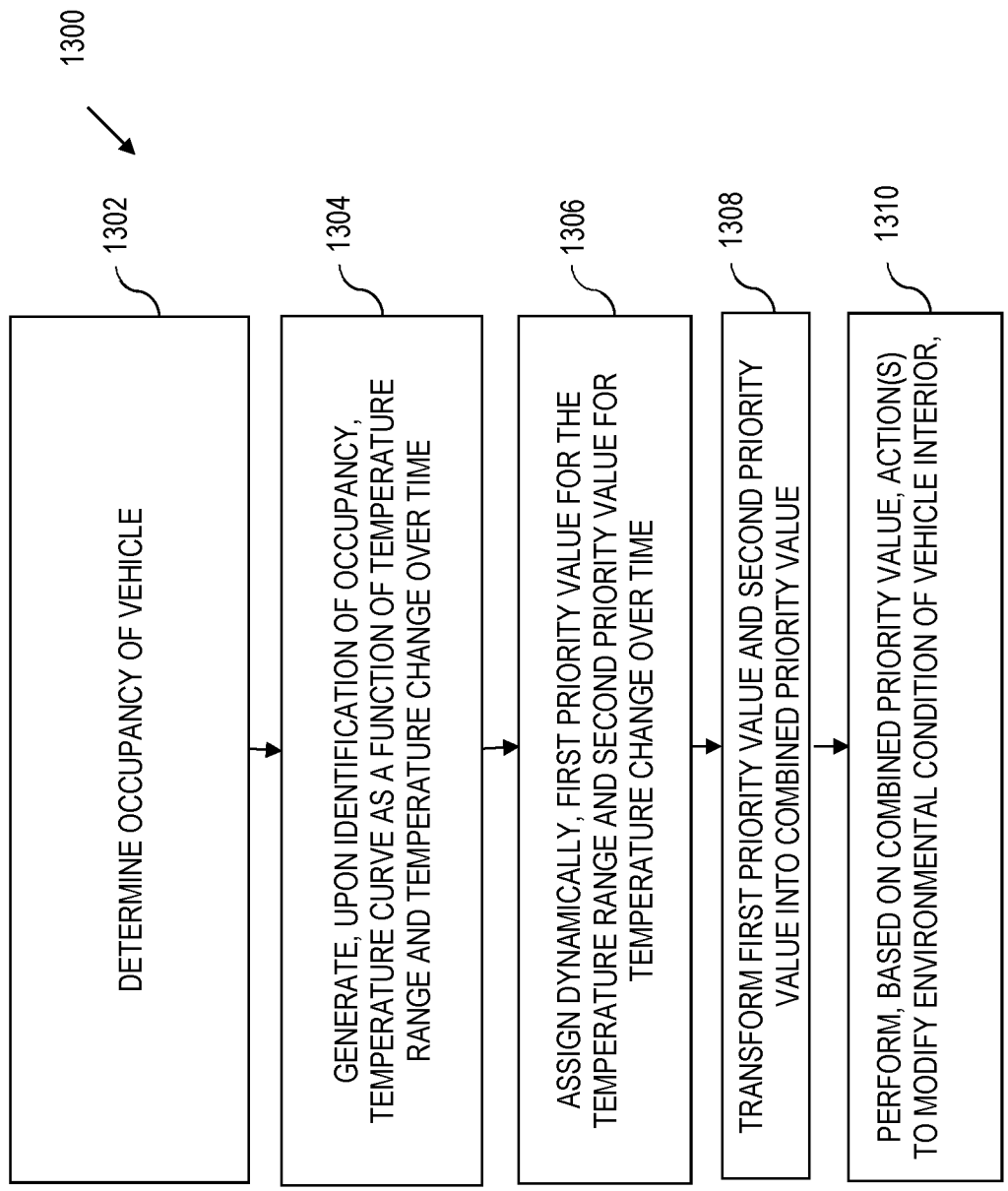
FIG. 13 is a flow diagram of yet another method of controlling a vehicle according to further aspects herein.

Referring to FIG. 13, a computer-implemented process 1300 is illustrated, for controlling an environment of a vehicle interior. The computer-implemented process 1300 can be carried out, for instance, by the controller 104 executing computer code 150 stored in the memory 152 (FIG. 1B). Moreover, the process 1300 can interact with any sensors, vehicle modules, functions, etc., described herein, e.g., with reference to any of the FIGURES herein, in any combination to carry out the above-defined three phase approach.

The process 1300 comprises determining at 1302 an occupancy of the vehicle, e.g., by identifying a field of view (FOV) of a camera of infrared and/or motion sensors, identifying an area of interest within the vehicle, limiting the field of view to the area of interest, and evaluating an output of the camera within the limited field of view to identify whether a person is in the vehicle.

In various embodiments, limiting the FOV is accomplished by limiting the FOV physically, such as placing a casing/walls on or around the camera. The dimensions of the wall design are determined by an application of geometry based on the spatial design of a particular vehicle's interior. The walls can be constructed using a variety of materials, such as plastics, polymers, metals, etc.

Figure 14:
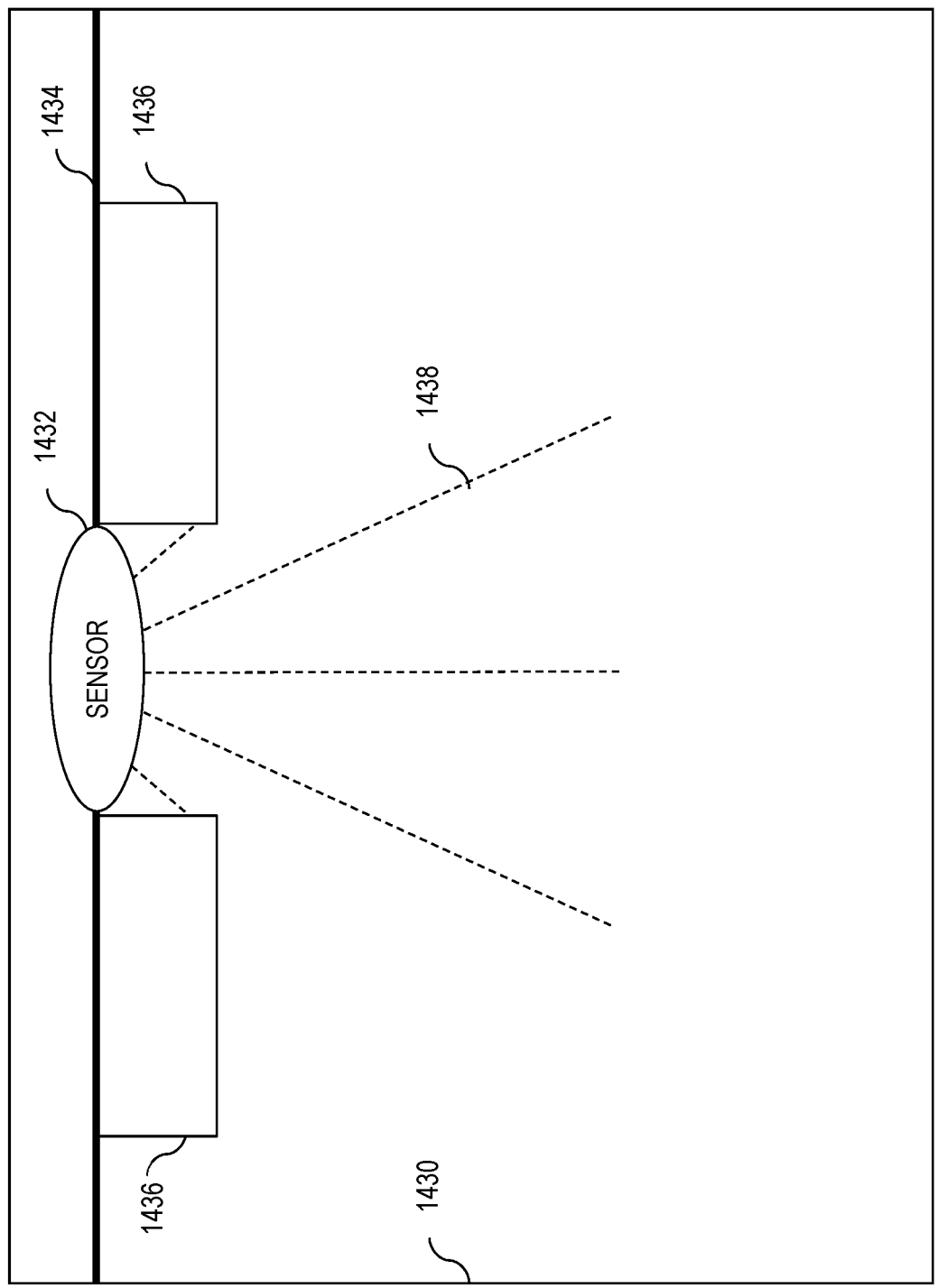
FIG. 14 is an example of a modified sensor, according to aspects herein.

FIG. 14 is an example illustration of limiting the FOV physically. Within the interior of the vehicle 1430, the applicable sensor (e.g., infrared, motion, etc.) 1432 is attached to the roof interior of the vehicle 1434. However, the applicable sensor may be placed in many logical places to accomplish the same purpose (e.g., on vehicle seating, head rests, etc.). In this example, walls 1436 restrict an FOV 1438 to the area of interest, thus reducing the occurrences of false positives.

Further, the opening between the walls 1440 is not required to be perpendicular to the applicable sensor 1442. The walls 1440 can be slanted based on design styles and needs. From a practical standpoint, one reason to design slanted edge walls is that imperfections in geometry of the walls 1440 or the applicable sensor 1442 may reflect signals in the forms of light or other radiations. However, this signal reflection concern may be mitigated by the modified design of inward slant angle of edge walls, as shown in FIG. 15.

Figure 15:
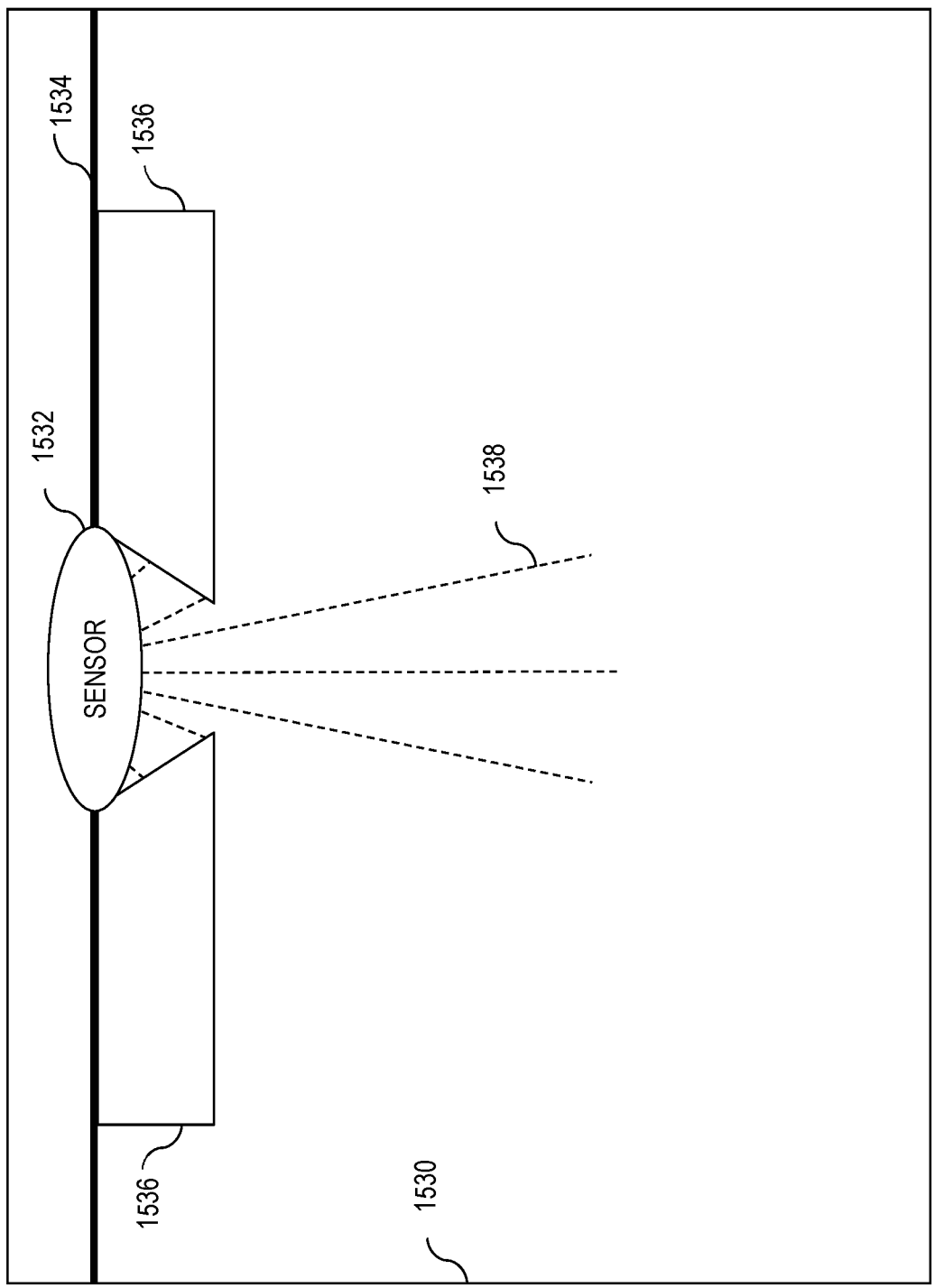
FIG. 15 is an example of another modified sensor, according to aspects herein.

FIG. 15 is largely analogous to FIG. 14, except that the corresponding numbers are 100 higher with different walls. In FIG. 14 the walls 1436 are angled as opposed to the [perpendicular] walls 1440 of FIG. 14. To the contrary, in FIG. 15, the exact angle for the walls 1536 is calculated based on the geometry of the overall design of the vehicle and applicable sensor 1532. Various other geometric patterns may be employed to conform to the needs of a specific vehicle. The walls 1536 do not have to be a single piece or layer. In various embodiments, the walls 1536 can be at least two layers, which may reduce the cost of manufacturing by being able to use two layers of simple geometry rather than one layer of complex geometry.

In other embodiments, or in combination with the physically limiting the motion camera/sensor (i.e., applicable sensor) 1532 via a casing or walls, limiting the motion camera/sensor 1532 is accomplished by utilizing software that selectively processes signals from pixels within the area of interest. Essentially, the motion sensor/camera 1532 only processes signals from pixels in desired areas (i.e. the area of interest). Signals from pixels outside the desired grid areas are eliminated by being ignored, or "thrown away". Using software means to limit the FOV in this manner avoids the time and money cost associated with calculating and applying the geometry of the walls 1536.

In various example embodiments, the area of interest is the interior space of the vehicle that is at the lower edge of the vehicle windows and below. This is due to the possibility of factors outside of the vehicle generating false positives from the vehicle sensors. For example, a person walking by the vehicle may cause the motion sensor 1532 in the vehicle to indicate that a living being is in the vehicle. Limiting the area of interest to the interior space described above can limit or eliminate such false positives.

In practice, a vehicle's interior dimensions may differ greatly between auto makers' vehicle models (e.g., small sized, medium sized, full sized, large SUVs, stretch limos, vans, school buses, etc.). However, programmable firmware or software can be customized specifically for each vehicle model, and loaded into a vehicle's system. The customization can be done through firmware or software programming, which is loaded onto each automobile produced. In addition, by using generic coding structures, manufacturers can allow for the introduction of new sensor types or vehicle models. Alternatively, a hardware device is used to load the firmware or software onto the vehicle's system. Yet further, the hardware device may comprise additional hardware such as a processor that supplements the vehicle's native processor.

Referring back to FIG. 13, the process 1300 comprises generating at 1304, upon identification of an occupant within the vehicle, a temperature curve for the vehicle interior, based on a measured environmental condition, wherein the temperature curve is a function of a temperature range and temperature change over time.

Further, the process 1300 comprises assigning at 1306, dynamically based on the generated temperature curve, a first priority value for the temperature range and a second priority value for temperature change over time.

Yet further, the process 1300 comprises transforming at 1308 the first priority value and the second priority value into a combined priority value.

Also, the process 1300 comprises performing at 1310, based on the combined priority value, a series of actions to modify an environmental condition of the vehicle interior, by issuing a command to at least one of an engine (e.g., via an engine controller), a window (e.g., via a window controller), a heating, ventilation and air conditioning (HVAC) unit (e.g., via an HVAC controller), an alarm; a a communication device.

With reference to FIG. 13-FIG. 15 generally, in practical applications, a computer-implemented process can be utilized for controlling a vehicle interior. The process can comprise reading a first sensor output from a first sensor attached to a vehicle, the first sensor output representative of a first environmental condition associated with a vehicle. The process further comprises determining an occupancy of the vehicle. While the determination may use the weight sensors 114 in the same manner disclosed in the previous disclosure, the determination may also determine the occupancy by identifying a field of view of a camera, identifying an area of interest within the vehicle, limiting the field of view (FOV) to the area of interest, and evaluating an output of the camera within the limited field of view to identify whether a person is in the vehicle. In various embodiments, limiting the FOV is accomplished by limiting the FOV physically, such as placing a casing/walls on or around the camera. The dimensions of the wall design are determined by an application of geometry based on the spatial design of a particular vehicle's interior. The walls can be constructed using a variety of materials, such as plastics, polymers, metals, etc. Additionally, the process comprises performing by a processor, a predetermined action to modify an environmental condition of the vehicle interior based on the occupancy of the vehicle and the sensed first environmental condition, by issuing a command to at least one of an engine controller, a window controller, and a heating, ventilation and air conditioning (HVAC) controller. The previously disclosed predetermined actions disclosed above also apply herein. In particular embodiments, the process further comprises reverting the vehicle back to a default state after performing by a processor, a predetermined action to modify an environmental condition of the vehicle interior, as described more fully herein.

Miscellaneous

Referring to FIG. 16A, an optional example decision table 1600 is illustrated, which represents a parameterized, table based approach for determining which of a set of predetermined actions to take. Moving from left to right on the decision, the first column relates to system states 1602. System state refers to the overall auto interior physical environment condition, which takes into account a variety of factors. The decision table 1600 also illustrates inputs in the form of sensor data 1604, examples of which include weight sensor data, infrared sensor data, motion sensor data, oxygen percentage data, carbon monoxide data, carbon monoxide data, and temperature data (included interior and exterior). The decision table 1600 also illustrates outputs in the form of actions 1606.

For example, the control algorithm may enter system state one where no occupants are detected in the vehicle. Therefore, if the control algorithm determines that it is in system state one, no further action is currently required.

The control algorithm may enter system state two where an adult is detected (e.g., weight over 70 lbs.), and oxygen is under 19%, carbon monoxide is over 5 ppm, or both. In response to being in state two, the control algorithm performs an output action, such as to initiate a call to a responder, sound an alarm, cut the vehicle engine (if the engine is running and the vehicle is stopped), set the fan on (e.g., high), open a window (e.g., up to 4"), combinations thereof, etc.

The control algorithm enters system state three where an occupant (e.g., a child but no adult) is detected (e.g., weight under 70 lbs.), and oxygen is under 19%. In response to being in state three, the control algorithm performs an output action, such as to initiate a call to a responder, sound an alarm, if the vehicle starts and the temperature is over 76° F., turn on the fan (e.g., high then moderate), etc. If an attempt by the control algorithm to start the vehicle fails, then one or more windows can be rolled down (e.g., to 4" or less). If the oxygen level improves, the vehicle maintains the course. If the oxygen levels continue to drop or stay below a threshold, another action is taken, e.g., to roll a window back up, etc.

The control algorithm can enter system state four where an occupant (e.g., child but no adult) is detected (e.g., weight under 70 lbs.), and carbon monoxide is over 5 ppm. In response to being in state four, the control algorithm performs an output action, such as to initiate a call to a responder, sound an alarm, if the vehicle starts and the temperature is over 76° F., turn on the fan (e.g., high then moderate), etc. If an attempt by the control algorithm to start the vehicle fails, then one or more windows can be rolled down (e.g., to 4" or less). If the carbon monoxide level improves, the vehicle maintains the course. If the carbon monoxide levels continue to drop or stay below a threshold, another action is taken, e.g., to roll a window back up, etc.

Referring now to FIG. 16B, the decision table 1600 is continued. The control algorithm can enter system state five where an occupant (e.g., child but no adult) is detected (e.g., weight under 70 lbs.), and temperature is outside an acceptable range. In one example embodiment of system state five, a vehicle cabin temperature over 80° F. is outside the acceptable range. Ranges may also and/or alternatively include external ambient temperature. In example embodiments, the control algorithm considers whether the outside ambient temperature is greater than or less than in the internal cabin temperature.

In response to being in state five, the control algorithm can perform an output action, such as to initiate a call to a responder, sound an alarm, or if the vehicle starts and the temperature is over 76° F., turn on the fan (e.g., high then moderate), etc. If an attempt to start the vehicle fails, and the outside temperature is under 85° F., then one or more windows can be rolled down (e.g., to 4" or less). In example embodiments, where the outside temperature is over 85° F. and the vehicle fails to start, no action other than alarms and calls to a responder may be performed.

The control algorithm can enter system state six where an occupant (e.g., child but no adult) is detected (e.g., weight under 70 lbs.), and a temperature is outside an acceptable range. In one example embodiment of system state six, a vehicle cabin temperature under 55° F. is outside the acceptable range. Ranges may also and/or alternatively include external ambient temperature. In example embodiments, the algorithm considers whether the outside ambient temperature is greater than or less than in the internal cabin temperature.

In response to being in state six, the control algorithm can perform an output action, such as to initiate a call to a responder, sound an alarm, or if the vehicle starts and the temperature is less than 60° F., turn on the fan/heater (e.g., high then moderate), etc. If an attempt by the control algorithm to start the vehicle fails, and the outside temperature is greater than 55° F., then the control algorithm can instruct a window controller to roll down one or more windows (e.g., to 4" or less). In example embodiments, where the outside temperature is less than 55° F. and the vehicle fails to start, no action other than alarms and calls to a responder will be performed.

Generally adverse environmental conditions relating to air quality (carbon monoxide or low oxygen) are regarded as higher risks. The process may not be able to evaluate the immediate surrounding area. In such an event, one of the more effective mitigating actions may be to call for help from outside, by both calling 911 for help, and initiating a siren/alarm to invoke attentions from neighbors or people near the vehicle for help.

Figure 17:
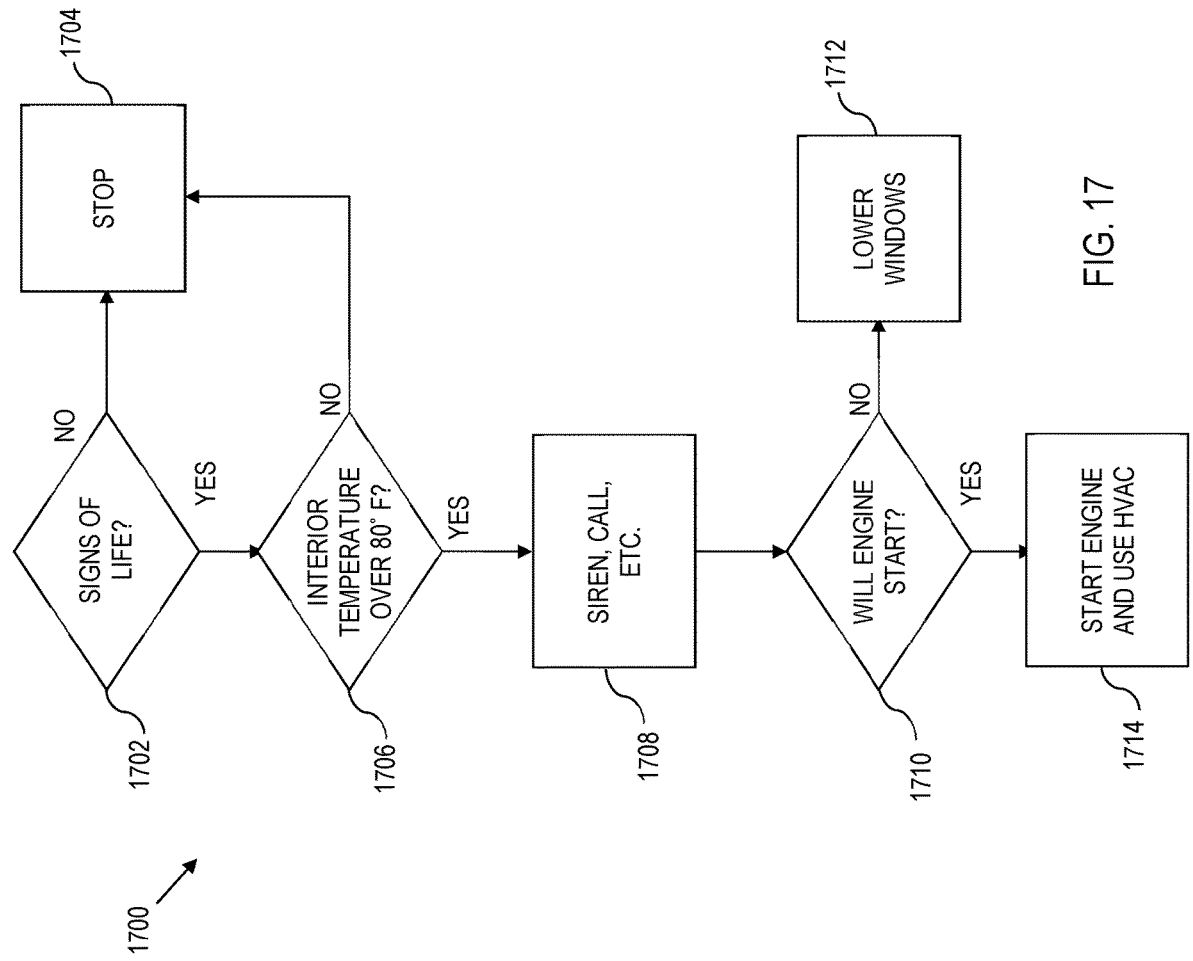
FIG. 17 is a flow chart illustrating another computer-implemented process for controlling an environment of a vehicle interior, according to aspects of the present disclosure.

Referring to FIG. 17, a computer-implemented process 1700 is illustrated, for controlling an environment of a vehicle interior. The computer-implemented process 1700 can be carried out, for instance, by the controller 104 executing computer code 150 stored in the memory 152 (FIG. 1B). Moreover, the process 1700 can interact with any sensors, vehicle modules, functions, etc., described herein, e.g., with reference to any of the FIGURES herein, in any combination to carry out the above-defined three phase approach.

By way of illustration, and not by way of limitation, FIG. 17 is a process flow chart 1700 that illustrates an embodiment of system state four in the decision table 1600 of FIG. 16A-FIG. 16B. Analogous process flows can be implemented for the remaining actions of FIG. 16A-FIG. 16B in an analogous manner.

As shown previously in FIG. 16A, system state four is a situation where the control algorithm detects an occupant in the vehicle and the interior of the vehicle is greater than 80° F. The control algorithm makes a series of assessments, and performs actions accordingly. If there are no signs of occupancy 1702, the process stops at 1704. If there are signs of occupancy 1702, then the process assesses whether or not the interior temperature of the vehicle is greater than 80° F. at 1706. If the interior temperature of the vehicle is greater than 80° F., then the process can initiate contacts/place phone calls, and/or activate sirens or take other suitable action at 1708. In addition, the process can attempt to start the engine at 1710. If the engine starts, the process can activate the HVAC system and lower the temperature at 1717. If the engine does not start, then the process can take other action, e.g., to lower the windows to a predetermined amount.

In particular embodiments, the process further comprises reverting at 332 the vehicle back to a default state after performing, by a processor, a predetermined action to modify an environmental condition of the vehicle interior based on the prioritization by issuing a command to at least one of an engine controller, a window controller, and a heating, ventilation and air conditioning (HVAC) controller.

Reverting the vehicle back to the default state can be beneficial in certain embodiments. For example, lowering a window in order to reduce the interior temperature of a hot vehicle may introduce other potential risks, such as theft, kidnapping, or carjacking as a result of the window being lowered. Reverting the vehicle back to the default state (e.g., raising the windows) after the environmental condition has been mitigated or eliminated may reduce the subsequently introduced dangers mentioned above. In various embodiments, the processes will not open the vehicle doors under any circumstances.

All processes, disclosures, embodiments, variations, etc. may be used interchangeably where possible or feasible. For example, embodiments for the process 1100 may be used for the process. Stated differently, all processes, disclosures, embodiments, and variations are not strictly bound to any particular process or embodiment.

Advantages

In additional to the advantages already described above, aspects of the present disclosure provide a template based, parameterized, and data driven design approach to allow for a flexible solution that can be adjusted and fine-tuned without major modifications (e.g., without modifying structure, algorithm, and code base). In multiple embodiments, only pre-stored parameter data need be updated, as opposed to program code base changes.

Yet further, aspects can use sensors that are commonly and readily available in modern vehicles (thus eliminating a need for additional/non-native sensors). Accordingly, since no additional hardware is required beyond those sensors already natively included in a vehicle, actions stemming from control algorithm decisions and process flows are effective, and are realistically implementable without excessive costs to manufacturers or vehicle owners in the case of retro-fitting.

Further, aspects of the present disclosure, as described herein, allows differentiation amongst diverse situations in order to be nuanced in its responses. When a situation has lower priority values, a vehicle owner/driver can be allowed more time to respond to an alert and get back to the vehicle to alleviate the situation. When the situation involves high priority values, quick and decisive action may be required in order to resolve the situation.

In some embodiments, aspects of the present disclosure differentiate situations by multiple measurements (e.g., temperature range and temperature change over time, which are formalized into risk level and urgency level, respectively). As such, the present disclosure can be "smart" or "dynamic" in implementation appropriate actions and/or action timings according to priority values.

Further, aspects of the present disclosure proactively, and automatically, assess vehicle interior environmental conditions and respond without human intervention, thus mitigating human error.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated. Notwithstanding, any of the steps or processes herein may be performed in any order unless otherwise noted.

What is claimed is:

1. A computer-implemented process for controlling an environment of a vehicle interior comprising:
    obtaining data based upon a measurement from a vehicle sensor, wherein:
        the obtained data is based on a measured environmental condition and relates to a vehicle interior condition;
        the obtained data is compared to a corresponding range, where the range is dynamically determined based upon at least one environmental factor; and
        the obtained data is used to compute a change over time of the measured data within the range;
    obtaining temperature curve data for the vehicle interior, based on the measured environmental condition, wherein the temperature curve is a function of the range, expressed as a temperature range, and the change over time, expressed as a temperature change over time;
    generating a vehicle command based upon at least one of the comparison of the obtained data to the temperature range and the temperature change over time; and
    executing the generated vehicle command to control at least one electronic component of the vehicle;
        where the executed command modifies the vehicle interior condition.

2. The computer-implemented process of claim 1 further comprising:
    detecting a situation related to a state of the vehicle interior satisfying a predetermined condition, where an occupant is within the vehicle interior;
    performing in a cyclically recurring manner, until the detected situation is resolved:
        re-assessing the comparison of the obtained data to the corresponding range, the computed change over time, or both, based on an updated sensor input, updated vehicle historical records, or both;
        generating a new vehicle command, based upon the re-assessment; and
        executing the generated new vehicle command.

3. The computer-implemented process of claim 2, wherein:
    the detected situation further comprises a select one of:
        an obtained temperature within the vehicle interior is below a first predetermined temperature threshold; or
        an obtained temperature within the vehicle interior exceeds a second predetermined temperature threshold.

4. The computer-implemented process of claim 1 further comprising:
    detecting a situation by:
        utilizing at least one of an exterior temperature sensor, and an interior temperature sensor to determine the measured environmental condition;
        detecting an occupant of the vehicle; and
        detecting at least one vehicle operational state.

5. The computer-implemented process of claim 4 further comprising:
    generating a series of vehicle commands based upon the situation, an assessed risk based upon the comparison of the obtained data to the corresponding temperature range, and an assessed urgency based upon the computed temperature change over time relative to the range;
    waiting for a predetermined wait time between at least a first vehicle command and a second vehicle command within the series of vehicle commands, wherein the predetermined wait time is modified based on the comparison of the obtained data to the corresponding temperature range, the computed temperature change over time, or both.

6. The computer-implemented process of claim 1, wherein the measured environmental condition is detected by:
    detecting that a living being is within the vehicle interior and at least one of:
        an engine of the vehicle is stopped; or
        the engine is running, but the vehicle has not moved in a predetermined amount of time.

7. The computer-implemented process of claim 1 further comprising:
    re-assessing at least one of the comparison of the obtained data to the corresponding temperature range and the computed temperature change over time based on an updated sensor input; and
    re-executing the vehicle command, based upon a result of the re-assessment.

8. The computer-implemented process of claim 1, wherein the measured environmental condition is detected by:
    detecting that a living being is within the vehicle interior; and
    determining whether the detected person is an adult or child by determining whether a weight of the person exceeds a predetermined threshold; and
    performing a first action if the person is an adult, and a second action different from the first action if the person is a child.

9. The computer-implemented process of claim 1 further comprising:
    assessing risk and urgency by calculating a probability of occurrence of an adverse event that is predicted to occur within a future, preset time based upon the measurement from the vehicle sensor, and the obtained temperature curve data;
    wherein:
    executing the generated vehicle command is triggered where the calculated probability exceeds a predetermined threshold.

10. The computer-implemented process of claim 9, wherein calculating the probability of occurrence of the adverse event that is predicted to occur in the future, preset time, comprises at least one of:

calculating the probability of occurrence based further upon location data extracted by a global positioning system in the vehicle; and calculating the probability of occurrence based further upon at least one greenhouse effect curve that is pre-stored in a data table in the vehicle.

11. The computer-implemented process of claim 1, wherein:

executing the generated vehicle command comprises at least one of:

establishing a timing to perform the generated vehicle command according to a dynamic cadence that reacts to changing conditions from the vehicle sensor output used to calculate the probability of occurrence of the adverse event; and selecting the generated vehicle command from a template of responses that stores pre-programmed action responses.

12. The computer-implemented process of claim 1 further comprising:

reading a sensor availability map stored in the vehicle, the sensor availability map electronically storing data characterizing particular sensors available on the vehicle, the sensor availability map used to extract information on how to read the measurement from the vehicle sensor.

13. A computer-implemented process for controlling an environment of a vehicle interior comprising:

obtaining data based upon a measurement from a vehicle sensor, wherein:

the obtained data is based on a measured environmental condition and relates to a vehicle interior condition;

the obtained data is compared to a corresponding range, where the range is dynamically determined based upon at least one environmental factor; and the obtained data is used to compute a change over time of the measured data within the range;

obtaining air quality curve data for the vehicle interior, based on the measured environmental condition, wherein the air quality curve data is a function of the range, expressed as an air quality range, and the change over time, expressed as an air quality change over time;

generating a vehicle command based upon at least one of the comparison of the obtained data to the air quality range and the air quality change over time; and executing the generated vehicle command to control at least one electronic component of the vehicle;

where the executed command modifies the vehicle interior condition.

14. The computer-implemented process of claim 13 further comprising:

detecting a situation related to a state of the vehicle interior satisfying a predetermined condition, where an occupant is within the vehicle interior;

performing in a cyclically recurring manner, until the detected situation is resolved:

re-assessing the comparison of the obtained data to the corresponding range, the computed change over time, or both, based on an updated sensor input, updated vehicle historical records, or both;

generating a new vehicle command, based upon the re-assessment; and executing the generated new vehicle command.

15. The computer-implemented process of claim 13, wherein:

the detected situation further comprises:

an obtained air quality measurement within the vehicle interior satisfies a predetermined air quality situation.

16. The computer-implemented process of claim 13 further comprising:

detecting a situation by:

utilizing at least one of a carbon monoxide sensor, and an oxygen sensor to determine the measured environmental condition;

detecting an occupant of the vehicle; and detecting at least one vehicle operational state.

17. The computer-implemented process of claim 16 further comprising:

generating a series of vehicle commands based upon the situation, an assessed risk based upon the comparison of the obtained data to the corresponding air quality range, and an assessed urgency based upon the computed air quality change over time relative to the range;

waiting for a predetermined wait time between at least a first vehicle command and a second vehicle command within the series of vehicle commands, wherein the predetermined wait time is modified based on the comparison of the obtained data to the corresponding air quality range, the computed air quality change over time, or both.

18. The computer-implemented process of claim 13, wherein the measured environmental condition is detected by:

detecting that a living being is within the vehicle interior and at least one of:

an engine of the vehicle is stopped; or the engine is running, but the vehicle has not moved in a predetermined amount of time.

19. The computer-implemented process of claim 13 further comprising:

re-assessing at least one of the comparison of the obtained data to the corresponding range and the computed change over time based on an updated sensor input; and re-executing the vehicle command, based upon a result of the re-assessment.

20. The computer-implemented process of claim 13, wherein the measured environmental condition is detected by:

detecting that a living being is within the vehicle interior; and determining whether the detected person is an adult or child by determining whether a weight of the person exceeds a predetermined threshold; and performing a first action if the person is an adult, and a second action different from the first action if the person is a child.

* * * * *